(12) United States Patent
Zhang et al.

(10) Patent No.: US 11,816,149 B2
(45) Date of Patent: Nov. 14, 2023

(54) ELECTRONIC DEVICE AND CONTROL METHOD THEREOF

(71) Applicant: Samsung Electronics Co., Ltd., Suwon-si (KR)

(72) Inventors: Dafeng Zhang, Beijing (CN); Yanchao Li, Beijing (CN); Yanjun Gao, Beijing (CN); Lei Wang, Beijing (CN); Zhezhu Jin, Beijing (CN); Yingying Jiang, Beijing (CN); Lanlan Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 530 days.

(21) Appl. No.: 17/171,117

(22) Filed: Feb. 9, 2021

(65) Prior Publication Data
US 2021/0248181 A1      Aug. 12, 2021

(30) Foreign Application Priority Data

Feb. 11, 2020  (CN) .......................... 202010087492.8
Jul. 24, 2020   (CN) .......................... 202010726065.X
(Continued)

(51) Int. Cl.
*G06F 16/583*       (2019.01)
*G06F 18/25*        (2023.01)
(Continued)

(52) U.S. Cl.
CPC ........ *G06F 16/583* (2019.01); *G06F 16/5854* (2019.01); *G06F 18/251* (2023.01);
(Continued)

(58) Field of Classification Search
CPC .. G06F 16/583; G06F 16/5854; G06F 18/251; G06F 16/5866; G06F 18/231; G06F 18/2323; G06V 10/7625; G06V 10/7635
(Continued)

(56) References Cited

U.S. PATENT DOCUMENTS 8,615,113 B2 * 12/2013 Lee ..................... G06F 18/2132
                                                             382/118
10,140,553 B1 * 11/2018 Vasisht .................. G06V 20/20
(Continued)

FOREIGN PATENT DOCUMENTS

CN       103559504 A  *  2/2014   .......... G06K 9/4671
CN       105488527 A  *  4/2016   ......... G06K 9/00228
(Continued)

OTHER PUBLICATIONS

Wang, Zhongdao et al., Linkage Based Face Clustering via Graph Convolution Network, Department of Electronic Engineering, Tsinghua University, Australian Centre for Robotic Vision, Australian National University, arXiv:1903.11306v3 [cs.Cv], Apr. 8, 2019.
(Continued)

*Primary Examiner* — Mahendra R Patel
(74) *Attorney, Agent, or Firm* — Jefferson IP Law, LLP

(57) ABSTRACT

An electronic device and a method for controlling thereof are provided. A method for controlling an electronic device according to the disclosure includes obtaining a plurality of images for performing clustering, obtaining a plurality of target areas corresponding to each of the plurality of images, obtaining a plurality of feature vectors corresponding to the plurality of target areas, obtaining a plurality of central nodes corresponding to the plurality of feature vectors, obtaining neighbor nodes associated with each of the plurality of central nodes, obtaining a subgraph based on the plurality of central nodes and the neighbor nodes, identify- (Continued)

ing the connection probabilities between the plurality of central nodes of the subgraph and the neighbor nodes of each of the plurality of central nodes based on a graph convolutional network, and clustering the plurality of target areas based on the identified connection probabilities.

24 Claims, 63 Drawing Sheets

(30) Foreign Application Priority Data

Nov. 10, 2020 (KR) .......................... 10-2020-0149577
Nov. 20, 2020 (CN) .......................... 202011311698.0

(51) Int. Cl.
*G06V 10/762* (2022.01)
*G06F 16/58* (2019.01)

(52) U.S. Cl.
CPC ...... *G06V 10/7625* (2022.01); *G06V 10/7635* (2022.01); *G06F 16/5866* (2019.01)

(58) Field of Classification Search
USPC ........................................................ 382/181
See application file for complete search history.

(56) References Cited

U.S. PATENT DOCUMENTS

| | | | | |
|---|---|---|---|---|
| 10,282,597 B2* | 5/2019 | Zhang | .................. | G06V 10/763 |
| 10,503,775 B1* | 12/2019 | Ranzinger | ........... | G06F 16/5854 |
| 11,205,103 B2* | 12/2021 | Zhang | .................... | G06N 3/045 |
| 2008/0144943 A1* | 6/2008 | Gokturk | ................. | G06F 16/51 |
| | | | | 382/224 |
| 2018/0025031 A1* | 1/2018 | Lai | .......................... | G06F 16/58 |
| | | | | 707/723 |
| 2018/0107682 A1* | 4/2018 | Wang | .................... | G06F 16/583 |
| 2019/0095806 A1* | 3/2019 | Martinez Canedo | .. | G06N 20/00 |
| 2019/0205620 A1* | 7/2019 | Yi | ............................. | G06N 3/08 |
| 2019/0286754 A1* | 9/2019 | Leskovec | ............ | G06F 16/2272 |
| 2019/0286943 A1 | 9/2019 | Leskovec et al. | | |
| 2019/0286945 A1* | 9/2019 | Kamath | ............... | G06F 18/2413 |
| 2020/0020435 A1 | 1/2020 | Annavi | | |
| 2020/0314117 A1* | 10/2020 | Nguyen | ................ | H04L 63/145 |

FOREIGN PATENT DOCUMENTS

| | | | | | |
|---|---|---|---|---|---|
| CN | 105608425 | A | | 5/2016 | |
| CN | 108416347 | A | * | 8/2018 | |
| CN | 109829433 | A | | 5/2019 | |
| CN | 110363282 | A | | 10/2019 | |
| CN | 111062431 | A | * | 4/2020 | |
| JP | 6765667 | B2 | * | 10/2020 | |
| KR | 10-0987394 | B1 | | 10/2010 | |
| WO | WO-2017051358 | A1 | * | 3/2017 | ............... G06K 9/34 |
| WO | 2019/183191 | A1 | | 9/2019 | |

OTHER PUBLICATIONS

International Search Report and written opinion dated Jun. 2, 2021, issued in International Application No. PCT/KR2021/001837.

* cited by examiner

Digital image

Voice/Text

Social network

FIG. 18

|   | 0 | 1 | 2 | 3 | 4 | 5 |
|---|---|---|---|---|---|---|
| 0 | 0 | 1 | 1 | 0 | 0 | 1 |
| 1 | 1 | 0 | 0 | 1 | 1 | 1 |
| 2 | 1 | 0 | 0 | 1 | 0 | 0 |
| 3 | 0 | 1 | 1 | 0 | 0 | 0 |
| 4 | 0 | 1 | 0 | 0 | 0 | 0 |
| 5 | 1 | 1 | 0 | 0 | 0 | 0 |

FIG. 19

|   | 0 | 1 | 2 | 3 | 4 | 5 |
|---|---|---|---|---|---|---|
| 0 | 0 | g | h | 0 | 0 | f |
| 1 | g | 0 | 0 | b | c | e |
| 2 | h | 0 | 0 | a | 0 | 0 |
| 3 | 0 | b | a | 0 | 0 | 0 |
| 4 | 0 | c | 0 | 0 | 0 | 0 |
| 5 | f | e | 0 | 0 | 0 | 0 |

FIG. 20

|   | 0 | 1 | 2 | 3 | 4 | 5 |
|---|---|---|---|---|---|---|
| 0 | 3 | 0 | 0 | 0 | 0 | 0 |
| 1 | 0 | 4 | 0 | 0 | 0 | 0 |
| 2 | 0 | 0 | 2 | 0 | 0 | 0 |
| 3 | 0 | 0 | 0 | 2 | 0 | 0 |
| 4 | 0 | 0 | 0 | 0 | 1 | 0 |
| 5 | 0 | 0 | 0 | 0 | 0 | 2 |

FIG. 21

|   | 0  | 1  | 2  | 3  | 4  | 5  |
|---|----|----|----|----|----|----|
| 0 | 3  | -1 | -1 | 0  | 0  | -1 |
| 1 | -1 | 4  | 0  | -1 | -1 | -1 |
| 2 | -1 | 0  | 2  | -1 | 0  | 0  |
| 3 | 0  | -1 | -1 | 2  | 0  | 0  |
| 4 | 0  | -1 | 0  | 0  | 1  | 0  |
| 5 | -1 | -1 | 0  | 0  | 0  | 2  |

FIG. 23

| 1 | 1 | 0 | 0 | 0 | 0 |
|---|---|---|---|---|---|
| 0 | 1 | 1 | 1 | 0 | 0 |
| 0 | 1 | 1 | 0 | 0 | 0 |
| 1 | 0 | 1 | 1 | 0 | 0 |
| 0 | 0 | 0 | 0 | 1 | 1 |
| 0 | 0 | 0 | 0 | 1 | 1 |

A $*$

| 0 | 0 |
|---|---|
| 1 | -1 |
| 2 | -2 |
| 3 | -3 |
| 5 | -5 |
| 6 | -6 |

X(L)

$=$

| 1 | -1 |
|---|---|
| 6 | -6 |
| 3 | -3 |
| 5 | -5 |
| 11 | -11 |
| -11 | -11 |

| 1 | 1 | 0 | 0 | 0 | 0 |
|---|---|---|---|---|---|
| 0 | 1 | 1 | 1 | 0 | 0 |
| 0 | 1 | 1 | 0 | 0 | 0 |
| 1 | 0 | 1 | 1 | 0 | 0 |
| 0 | 0 | 0 | 0 | 1 | 1 |
| 0 | 0 | 0 | 0 | 1 | 1 |

A

\*

| 1 | -1 |
|---|---|
| 6 | -6 |
| 3 | -3 |
| 5 | -5 |
| 11 | -11 |
| 11 | -11 |

X(L+1)

=

| 7 | -7 |
|---|---|
| 14 | -14 |
| 9 | -9 |
| 9 | -9 |
| 22 | -22 |
| 22 | -22 |

| | | | | | |   | | |   | | |
|---|---|---|---|---|---|---|---|---|---|---|---|
| 1 | 1 | 0 | 0 | 0 | 0 |   | 7 | −7 |   | 21 | −21 |
| 0 | 1 | 1 | 1 | 0 | 0 |   | 14 | −14 |   | 32 | −32 |
| 0 | 1 | 1 | 0 | 0 | 0 | * | 9 | −9 | = | 23 | 23 |
| 1 | 0 | 1 | 1 | 0 | 0 |   | 9 | −9 |   | 25 | −25 |
| 0 | 0 | 0 | 0 | 1 | 1 |   | 22 | −22 |   | 44 | −44 |
| 0 | 0 | 0 | 0 | 1 | 1 |   | 22 | −22 |   | 44 | −44 |

A        X(L+2)        X(L+3)

FIG. 32
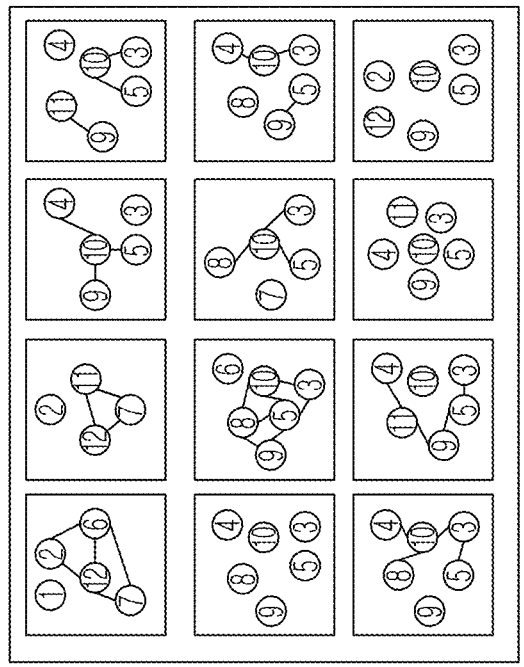
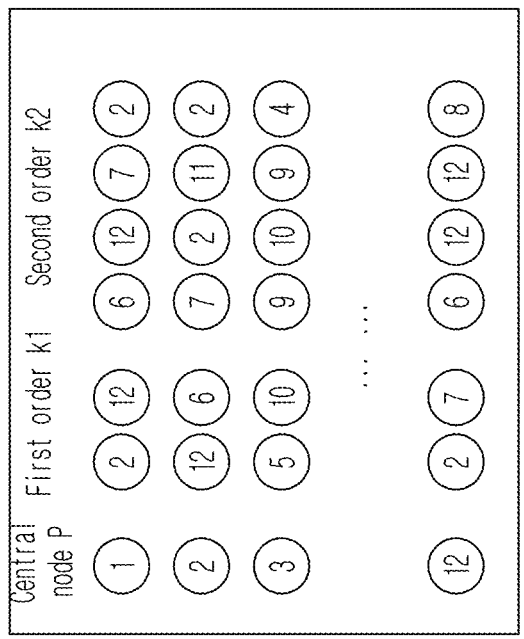
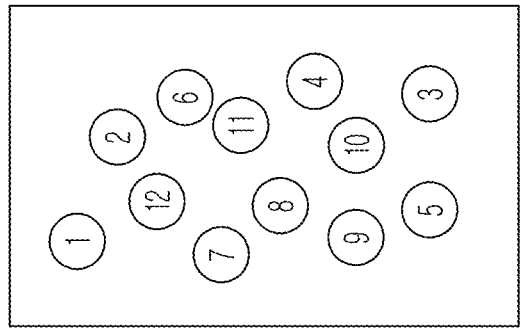

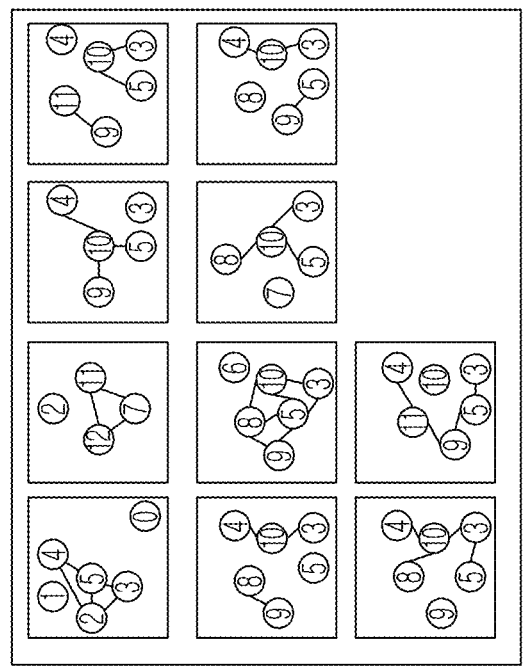
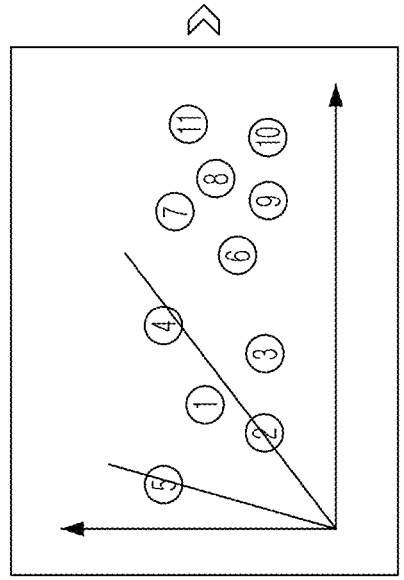
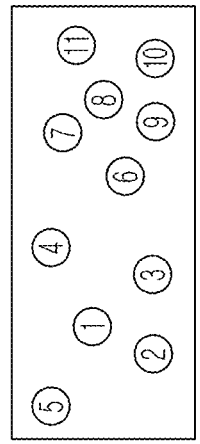
FIG. 34

FIG. 35
| | | 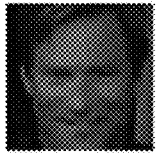 | 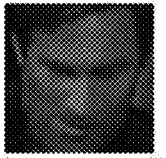 | 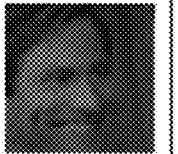 | 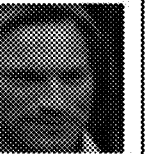 |
|---|---|---|---|---|---|
| 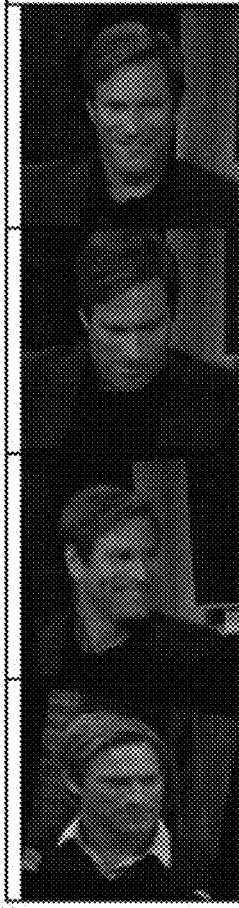 | 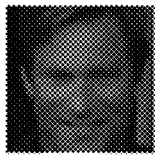 | O: 0.0<br>C: 1.0 | O: 0.80<br>C: 0.83 | O: 0.85<br>C: 0.81 | O: 0.86<br>C: 0.81 |
| |  | O: 0.80<br>C: 0.83 | O: 0.0<br>C: 1.0 | O: 0.88<br>C: 0.80 | O: 0.89<br>C: 0.80 |
| | 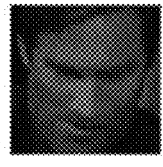 | O: 0.85<br>C: 0.81 | O: 0.88<br>C: 0.80 | O: 0.0<br>C: 1.0 | O: 0.93<br>C: 0.79 |
| |  | O: 0.86<br>C: 0.81 | O: 0.89<br>C: 0.80 | O: 0.93<br>C: 0.79 | O: 0.0<br>C: 1.0 |

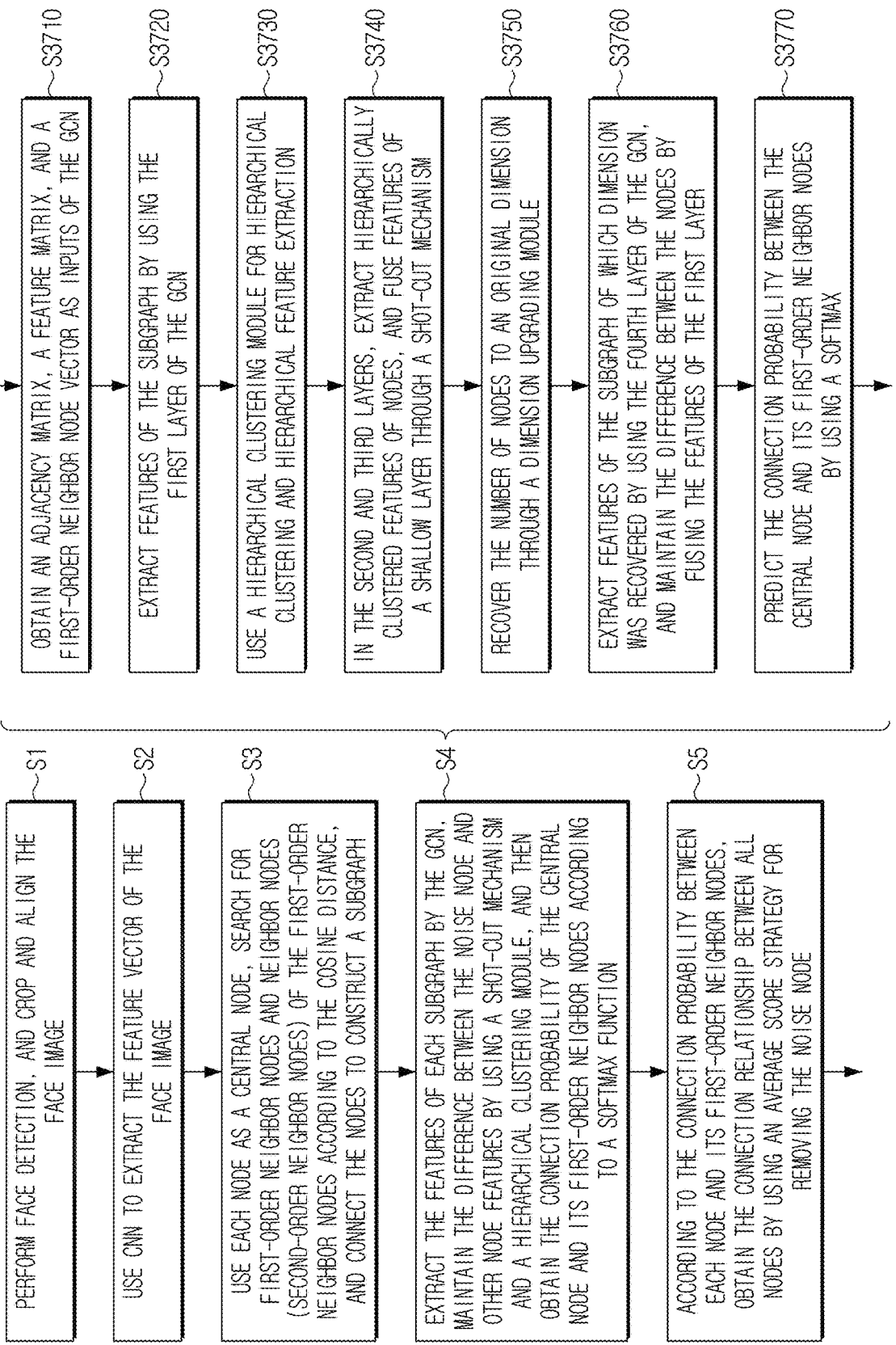

ELECTRONIC DEVICE AND CONTROL METHOD THEREOF

CROSS-REFERENCE TO RELATED APPLICATION(S)

This application is based on and claims priority under 35 U.S.C. § 119(a) of a Chinese patent application number 202010087492.8, filed on Feb. 11, 2020, in the China National Intellectual Property Administration, of a Chinese patent application number 202010726065.X, filed on Jul. 24, 2020, in the China National Intellectual Property Administration, of a Korean patent application number 10-2020-0149577, filed on Nov. 10, 2020, in the Korean Intellectual Property Office, and of a Chinese patent application number 202011311698.0, filed on Nov. 20, 2020, in the China National Intellectual Property Administration, the disclosures of each of which are incorporated by reference herein in their entirety.

BACKGROUND

1. Field

The disclosure relates to the field of image clustering technologies. More particularly, the disclosure relates to an image clustering method, an apparatus, an electronic device and a computer readable storage medium.

2. Description of Related Art

Clustering algorithm is the process of grouping individuals with same physical or abstract attributes into the same category through computer technologies, and data analysis and processing technologies. Respective categories generated by a clustering algorithm have similar abstract attributes. It is widely used in image processing and other fields.

Current commercial clustering algorithms usually use conventional clustering algorithms, such as clustering algorithms based on similarity measures (K-means), which need to determine clustering centers, and representativeness of the clustering centers directly affects the accuracy of subsequent clustering. Therefore, it is necessary to optimize existing image clustering methods.

The above information is presented as background information only to assist with an understanding of the disclosure. No determination has been made, and no assertion is made, as to whether any of the above might be applicable as related art with regard to the disclosure.

SUMMARY

Aspects of the disclosure are to address at least the above-mentioned problems and/or disadvantages and to provide at least the advantages described below. Accordingly, an aspect of the disclosure is to provide an image clustering method, apparatus, electronic device and a computer readable storage medium, the technical solution being as following.

Additional aspects will be set forth in part in the description which follows and, in part, will be apparent from the description, or may be learned by practice of the embodiments.

In accordance with an aspect of the disclosure, an image processing method is provided. The method includes obtaining the target areas of all images to be clustered, and obtaining the feature vectors of the target areas; and clustering the obtained feature vectors based on a graph convolutional network to obtain result.

In accordance with another aspect of the disclosure, an image processing apparatus is provided. The apparatus includes an acquisition module, configured to obtain target areas of all images to be clustered, and obtaining a feature vectors of the target areas, and a clustering module, configured to cluster the obtained feature vectors based on a graph convolutional network to obtain result.

In accordance with another aspect of the disclosure, an electronic device is provided. The electronic device includes one or more processors, a memory, and one or more application programs, wherein the one or more application programs are stored in the memory and configured to be executed by the one or more processors to execute operations corresponding to the image clustering method as described in the first aspect.

In a fourth aspect, a computer readable storage medium is provided, wherein the storage medium stores at least one instruction, at least one program, a code set, or an instruction set, the at least one instruction, the at least one program, the code set or the instruction set is loaded and executed by a processor to implement the image clustering method as described in the first aspect.

The beneficial effects brought by the technical solutions provided in the disclosure are set forth as follows.

Compared with the related art, the image clustering method, apparatus, electronic device and computer readable storage medium provided by the disclosure clusters target areas of respective images through a graph convolutional network without determining clustering centers, thereby avoiding deviation of a total clustering result caused by deviation of the clustering center, and can effectively improve accuracy of a clustering result.

Further, distance between nodes is calculated by using cosine similarity. Cosine distance distinguishes the difference between features from the direction. Regarding different poses, different illumination and different moments for one person, difference in facial features is relatively large, but still represents the same person. However, Euclidean distance reflects the absolute difference in value of features, if the Euclidean distance is used, it will cause two images of one person with different poses to be clustered into two persons. Therefore, the use of cosine distance in the disclosure can further improve accuracy of clustering.

Further, the disclosure introduces a shot-cut mechanism on a graph convolutional network to fuse output results of different layers of Graph Convolutional Network (GCN). And the closer to a back layer of the graph convolutional network, the smaller the difference between nodes in a same category, such that the difference between different nodes can be maintained to a certain extent, thereby avoiding clustering different nodes into a same category, and further improving accuracy of clustering.

Furthermore, hierarchical clustering module is introduced behind the original least one layer of original graph convolutional network, which can be used in any layers and can fuse nodes belonging to a same category during a transfer process of the graph convolutional network, that is, a clustering function has been completed for nodes within one graph convolutional network, thereby improving accuracy and efficiency of an entire clustering work.

Furthermore, a preset number of images can be obtained from each clustered category, and a new clustering result is obtained according to the images that have been clustered and new target areas. So the category of the new target areas to be clustered can be determined, which can be applied to small devices such as mobile phones with limited computing resources to improve clustering efficiency enhance user experience.

In accordance with an aspect of the disclosure, a method for controlling an electronic device is provided. The method includes the operations of obtaining a plurality of images for performing clustering, obtaining a plurality of target areas corresponding to each of the plurality of images, and obtaining a plurality of feature vectors corresponding to the plurality of target areas, obtaining a plurality of central nodes corresponding to the plurality of feature vectors, and obtaining neighbor nodes associated with each of the plurality of central nodes, obtaining a subgraph based on the plurality of central nodes and the neighbor nodes, identifying the connection probabilities between the plurality of central nodes of the subgraph and the neighbor nodes of each of the plurality of central nodes based on a graph convolutional network, and clustering the plurality of target areas based on the identified connection probabilities.

In accordance with another aspect of the disclosure, an electronic device is provided. The electronic device includes a memory storing at least one instruction, and a processor that is connected to the memory and controls the electronic device, wherein the processor is configured to, by executing the at least one instruction, obtain a plurality of images for performing clustering, obtain a plurality of target areas corresponding to each of the plurality of images, and obtain a plurality of feature vectors corresponding to the plurality of target areas, obtain a plurality of central nodes corresponding to the plurality of feature vectors, and obtain neighbor nodes associated with each of the plurality of central nodes, obtain a subgraph based on the plurality of central nodes and the neighbor nodes, identify the connection probabilities between the plurality of central nodes of the subgraph and the neighbor nodes of each of the plurality of central nodes based on a graph convolutional network, and cluster the plurality of target areas based on the identified connection probabilities.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description disclosure taken in conjunction with the accompanying drawings, in which:

FIG. 18 is a schematic diagram illustrating an adjacency matrix of a subgraph G in FIG. 17 without a weight according to an embodiment of the disclosure;

FIG. 19 is a schematic diagram illustrating an adjacency matrix of a subgraph G in FIG. 17 having a weight according to an embodiment of the disclosure;

FIG. 20 is a schematic diagram of a degree matrix of a subgraph G in FIG. 17 according to an embodiment of the disclosure;

FIG. 21 is a schematic diagram of a Laplacian matrix of a subgraph G in FIG. 17 according to an embodiment of the disclosure;

FIG. 23 is a schematic diagram of an adjacency matrix, a node feature of a first layer, and node features of a $(l+1)^{th}$ layer of a subgraph G in FIG. 22 according to an embodiment of the disclosure;

FIG. 24 is a schematic diagram of an adjacency matrix, node features of a $(l+1)^{th}$ layer, and node features of a $(l+2)^{th}$ layer of a subgraph G in FIG. 22 according to an embodiment of the disclosure;

FIG. 25 is a schematic diagram of an adjacency matrix, node features of a $(l+2)^{th}$ layer, and node features of a $(l+3)^{th}$ layer of a subgraph G in FIG. 22 according to an embodiment of the disclosure;

FIG. 32 is a schematic diagram of a solution for constructing a subgraph according to an embodiment of the disclosure;

FIG. 34 is a schematic diagram of a solution for constructing a subgraph according to an embodiment of the disclosure;

FIG. 35 is a schematic diagram of comparing results of similarity using Euclidean distances and cosine distances according to an embodiment of the disclosure;

FIG. 37C is a schematic flow chart of an image clustering method according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In order to make the objects, technical solutions and advantages of the disclosure clearer, the embodiments of the disclosure will be further described in detail below with reference to the accompanying drawings.

Clustering algorithm is the process of grouping individuals with same physical or abstract attributes into the same category through computer technologies, and data analysis and processing technologies. Respective categories generated by a clustering algorithm have similar abstract attributes. Clustering algorithm is one of important methods for data analysis and mining, and has been widely used in image processing, text analysis, speech recognition, and network management.

The current commercial clustering algorithms all refer to conventional clustering algorithms, such as: DBSCAN (Density-based Spatial Clustering of Application with Noise), IGDCA (Incremental Grid Density-Based Clustering Algorithm), clustering algorithm based on similarity measure (K-means), clustering algorithm based on measure of neighbor relationship (Shared Nearest Neighbor), etc. In practical applications and research, it is found that the accuracy of the existing conventional clustering algorithms is relatively low and cannot better meet actual commercial needs.

Figure 1:
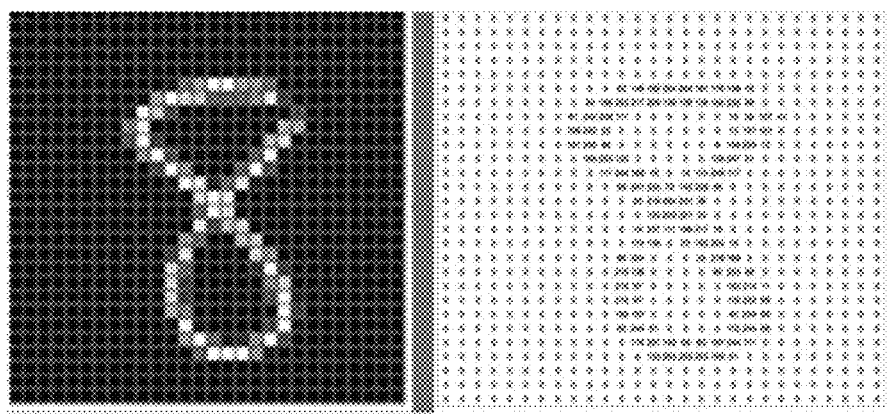
FIG. 1 is a schematic diagram of structured data of digital graphics according to an embodiment of the disclosure.

FIG. 1 is a schematic diagram of structured data of digital graphics according to an embodiment of the disclosure.

Figure 2:
FIG. 2 is a schematic diagram of structured data of voices/texts according to an embodiment of the disclosure.

FIG. 2 is a schematic diagram of structured data of voices/texts according to an embodiment of the disclosure.

Figure 3:
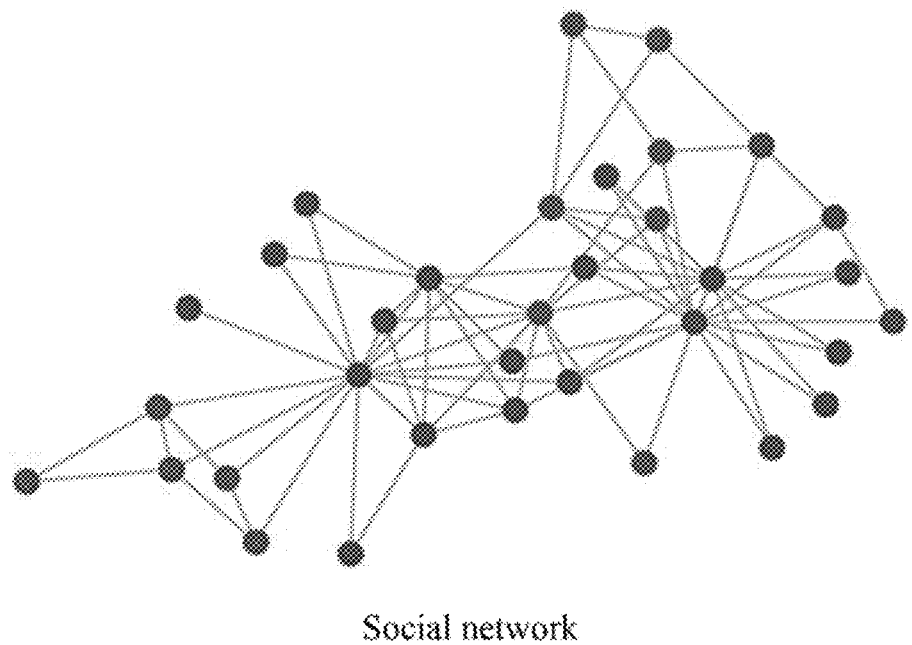
FIG. 3 is a schematic diagram of unstructured data in a network structure according to an embodiment of the disclosure.

FIG. 3 is a schematic diagram of unstructured data in a network structure according to an embodiment of the disclosure.

Referring to FIGS. 1 to 3, in recent years, with improvement of algorithms, more convenient data acquisition and increase of computer hardware speed, deep learning can obtain better accuracy and robustness in various tasks, and gradually replace conventional algorithms and becomes the mainstream. Convolutional Neural Networks (CNN) perform feature extraction through convolution, which can extract better features in image processing tasks than conventional feature extraction algorithms. Recurrent Neural Network (RNN) is a deep learning model that specifically solves sequence data, through which can better capture sequence features. Images and voices belong to European spatial data, which are characterized by structural rules. CNN and RNN can handle structured data such as images and voices well. The digital graphics (also referred to as digital images) shown in FIG. 1 and the voice or text shown in FIG. 2 are all structured data; however, these cannot process unstructured data like the social relationship network (also referred to as social network) shown in FIG. 3. Graph Convolutional Network (GCN) is specifically proposed to solve unstructured data.

Clustering algorithms are widely used in image processing (such as face clustering, animal clustering and object scene clustering, etc.), text analysis (such as text clustering, etc.), speech recognition (such as language analysis, etc.), and network management (such as 5G Terminal intelligent power saving management, etc.) and other fields.

Figure 4:
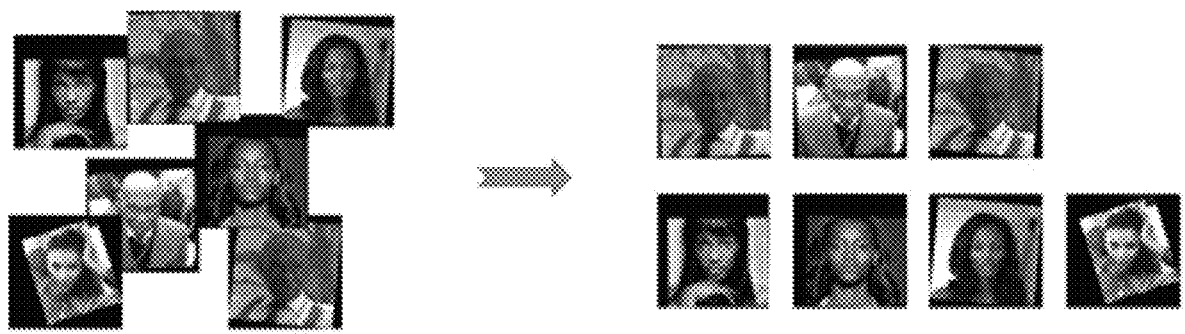
FIG. 4 is a schematic diagram of a solution of applying a clustering algorithm to a face image of the related art.

FIG. 4 is a schematic diagram of a solution of applying a clustering algorithm to a face image of the related art.

Referring to FIG. 4, face clustering is one of the common applications in album management, and as shown in FIG. 4, after face detection, face alignment and feature extraction are performed on images in an album, faces are clustered through a clustering algorithm (the example picture comes from the YTB data set). FIG. 4 is a schematic diagram of a solution of applying a clustering algorithm to a face image of the related art. Each category contains its own photos, which is convenient for users to manage specific photos.

The clustering and facial recognition system through graph convolutional network of the disclosure is supervised learning, which can be obtained by training based on annotated training data. Meanwhile, it can also realize unlabeled data management. In the real scene, a face image is very easy to obtain, but it will cost a lot of manpower and material resources to label a face category. Unlabeled data is clustered and labeled through the clustering algorithm, which can not only save a lot of manpower and material resources, but also improve accuracy of face recognition.

Figure 5:
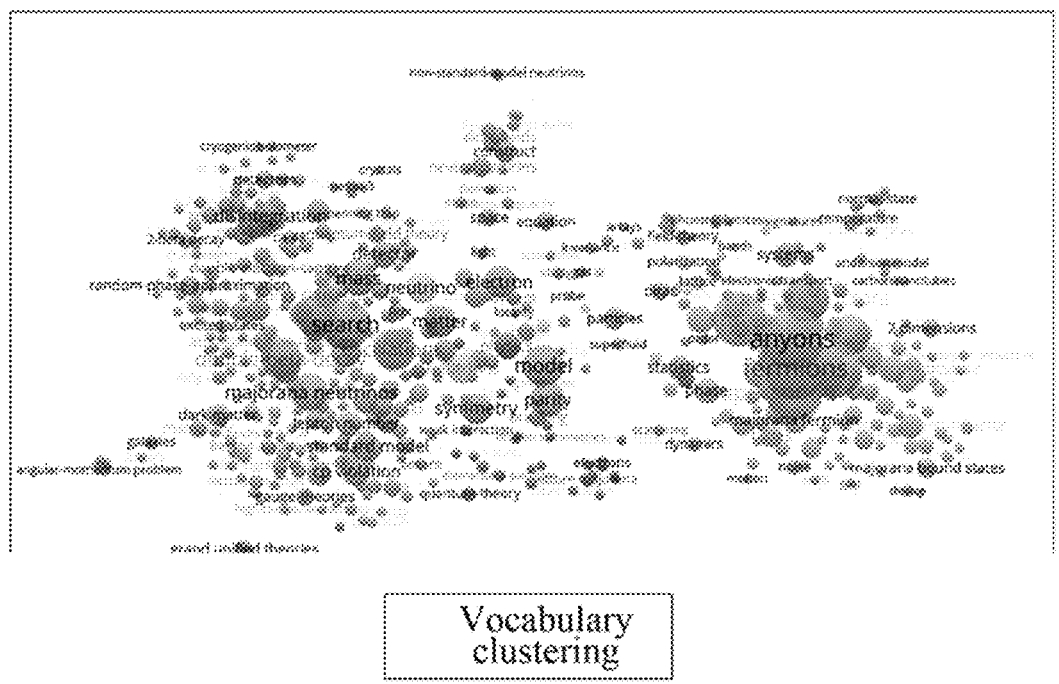
FIG. 5 is a schematic diagram of a solution of applying a clustering algorithm to vocabularies of the related art.

FIG. 5 is a schematic diagram of a solution of applying a clustering algorithm to vocabularies of the related art.

Referring to FIG. 5, vocabulary clustering extracts specific words in text for feature extraction and clustering, so that vocabularies with same attributes are clustered into one category to realize document/text analysis. For example, in movie reviews, it may cluster each movie review, reflect the user's evaluation of movie through clustering results, and count how many are positive reviews, how many are negative reviews, and how many are moderate reviews, which is convenient for movies scoring etc.

Figure 6:
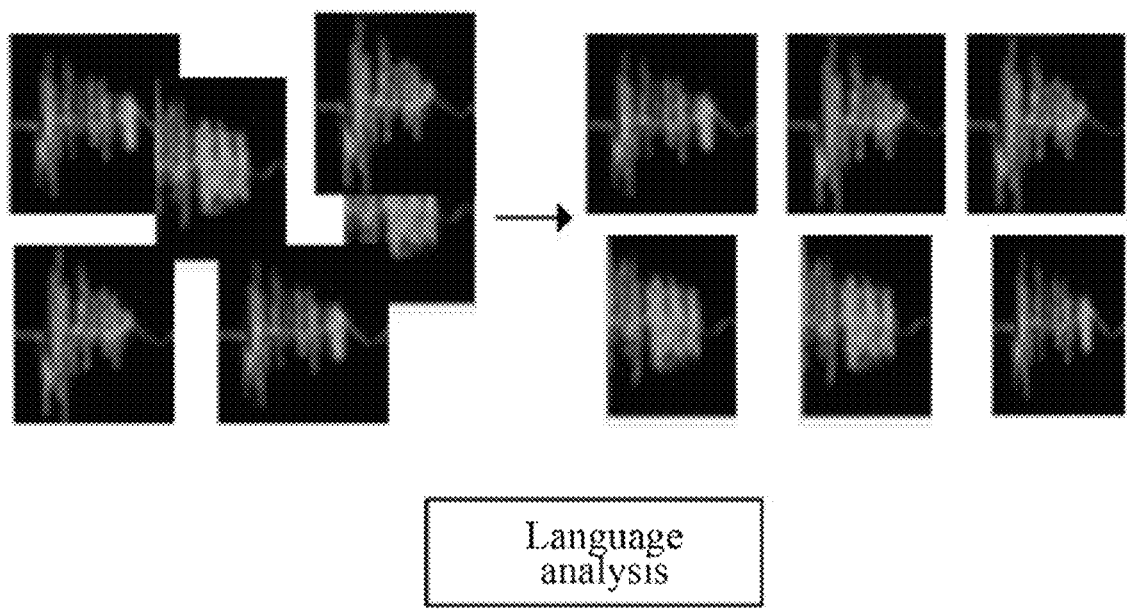
FIG. 6 is a schematic diagram of a solution of applying a clustering algorithm to voice information of the related art.

FIG. 6 is a schematic diagram of a solution of applying a clustering algorithm to voice information of the related art.

Referring to FIG. 6, language analysis means that, there are many languages around the world with further different dialects, and voice information obtained is clustered into multiple subcategories through a clustering algorithm. For example, in speech recognition, each language needs to be determined first, and then speech recognition can be performed, and functions such as machine translation can be completed. A recording may contain multiple languages, and it may first analyze and cluster the recording to determine which language each subcategory belongs to, and then perform recognition to improve the accuracy of speech recognition.

Figure 7:
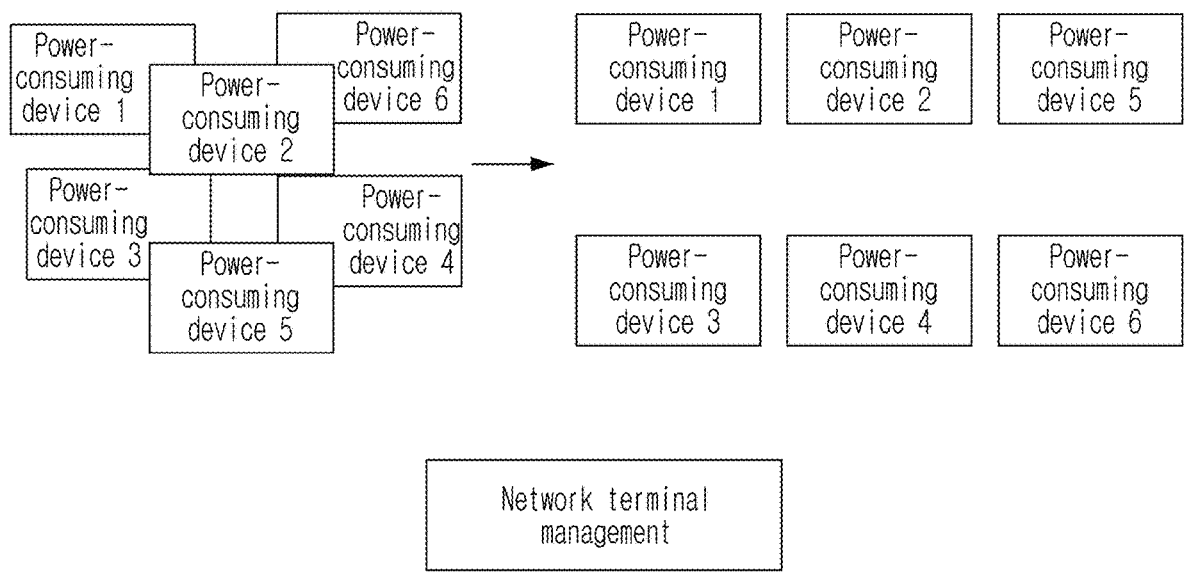
FIG. 7 is a schematic diagram of a solution of applying a clustering algorithm to network terminal management of the related art.

FIG. 7 is a schematic diagram of a solution of applying a clustering algorithm to network terminal management of the related art.

Referring to FIG. 7, network terminal management means that 5G is commercially available, which is convenient for people's lives, but the power consumption of 5G base stations is 12 times than 4G, and therefore, intelligent power-saving management of base stations can effectively reduce cost of 5G services. For example, a 5G base station is composed of multiple components, and each component has different power consumption. According to a clustering algorithm, devices with same power consumption attributes are grouped into subcategories, and the power consumption attributes are analyzed and managed in a targeted manner to improve node management efficiency and avoid waste of resources.

In order to solve the problem of grouping A-category faces and B-category faces into one category when the A-category face photos include B-category faces in face clustering, the related art proposes a two-stage clustering algorithm combining full clustering and incremental clustering. First, a part of face data is selected for full clustering, and then incremental clustering is performed on the basis of full clustering. The specific implementation is as follows:

Full clustering, as the name implies, is to cluster all face data, to determine part of the clustering category before incremental clustering, which provides a category basis for subsequent clustering of new face data.

Figure 8:
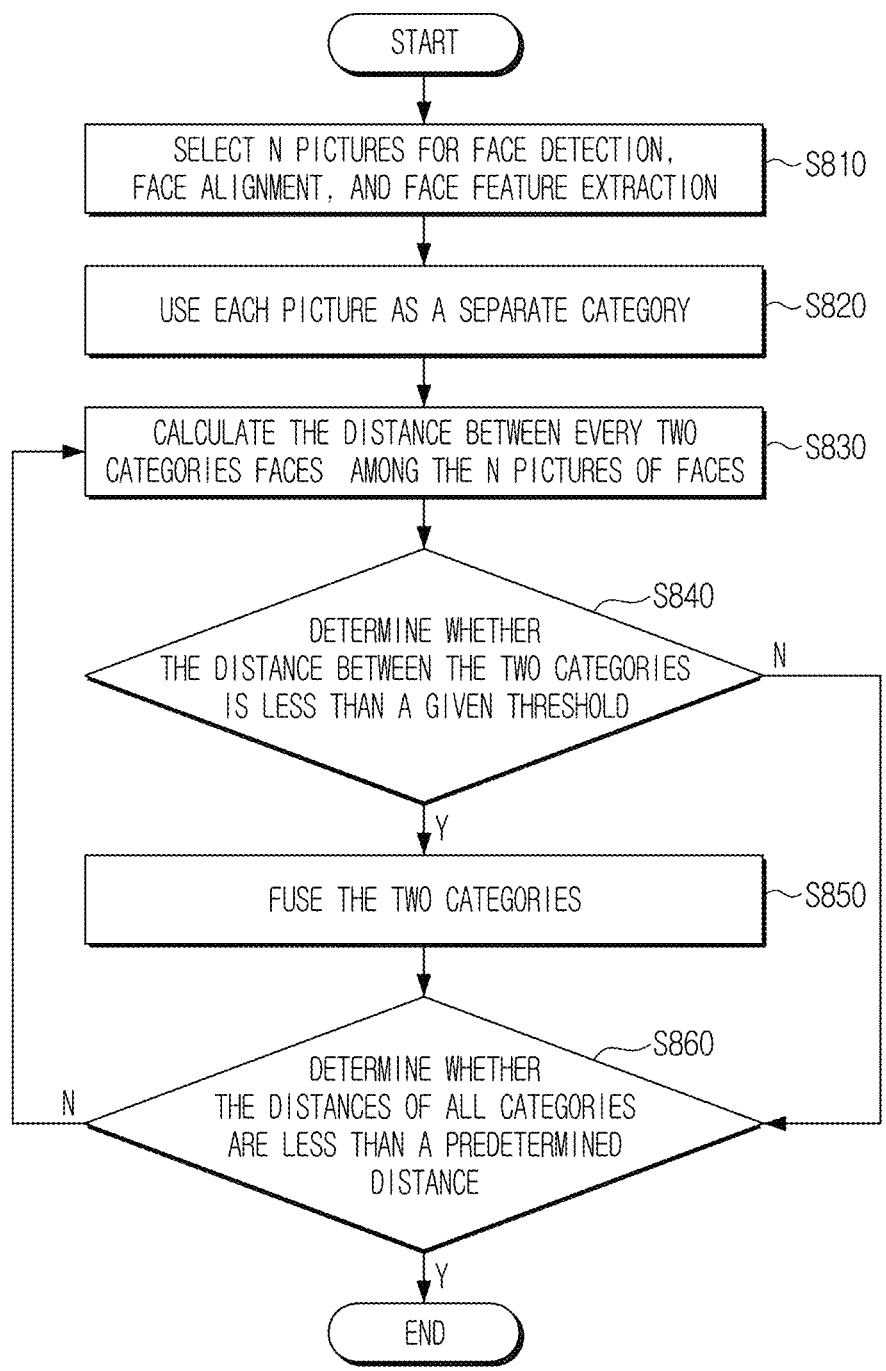
FIG. 8 is a schematic flow chart of an entire clustering solution of the related art.

The implementation flow chart of full clustering is shown in FIG. 8. The specific implementation process is as follows:

FIG. 8 is a schematic flow chart of an entire clustering solution of the related art.

1) For face detection, face alignment, and face feature extraction, select N pictures at operation S810, and use each picture as a separate category at operation S820;
2) calculate the distance between every two categories of faces among the N pictures of faces at operation S830;
3) determine whether the distance between the two categories is less than a given threshold at operation S840; and if the distance is less than the given threshold at operation S840-Y, fuse the two categories at operation S850, and the two categories are combined into one category; and if the distance is greater than the threshold at operation S840-N, the two categories are identified as two separate categories;

4) Repeat operation 2) until all distances between the face categories are greater than the given threshold, and determine whether all distances between the categories are less than the threshold at operation S860. Then, end the process in case all distances between the categories are less than the threshold at operation S860-Y, and this indicates that full clustering was completed.

Figure 9:
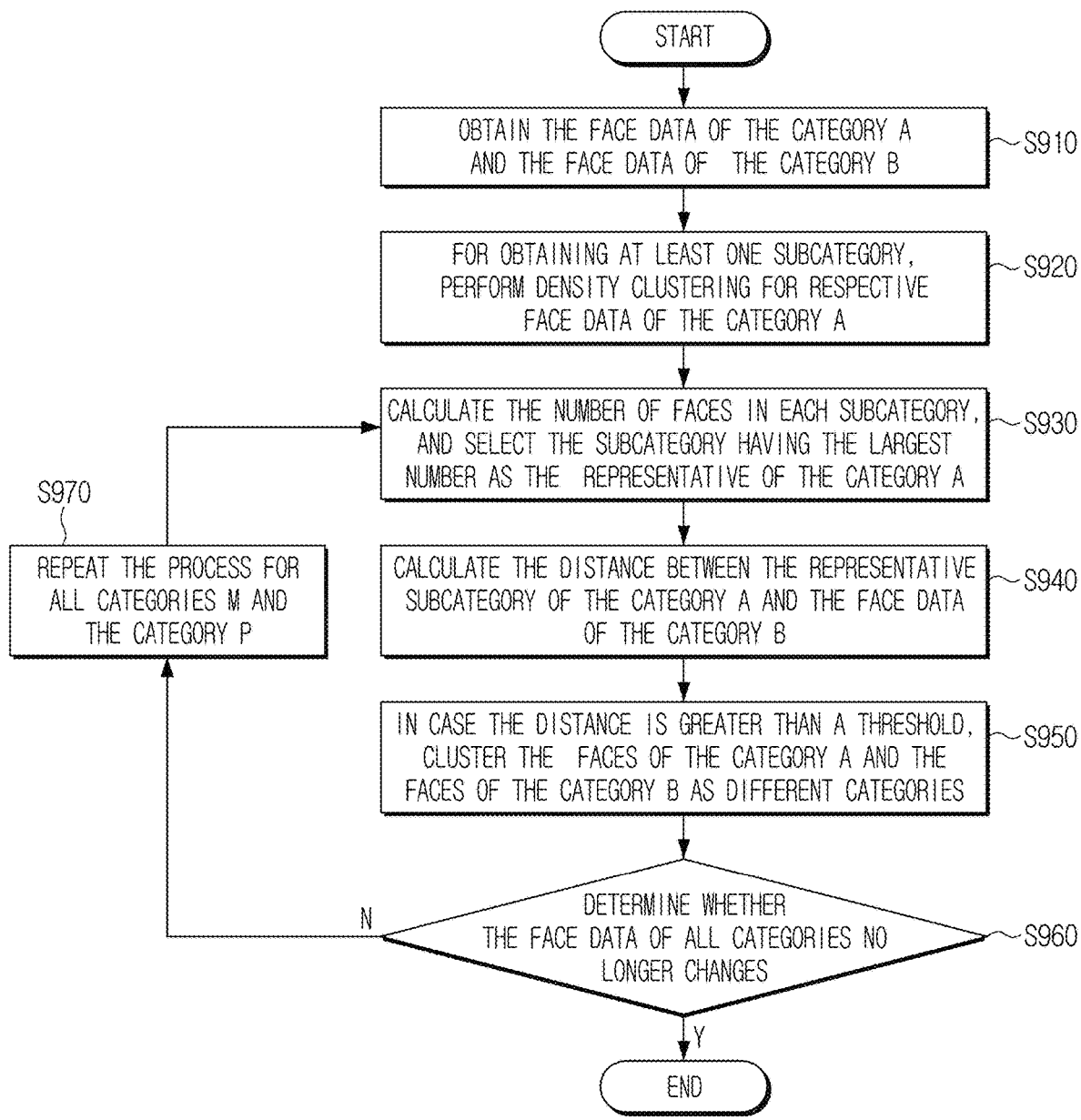
FIG. 9 is a schematic flow chart of a gradual clustering solution of the related art.

FIG. 9 is a schematic flow chart of a gradual clustering solution of the related art.

Referring to FIG. 9, full clustering is equivalent to the initialization of incremental clustering, but full clustering is used in the first face clustering, and subsequent clustering work is based on incremental clustering. The implementation flow chart of incremental clustering is shown in FIG. 9. The specific implementation is as follows:

1) count the number of categories M in last clustering, obtaining one of the M categories as category A, use newly added P faces feature information as P categories, and take one of the P categories as the category B; that is, obtain the face data of the category A and the face data of the category B at operation S910.

2) use the density clustering algorithm to re-cluster the face features in category A, and setting a lower threshold to get one category or more;

3) count the number of subcategories in category A, and selecting the subcategory with the largest number of faces as the representative of category A; that is, counter the number of faces in each subcategory, and select the subcategory having the largest number as the representative of the category A at operation S930.

4) calculate the distance between the representative subcategory of category A and the face data of category B at operation S940;

5) determine whether a distance between every two categories is less than a given threshold; if it is less than the given threshold, every two categories are combined into one category; if it is greater than the threshold, every two categories are two separate categories; that is, in case the distance is greater than the threshold, cluster the faces of the category A and the faces of the category B as different categories at operation S950.

6) repeat operation 1) until the number of faces in all categories no longer changes, indicating the end of clustering. That is, determine whether the face data of all categories no longer changes at operation S960, and in case the face data of all categories no longer changes at operation S960-Y, end the process. In case at least one of the face data of all categories changes at operation S960-N, repeat operation 1) at operation S910. That is, repeat operation 1) for all categories M and the category P at operation S970.

Figure 10:
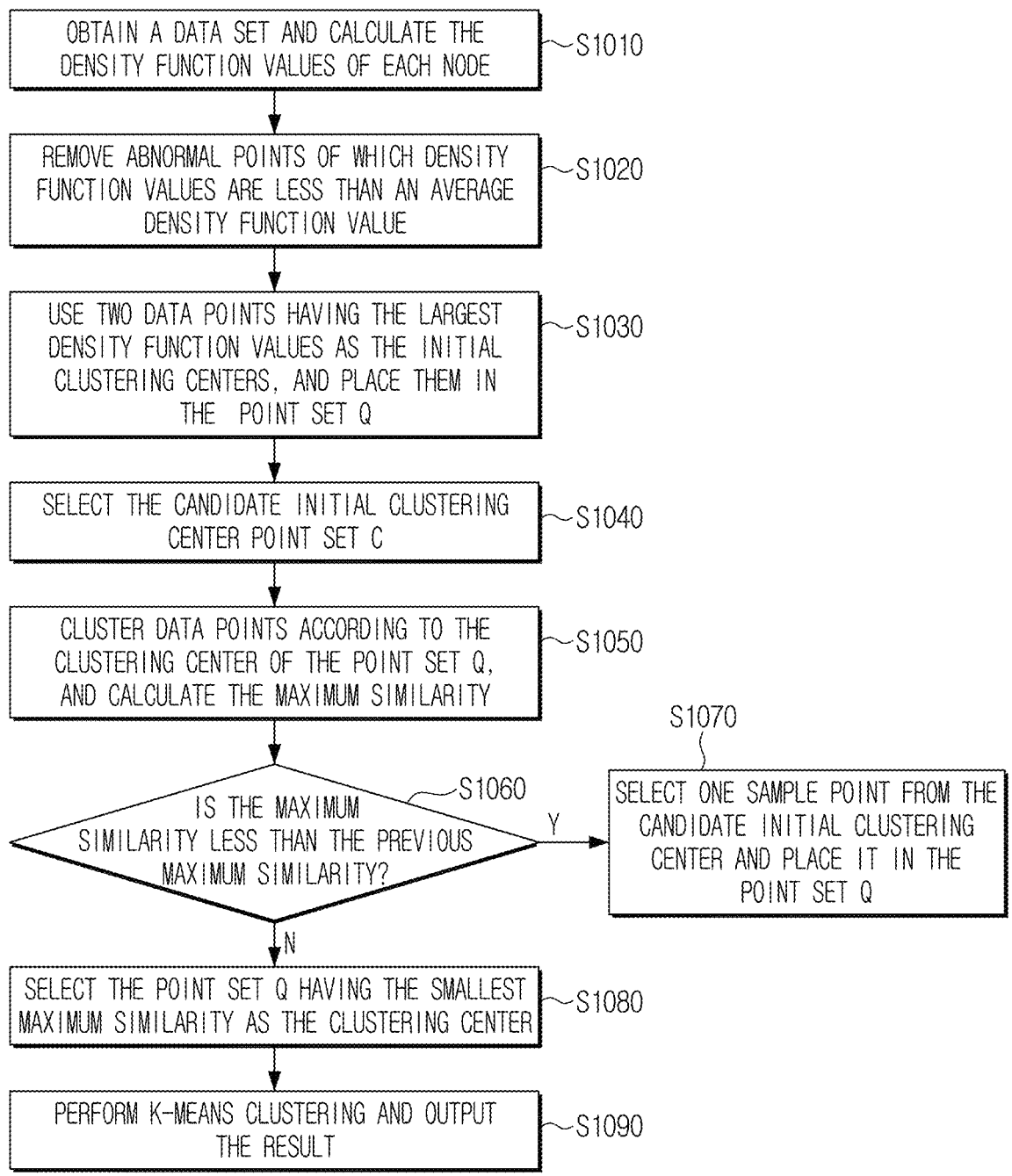
FIG. 10 is a schematic flow chart of a solution of a k-means clustering algorithm of the related art.

The k-means clustering algorithm is a commonly used clustering algorithm, k refers to clustering data into k categories, and means refers to calculating the mean value of all nodes in each subcategory and using it as the clustering center of the subcategory. In order to solve the problem that the initial clustering center of conventional clustering algorithm cannot guarantee the representativeness of its clustering center resulting poor clustering algorithm and clustering results, the related art proposes an optimized algorithm for a problem that the number of clusters k is difficult to select. As shown in FIG. 10, the specific implementation is as follows:

FIG. 10 is a schematic flow chart of a solution of a k-means clustering algorithm of the related art. S1: form all nodes to be clustered as a set M, and calculate the density function values of all nodes to be clustered. That is, obtain a data set, and calculate the density function values of each node at operation S1010, and combine nodes of which density function values are not less than an average density function value and form a dense point set Y; more specifically, remove abnormal points of which density function values are less than an average density function value at operation S1020.

S2: select two nodes from the dense point set Y, and form a set Q; specifically, use two data points having the largest density function values as initial clustering centers, and they may be placed in the point set Q at operation S1030.

S3: choose the m node from the set M by a focus statistics method, and form a set C of alternative initial clustering centers by the m node; that is, select a point set C of candidate initial clustering centers at operation S1040.

S4: Divide the nodes in the dense point set Y into categories wherein respective initial clustering centers are located in the set Q, and obtain the average maximum similarity of the first cluster; that is, cluster the data points according to the clustering centers of the point set Q, and calculate the maximum similarity at operation S1050.

S5: select a node from the set C of candidate initial clustering centers, adding the node to the set Q, as a new initial clustering center in the set Q, and deleting the node from C at the same time; Operation S4-S5 is repeated, and the minimum value of the average maximum similarity of clusters is selected by comparing the average maximum similarity of each cluster;

S6: use the clustering center in the set Q corresponding to the minimum value of the average maximum similarity of clusters as an initial clustering center with the optimal k-means clustering, and then performing k-means clustering to obtain the clustering result. That is, determine that the maximum similarity is less than the previous maximum similarity at operation S1060, and if the maximum similarity is less than the previous maximum similarity at operation S1060-Y, select one sample point from the candidate initial clustering centers and place it in the point set Q at operation S1070. Meanwhile, if the maximum similarity is not less than the previous maximum similarity at operation S1060-N, select the point set Q having the smallest maximum similarity as the clustering center at operation S1080. Then, perform k-means clustering and output the result at operation S1090.

Figure 11:
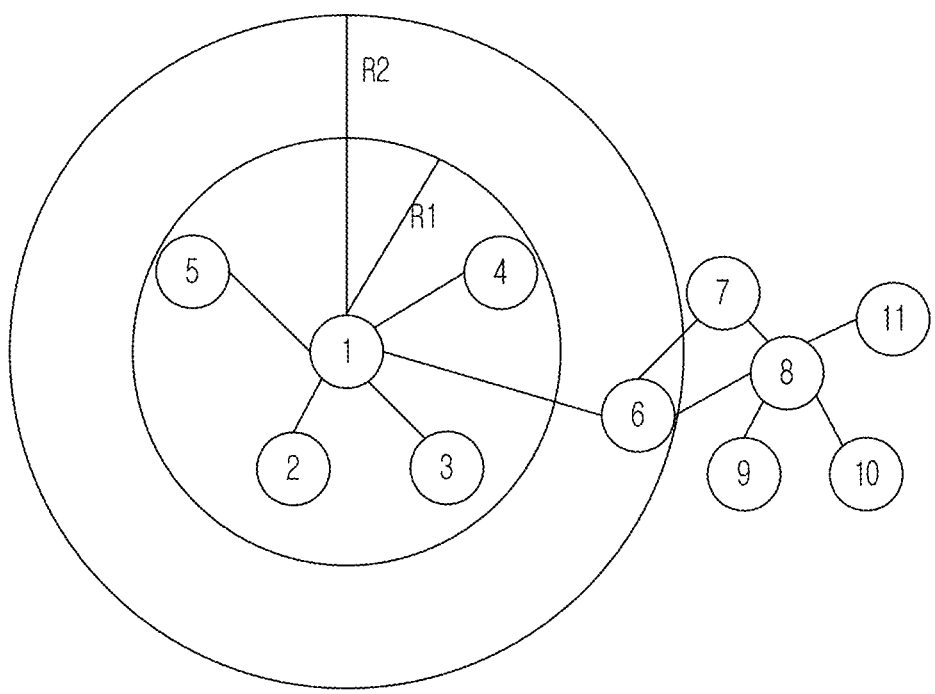
FIG. 11 is a schematic diagram of an influence of a threshold for a clustering result of the related art.

FIG. 11 is a schematic diagram of an influence of a threshold for a clustering result of the related art.

Problems in existing clustering algorithms include:

Referring to FIG. 11, in order to solve the problem of clustering A-category faces and B-category faces into one category when the A-category face photos include B-category faces in face clustering, a two-stage clustering algorithm combining full clustering and incremental clustering is provided. First, a part of face data is selected for full clustering, and then incremental clustering is performed on the basis of full clustering. This method can indeed avoid clustering two different categories into a same category to a certain extent. However, if a threshold is too high, the clustering algorithm will discard faces in edge, which may cause one category to be clustered into two categories. If a threshold is too low, the error of clustering two categories into a same category will also occur. And such error is cumulative in later clustering.

Figure 12A:
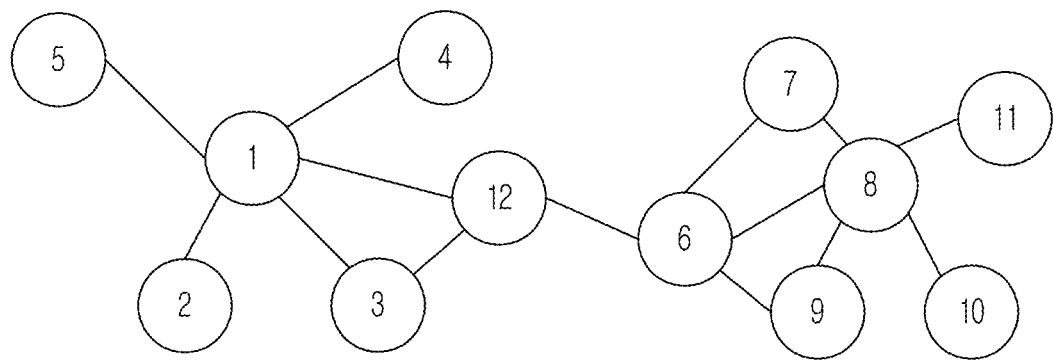
FIG. 12A is a schematic diagram of a clustering error caused by using a conventional clustering method in an embodiment of the disclosure.

FIG. 12A is a schematic diagram of a clustering error caused by using a clustering method according to an embodiment of the disclosure.

(B) Almost all existing clustering algorithms judge whether two cluster nodes belong to a same category based on a distance between the cluster nodes, but there may be a situation that "my neighbor's neighbor is not necessarily my neighbor," resulting in incorrect clustering results.

Referring to FIG. 12A, $12^{th}$ node belongs to the category of node 1, and $6^{th}$ node belongs to the category of $8^{th}$ node. However, the distance between $12^{th}$ node and $6^{th}$ node is relatively small. According to the conventional distance clustering algorithm, $12^{th}$ node and $6^{th}$ node are clustered into one category. While the distances between $6^{th}$ node and $7^{th}$ node, $8^{th}$ node, and $9^{th}$ node are smaller, and the relationship is closer, $6^{th}$ node is a neighbor ($12^{th}$ node) of $1^{st}$ node, which should belong to the category of $8^{th}$ node rather than the category of $1^{st}$ node.

(C) The existing clustering algorithms directly use original clustering data for clustering, which has poor clustering effect and low accuracy. In face clustering, for example, face detection, face alignment, and face feature extraction are performed on the collected images, however, due to the illumination and the difference between the frontal face and the side face, features of faces are quite different, and alternatively, clustering by simply using the original face features or clustering by using Euclidean distance may result in clustering of one person into two categories or clustering of different persons into one category.

Figure 12B:
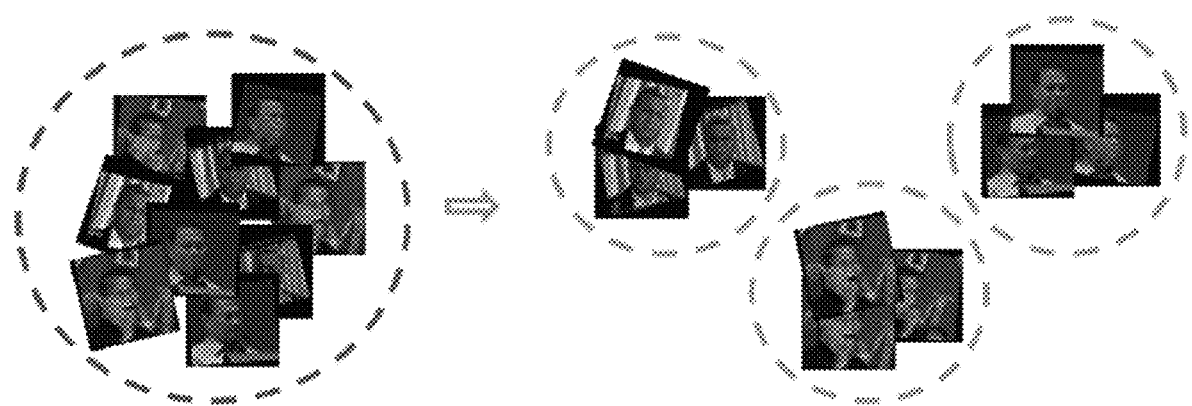
FIG. 12B is a schematic diagram of clustering a person to different people by using a conventional clustering method in an embodiment of the disclosure.

FIG. 12B is a schematic diagram of clustering a person to different people by using a clustering method according to an embodiment of the disclosure.

As shown in FIG. 12B, photos in the leftmost circle belong to a same category, however, the backgrounds, illumination conditions, image qualities, and shooting periods of each photo are different, and alternatively using Euclidean distance or original photo features for clustering may result in clustering photos of one person into multiple categories.

Figure 12C:
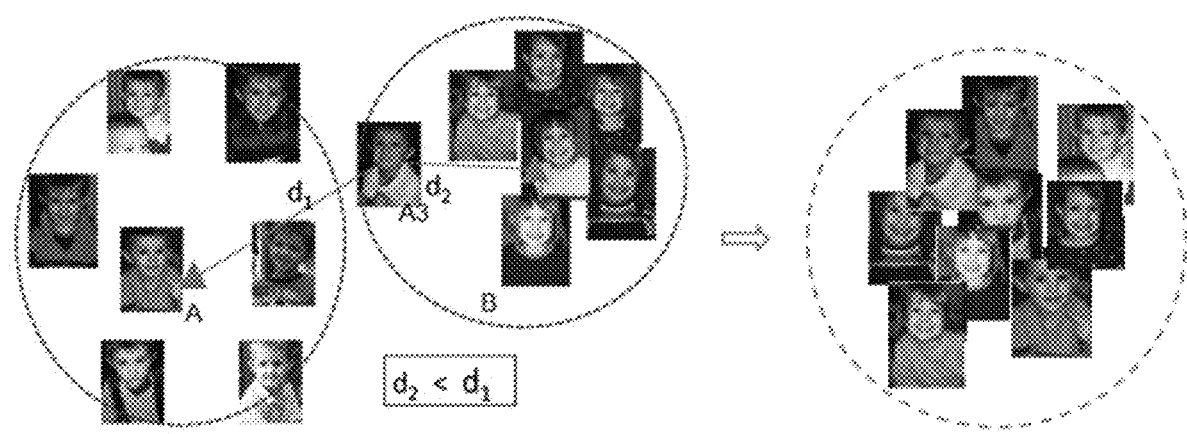
FIG. 12C is a schematic diagram of clustering different people to a same person by using a conventional clustering method in an embodiment of the disclosure.

FIG. 12C is a schematic diagram of clustering different people to a same person by using a clustering method according to an embodiment of the disclosure.

Referring to FIG. 12C, different categories may be clustered into one person under influence of illumination and posture. Category A is a photo of a little boy, category B is a photo of a little girl, and d1 and d2 represent the Euclidean distances between a photo A3 and categories A and B, respectively. Due to the influence of the external environment, it may result in d2<d1, and therefore, a clustering result may be that A and B belong to a same category.

(D) the conventional k-means clustering algorithm is an iterative solution clustering analysis algorithm, which requires constant iteration to select an appropriate K value and initial clustering center, which the algorithm is highly complex with low efficiency.

Figure 13A:
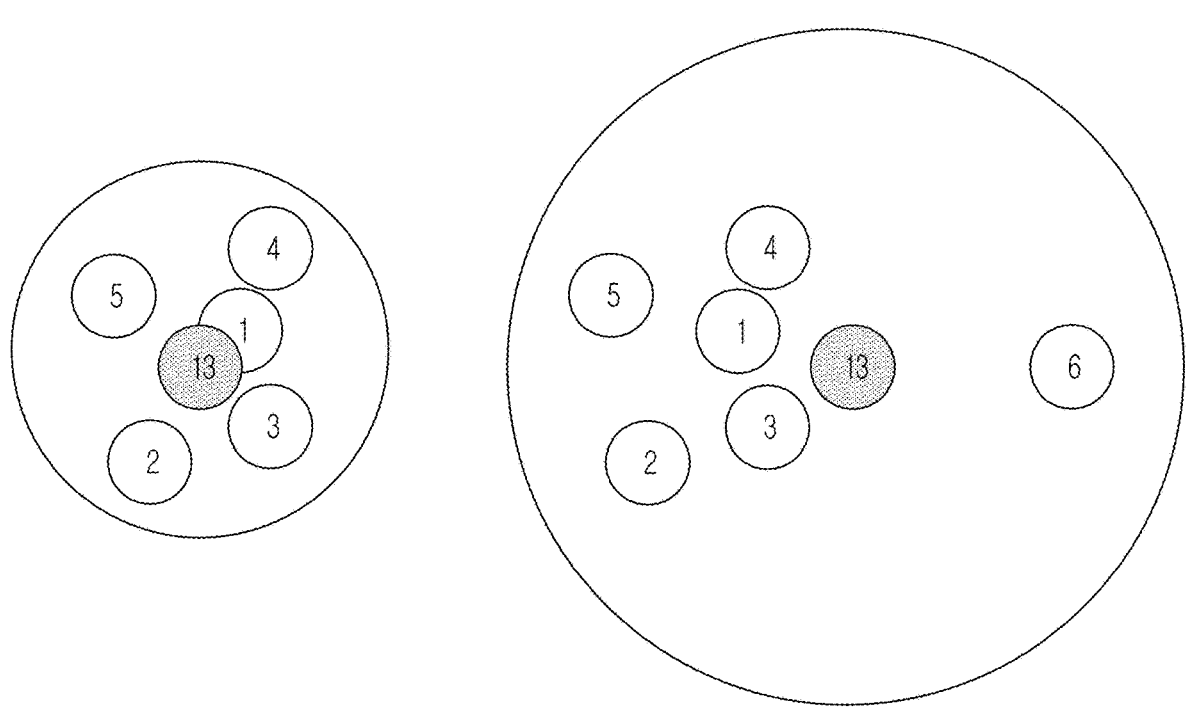
FIG. 13A is a schematic diagram illustrating an influence of a clustering center by using a conventional k-means algorithm in an embodiment of the disclosure.

FIG. 13A is a schematic diagram illustrating an influence of a clustering center by using a k-means algorithm according to an embodiment of the disclosure.

(E) Similar to the conventional k-means algorithm, many clustering algorithms need to determine a clustering center, and the representativeness of the clustering center directly affects accuracy of subsequent clustering. Especially in subcategories that are introduced with negative samples, the entire cluster center is offset due to the existence of negative samples, causing the clustering algorithm to become more inaccurate.

Referring to FIG. 13A, node 13 represents the clustering center in this category, wherein the left figure shows the clustering center when no negative sample is introduced, when the clustering has error due to introducing $6^{th}$ node with negative samples, the entire clustering center will be offset to the right, obviously causing the clustering to become more inaccurate.

(F) The related art proposes to use a simple GCN neural network to extract features of a subgraph, and the GCN clusters features between nodes during network transferring, reducing difference between features. If there are noise nodes in the subgraph, the differences between the noise node and other neighbor nodes will become smaller and smaller, and finally the noise node will be clustered into this category, which resulting in a clustering error.

Figure 13B:
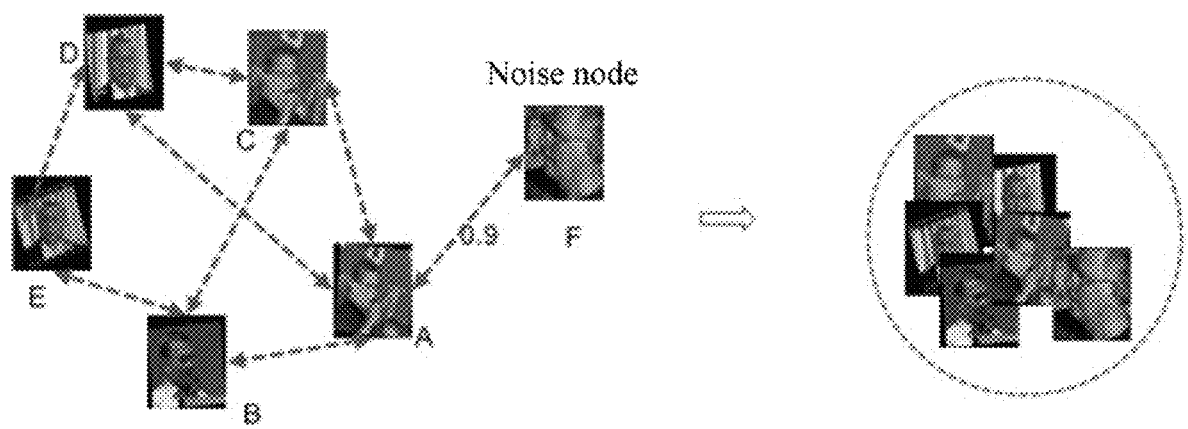
FIG. 13B is a schematic diagram of removing a noise node by using a conventional clustering method in an embodiment of the disclosure.

FIG. 13B is a schematic diagram of removing a noise node by using a clustering method according to an embodiment of the disclosure.

(G) The related art proposes to use GCN to predict probability between a central node and a neighbor node for clustering, but does not perform any post-processing. If there are noise nodes, it will inevitably lead to errors in neural network predictions, resulting in a final clustering error.

Referring to FIGS. 13B, A, B, C, D and E belong to a same category, wherein the probability of connection between F and A is 0.9, but there is no connection between F and other nodes, which F may be consequently considered as a noise node. But if there is no post-processing, F and other nodes will be clustered into one category, which resulting in a clustering error.

The disclosure provides a clustering algorithm with better accuracy and stronger robustness to solve the above problems. The innovations are:

A) a GCN-based clustering algorithm is provided and, the accuracy of the disclosure is higher, but the complexity is relatively low;

B) for the problem of "my neighbor's neighbor is not necessarily my neighbor" and the poor clustering effect caused by external factors such as illumination, a codec graph neural network is provided to map node features into another dimension space through an encoder within the neural network, and a hierarchical clustering module is provided in a conventional GCN layer to pre-cluster nodes with strong relationships and normalize features to determine a noise node; the hierarchical clustering module can extract hierarchical features of a subgraph, increase differences between the noise node and other nodes, such that through the hierarchical clustering module, differences between features of nodes with same attribute become smaller, and differences between nodes with different attributes becomes bigger;

C) an Average Score-based post-processing algorithm is provided to determine whether an isolated node is a noise node according to a neighbor relationship to improve the accuracy and stability of clustering;

D) full clustering is to cluster all nodes at the same time, and the complexity of the clustering algorithm increases as the number of clustered nodes increases; in order to reduce the time complexity of the algorithm, an efficient additional logic is provided, which can not only ensure the accuracy of the algorithm, but also reduce algorithm complexity;

E) a conventional clustering algorithm needs to determine a clustering center, and the representativeness of the clustering center directly affects accuracy of subsequent clustering; the novel clustering algorithm provided in the disclosure does not need to determine a clustering center, thereby avoiding the risk of an error of entire clustering caused by an error of a clustering center;

F) a shot-cut (residual connection) mechanism is provided within GCN to maintain differences between features, which is beneficial to eliminate noise nodes and improve the accuracy of the clustering; and, the shot-cut mechanism can alleviate a problem of excessive smooth of GCN.

G) by a process of using cosine distance instead of Euclidean distance, a cosine distance is more accurate than Euclidean distance, and it can judge similarity of nodes in a same category;

The technical solution of the disclosure and how the technical solution of the disclosure solves the above technical problems will be described in detail below with specific embodiments. The following several specific embodiments can be combined with each other, and the same or similar concepts or processes may not be repeated in some embodiments. The embodiments of the disclosure will be described below with reference to the drawings.

Figure 14:
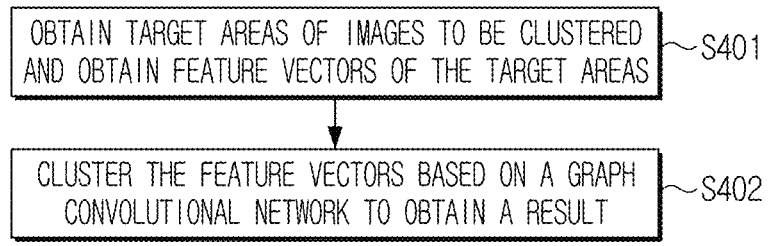
FIG. 14 is a schematic flow chart of an image clustering method according to an embodiment of the disclosure.

The embodiment of the disclosure provides a possible implementation manner. As shown in FIG. 14, an image clustering method is provided, which may include the following operations:

FIG. 14 is a schematic flow chart of an image clustering method according to an embodiment of the disclosure.

Operation S401: obtaining target areas of all images to be clustered, and obtaining feature vectors of the target areas.

Specifically, the target areas may be areas including targets to be detected, and the targets may be a human face, a specific object, etc. in the image.

In a specific implementation process, for at least one target area to be clustered, the target areas can be extracted from the image, and then the feature vector can be extracted from the target areas.

Operation S402: clustering the obtained feature vectors based on a graph convolutional network to obtain a result.

Wherein, GCN is a neural network structure that has become popular in recent years. Different from the conventional network models Long Short-Term Memory (LSTM) and CNN, which can only be used for grid-based data, a graph convolutional network is capable of processing data with a generalized topological graph structure and deeply exploring features and disciplines of the data with a generalized topological graph structure, e.g., PageRank reference network, social network, communication network, protein molecular structure, and other series of irregular data with spatial topological graph structure, which may further describe the graph convolutional network in the following.

Specifically, the subgraph corresponding to at least one feature vector can be obtained first, and then an adjacency matrix, a feature matrix and first-order neighbor vector, etc. of the subgraph are obtained; the adjacency matrix, the feature matrix and first-order neighbor vector, etc. of the subgraph are input into at least one layer of graph convolutional network for performing transformation in sequence (it can also be considered to perform feature extraction), and the transformed matrix is input into at least one layer of fully connected layer for classification to obtain a connection probability between the central node of the subgraph and each neighbor node.

In a specific implementation process, for at least one subgraph, the subgraph may include a central node and at least one neighbor node, and the connection probability between the central node and each first-order neighbor node is obtained respectively; if the connection probability is greater than the preset threshold, then the central node and the first-order neighbor nodes of which connection probability is greater than the preset threshold can be classified into one category.

Wherein, a first-order neighbor node is a neighbor node directly connected to the central node, and neighbor nodes may also include a second-order neighbor node, that is, a neighbor adjacent to the neighbor of the central node rather than a neighbor node directly connected to the central node.

In the above embodiments, target areas of all image are clustered through the graph convolutional network, without determining a clustering center, thereby avoiding deviation of entire clustering result due to deviation of the clustering center, and can effectively improve accuracy of clustering result.

In the following, the subgraph and graph convolutional network (also referred to as a graph convolutional neural network) will be described in further detail in conjunction with the accompanying drawings.

1) Definition of Graph

The definition of a graph in the disclosure is not a definition of a common image, but a graph definition of mathematical concepts.

The digital images, speech, and text belong to European spatial data and have fixed dimensions, therefore, the neural networks such as CNN or RNN can be used to extract features; unstructured data such as social networks have no fixed dimensions, and in order to deal with this kind of unstructured data, predecessors have proposed GCN neural network.

Figure 15:
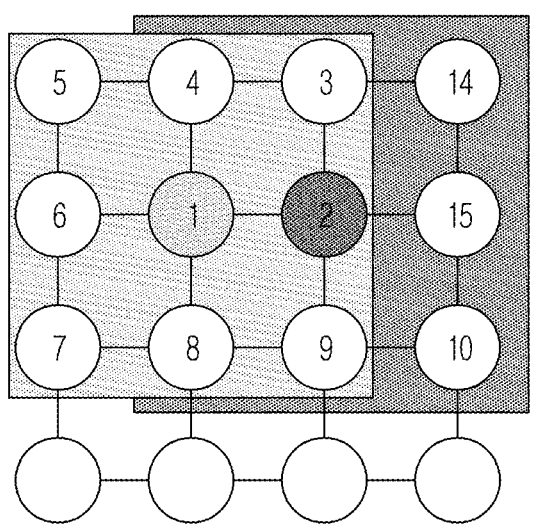
FIG. 15 is a schematic diagram of a subgraph structure of Euclidean spatial data according to an embodiment of the disclosure.

FIG. 15 is a schematic diagram of a subgraph structure of Euclidean spatial data according to an embodiment of the disclosure.

Referring to FIG. 15, if each pixel of an image is taken as a node of the graph, it can be seen from FIG. 15 that each node is a node with 8 fields, and a fixed-size convolution kernel can be used to extract the features of the image. For example, the neighbor nodes of $1^{st}$ node in FIG. 15 are {2, 3, 4, 5, 6, 7, 8, 9}, and a 3×3 convolution kernel can be used to extract features. The neighbor nodes of $2^{nd}$ node in FIG. 15 are {1, 3, 4, 8, 9, 10, 14, 15}, and a 3×3 convolution kernel can be used to extract features thereof. For the upper point of the boundary, you can fill in the zero to make it meet the 8-neighborhood feature, such as the $8^{th}$ node.

Figure 16:
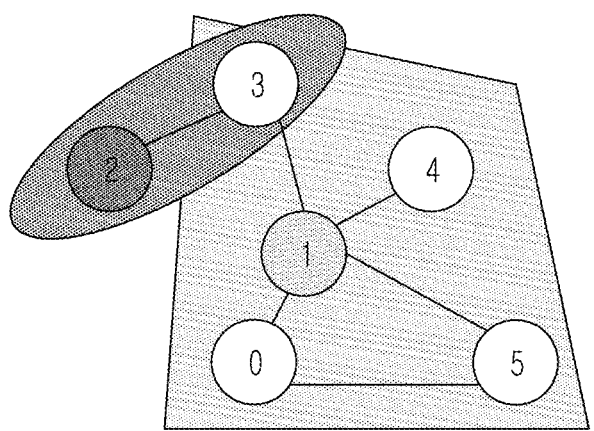
FIG. 16 is a schematic diagram of a subgraph structure of non-Euclidean spatial data according to an embodiment of the disclosure.

FIG. 16 is a diagram illustrating a subgraph structure of non-Euclidean spatial data according to an embodiment of the disclosure.

Referring to FIG. 16, for non-Euclidean spatial data, the number of neighbor nodes of each node is different, and a fixed size of convolution kernel cannot be used to perform feature extraction on the non-Euclidean spatial data. For example: the neighbor nodes of $1^e$ node in FIG. 16 is {0, 3, 4, 5}, and the number of neighbors is 4, which means that it requires to use a convolution kernel with a block whose size is 4 nodes to perform feature extraction. The neighbor node of $2^{nd}$ node in FIG. 16 is {3}, i.e., only one neighbor, which means that it requires to use a convolution kernel with a block whose size is 2 nodes to perform feature extraction. It can be seen that for data of non-Euclidean space, due to the different number of neighbors of each node, different convolution kernels need to be used for feature extraction, and conventional CNN and RNN cannot meet this demand. The GCN neural network can measure the relationship between non-Euclidean spatial data nodes through a graph adjacency matrix and Laplacian matrix.

The graph G=(V, E) is defined, where V represents a set of nodes and E represents a set of edges. Each node in the graph is represented by a vector of dimension D in order to calculate the result of the graph usually represented by an adjacency matrix of the graph.

Figure 17:
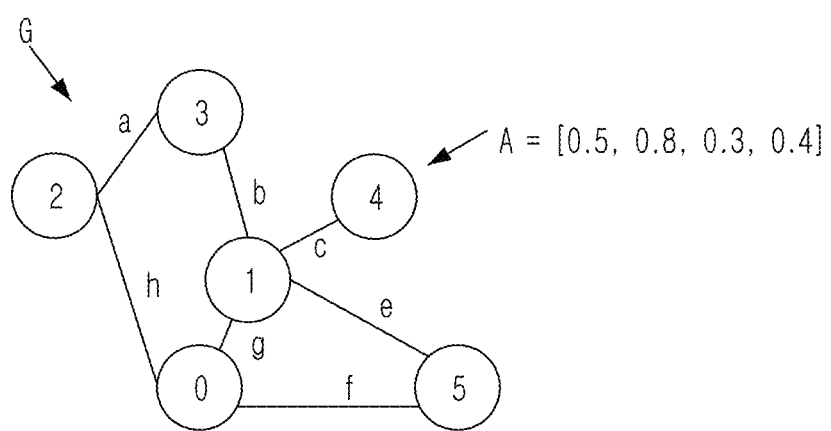
FIG. 17 is a schematic structural diagram of a subgraph G according to an embodiment of the disclosure.

FIG. 17 is a diagram for illustrating a subgraph G according to an embodiment of the disclosure.

Referring to FIG. 17, the structure can be represented by graph G, where V represents the set of nodes {0, 1, 2, 3, 4, 5}, E represents the set of edges {a, b, c, e, f, g, h}, where {a, b, c, e, f, g, h} represent weight of edges, N represents that there are 6 nodes, and A is the vector representation of node 4, and the dimension D thereof is 4.

FIG. 18 is a schematic diagram illustrating an adjacency matrix of a subgraph G in FIG. 17 without a weight according to an embodiment of the disclosure.

Referring to FIG. 18, in graph theory, the adjacency matrix of the graph and the Laplacian matrix of the graph are usually used to measure relationship between nodes in the graph. FIG. 18 is a representation of the adjacency matrix of graph G without weights. Usually, "1" is used to indicate that there is a connection between two nodes, and "0" indicates that there is no connection between two nodes.

FIG. 19 is a schematic diagram illustrating an adjacency matrix of a subgraph G in FIG. 17 having a weight according to an embodiment of the disclosure.

Referring to FIG. 19, FIG. 19 is a representation of a weighted adjacency matrix.

FIG. 20 is a schematic diagram of a degree matrix of a subgraph G in FIG. 17 according to an embodiment of the disclosure.

Referring to FIG. 20, the degree of a node in graph G indicates how many paths pass through the node, for example, the degree of node 0 is 3. The degree matrix D of the graph G is shown in FIG. 20, and the degree matrix only has values on the diagonal, which is expressed as the degree of the node, and the remaining positions are 0.

FIG. 21 is a schematic diagram of a Laplacian matrix of a subgraph G in FIG. 17 according to an embodiment of the disclosure.

Referring to FIG. 21, the Laplacian matrix of the graph G is L=D−A.

2) Definition of Graph Convolution $$X^{(l+1)} = \sigma(AX^{(l)}W^{(l)} + b^{(l)}) \qquad \text{Equation . . . (1)}$$

Wherein, $X^{(l)}$ represents the node features of the $l^{th}$ layer; σ represents the nonlinear transformation; A represents the adjacency matrix; $W^{(l)}$ represents the weight of the $l^{th}$ layer; $b^{(l)}$ represents the intercept of the $l^{th}$ layer; $X^{(l+1)}$ represents the node features of the $(l+1)^{th}$ layer.

The convolution operation on a graph is essentially an operation in which nodes in the graph are represented by their own features and neighbor node features. The result of the graph convolution is that difference between node features having a neighbor relationship is getting smaller and smaller, and difference between irrelevant nodes becomes greater, which means that the graph convolution itself has a clustering function.

Figure 22:
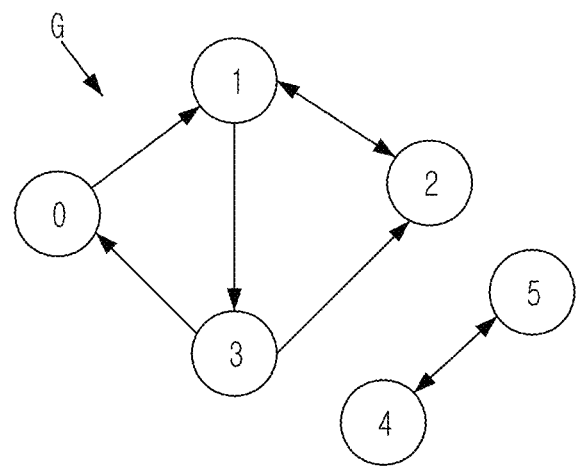
FIG. 22 is a schematic structural diagram of a subgraph G in another embodiment provided according to an embodiment of the disclosure.

FIG. 22 is a schematic structural diagram of a subgraph G according to an embodiment according to the disclosure.

Referring to FIG. 22, a graph G, and an adjacency matrix A is used to represent a graph G (usually considering that each node is connected to itself), and X represents feature vectors of each node in the graph G. It can be seen from the graph G that node 0, node 1, node 2, and node 3 belong to nodes in a same category, and node 4 and node 5 belong to nodes in a same category.

From the simplest point of view, the mathematical principles of GCN are explored. Assuming that when the value of the weight W is all 1, the value of the intercept (offset) b is all 0, and the nonlinear transformation employs the linear function y=x, the graph convolution formula can be expressed as:

$$X^{(l+1)} = A * X^{(l)} \qquad \text{Equation . . . (2)}$$

In the formula, $X^{(l)}$ represents the node feature of the $l^{th}$ layer; A represents the adjacency matrix; $X^{(l+1)}$ represents the node features of the $(l+1)^{th}$ layer.

FIG. 23 is a schematic diagram of an adjacency matrix, a node feature of a first layer, and node features of a $(l+1)^{th}$ layer of a subgraph G in FIG. 22 according to an embodiment of the disclosure.

Referring to FIG. 23, by using the graph G in FIG. 22, the adjacency matrix A, the node feature of the $l^{th}$ layer $X^{(l)}$, and the node features of the $(l+1)^{th}$ layer $X^{(l+1)}$ may be obtained as shown in FIG. 23.

From the above formula (2), the following formula (3) can be derived:

$$X(l+1) = A * X(1) \qquad \text{Equation . . . (3)}$$

FIG. 24 is a schematic diagram of an adjacency matrix, node features of a $(l+1)^{th}$ layer, and node features of a $(l+2)^{th}$ layer of a subgraph G in FIG. 22 according to an embodiment of the disclosure.

Referring to FIG. 24, according to the adjacency matrix A and the node features of the $(l+1)^{th}$ layer $X^{(l+1)}$ shown in FIG. 23, the node features of the $(l+2)^{th}$ layer $X^{(l+2)}$ shown in FIG. 24 may be obtained;

Similarly, the following formula can be derived:

$$X(l+3) = A * X(l+2) \qquad \text{Equation . . . (4)}$$

FIG. 25 is a schematic diagram of an adjacency matrix, node features of a $(l+2)^{th}$ layer, and node features of a $(l+3)^{th}$ layer of a subgraph G in FIG. 22 according to an embodiment of the disclosure.

Referring to FIG. 25, according to the adjacency matrix A and the node features of the $(l+2)^{th}$ layer $X^{(l+2)}$ shown in FIG. 24, the node features of the $(l+3)^{th}$ layer $X^{(l+3)}$ shown in FIG. 25 may be obtained;

Through $X^{(l+1)} = A * X^{(l)}$, it is found that the new feature representation of each node in graph G is the sum of the features of its neighbors and its own node. Each $X^{(l+1)} = A * V^{(l)}$ represents a layer of GCN network, and through the above calculation, it is found that if there is a relationship between nodes, that is, these nodes belong to nodes in a same category, as the GCN network is forwarded, the differences between similar nodes may become smaller. For example, node 4 and node 5 belong to a same category, and the features between these nodes are the same in subsequent GCN calculation; node 0, node 1, node 2, and node 3 belong to nodes in a same category, and their features between these nodes will become closer. The difference in features between nodes in different categories will become larger. It can be seen that GCN itself has the function of node clustering, so the disclosure uses GCN to realize the clustering function, which has rigorous mathematical and scientific basis.

As can be seen from the above graph, the feature value of the node will increase with depth of the GCN network, and the gradient may disappear or explode when calculating the gradient in back propagation, which seriously affects effectiveness of the algorithm Therefore, in practical applications, the features are usually normalized, but the characteristics of GCN do not change.

The adjacency matrix A is normalized by the degree matrix D of the graph, $A=D^{-1}*A$, so the formula of GCN becomes:

$$X^{(l+1)}=\sigma(D^{-1}AX^{(l)}W^{(l)}+b^{(l)}) \quad \text{Equation ... (5)}$$

$A=D^{-1}*A$ is transformed to $A=D^{(-1/2)}*A*D^{(-1/2)}$:

$$X^{(l+1)} = \sigma\left(D^{-\frac{1}{2}}AD^{-\frac{1}{2}}X^{(l)}W^{(l)} + b^{(l)}\right) \quad \text{Equation (6)}$$

Wherein, $X^{(l)}$ represents the node features of the $l^{th}$ layer; σ represents the nonlinear transformation; D represents the degree matrix; A represents the adjacency matrix; $W^{(l)}$ represents the weight of the $l^{th}$ layer; $b^{(l)}$ represents the intercept of the $l^{th}$ layer; $X^{(l+1)}$ represents the node features of the $(l+1)^{th}$ layer.

It is generally considered that each node has a connection with itself and joins self-circulation, so the calculation formula of GCN is:

$$X^{(l+1)} = \sigma\left(\hat{D}^{-\frac{1}{2}}\hat{A}\hat{D}^{-\frac{1}{2}}X^{(l)}W^{(l)} + b^{(l)}\right) \quad \text{Equation (7)}$$

Where: $X^{(l)}$ represents the node features of the $l^{th}$ layer; σ represents nonlinear transformation; A represents the adjacency matrix corresponding to node i; Â represents A+I, self-circulation, and I represents a diagonal matrix with a value of 1; $\hat{D}$ represents a degree matrix corresponding to Â; $W^{(l)}$ represents the weight of the $l^{th}$ layer; $b^{(l)}$ represents the intercept of the $l^{th}$ layer; $X^{(l+1)}$ represents the node features of the $(l+1)^{th}$ layer.

The above is a detailed introduction to graphs and graph convolutional networks, and the specific process of constructing subgraphs will be further described below in conjunction with the drawings and embodiments.

In a possible implementation manner of the embodiment of the application, the obtaining the feature vector of the target areas in operation S401 may include:
(1) detecting the feature points of the target areas, aligning the target areas based on the detected feature points, and obtaining the corresponding target transformation areas; and
(2) extracting the vector of the target transformation areas to obtain the feature vectors of the target areas.

In the specific implementation process, the transformation can be a process of direction conversion and alignment of the feature points. For example, for a human face, if the target areas containing a human face is extracted, but the human face is not in normal direction, feature points of the target areas containing a human face needs to be extracted, and the feature points are affine transformed to obtain a front image of the face.

Figure 26:
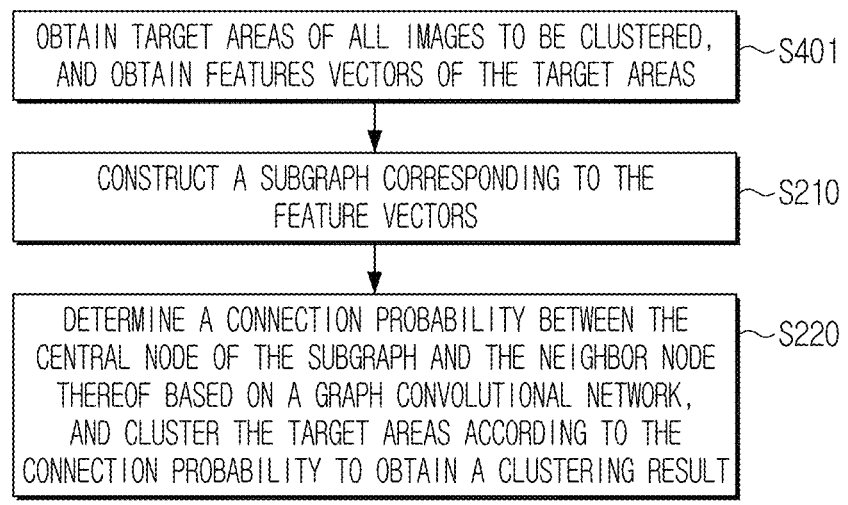
FIG. 26 is a schematic flow chart of an image clustering method according to an embodiment of the disclosure.

FIG. 26 is a schematic flow chart of an image clustering method according to an embodiment of the disclosure.

Referring to FIG. 26, in a possible implementation of the embodiment of the application, target areas of all images to be clustered may be obtained, and feature vectors of the target areas may be obtained at operation S401, as described above with regard to FIG. 14. Also, clustering the feature vectors based on the graph convolutional network to obtain the result at operation S402 may include:

Operation S210: constructing a subgraph corresponding to the feature vector, wherein the subgraph comprises a central node corresponding to the feature vector and at least one neighbor node corresponding to another feature vector.

Specifically, the feature vector can be used as the central node, the neighbor nodes corresponding to the central node can be obtained, and the subgraph of the feature vector can be constructed.

In the specific implementation process, the similarity between the feature vector and the other feature vectors can be obtained respectively, where the other feature vectors refer to the vector other than the feature vector among the multiple feature vectors corresponding to the target areas to be clustered; the neighbor nodes can be determined from other feature vectors according to the similarity between the feature vector and the other feature vectors.

Operation S220: determining a connection probability between a central node of the subgraph and a neighbor node thereof based on the graph convolutional network, and clustering the target areas according to the determined connection probability to obtain the clustering result.

Wherein, the neighbor node may be a first-order neighbor node, that is, a neighbor node directly connected to the central node.

Specifically, the corresponding input features can be obtained based on the subgraph, the input features are input into the graph convolutional network for transformation, and then the transformed matrix are input into a fully connected network to obtain a connection probability of the center node of the subgraph and each neighbor node.

In a specific implementation process, a first-order neighbor node with a connection probability greater than a preset threshold can be determined as the same category as the central node.

The specific process of constructing the subgraph will be described in detail below in conjunction with specific embodiments.

In the specific implementation process, the constructing the subgraph corresponding to the feature vector at operation S210 may include:
(1) obtaining, by taking the feature vector as the central node, a neighbor node of the central node from other feature vectors.

Wherein, the other feature vectors refer to feature vectors corresponding to data other than the central node.

Specifically, the neighbor nodes can be screened from the other feature vectors according to the similarity between the feature vector corresponding to the central node and other feature vectors.

In the specific implementation process, using the feature vector as the central node and obtaining neighbor nodes of the central node from other feature vectors, may include:
a. obtaining cosine distances between the feature vector and the other feature vectors respectively; and
b. screening a neighbor node of the feature vector form the other feature vectors based on cosine distances between the feature vector and other feature vectors.

The specific process of screening neighbor nodes will be described in detail below.

Wherein, cosine distance, also referred to as cosine similarity, is an algorithm that evaluates the similarity by calculating cosine values of the angle between two face feature vectors; for the two features A and B, a greater Euclidean distance between them means a greater difference therebetween; a greater cosine distance means a smaller difference therebetween.

(2) constructing the subgraph according to the central node and the neighbor node.

Specifically, after the neighbor nodes are screened from the feature vectors corresponding to other data, the subgraph is constructed according to the center node and at least one neighbor node obtained by the screening.

The foregoing embodiments describe the specific process of constructing subgraph. The following will take a face image as an example to further explain the image clustering method and the specific process of constructing subgraph provided in the application.

Figure 27A:
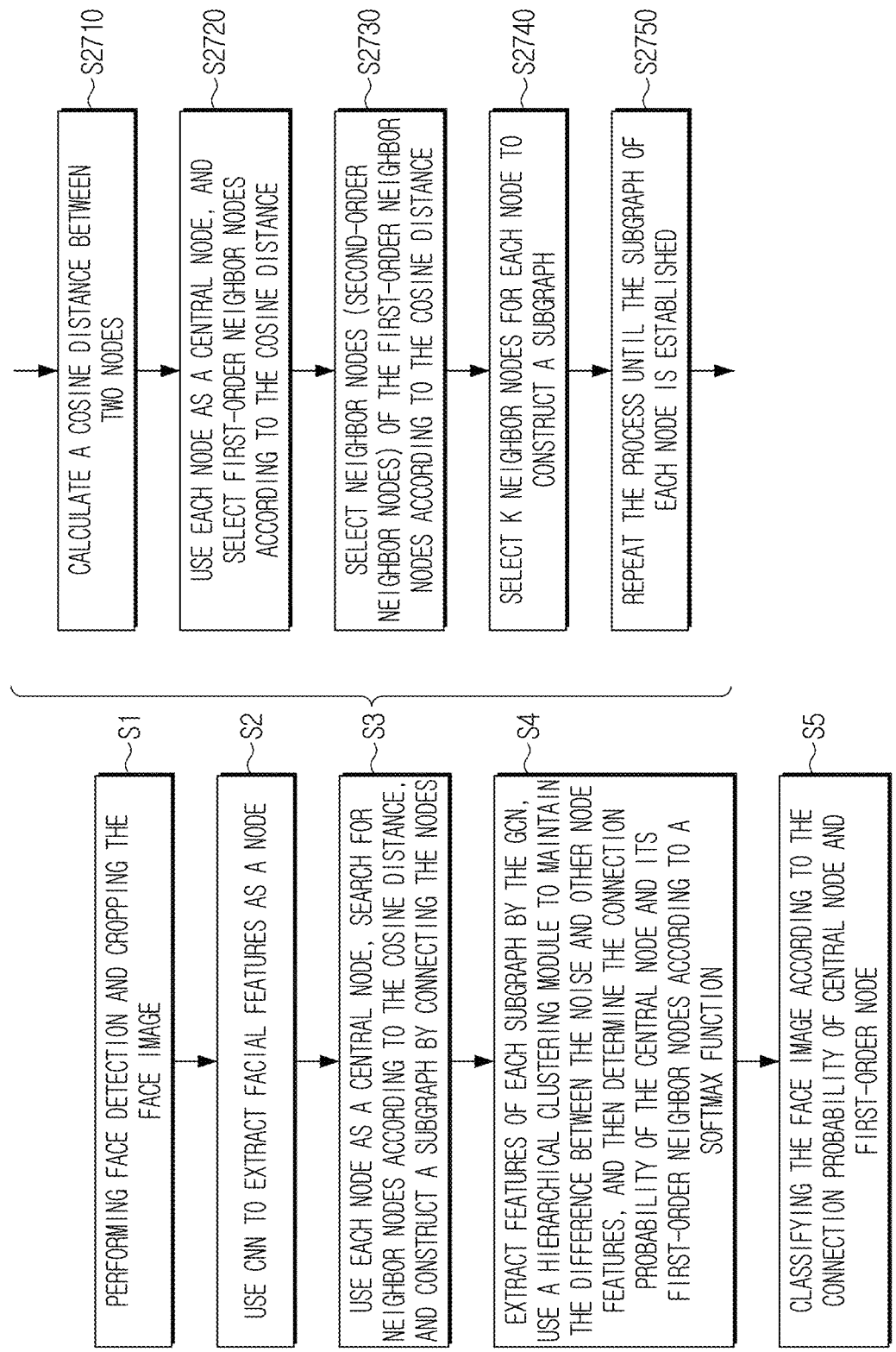
FIG. 27A is a schematic flow chart of an image clustering method according to an embodiment of the disclosure.

FIG. 27A is a schematic flow chart of an image clustering method according to an embodiment of the disclosure.

Referring to FIG. 27A, in an example, taking a face image as an example, the image clustering method may include the following operations:
- S1: performing face detection and cropping the face image;
- S2: using CNN to extract the feature vector of the face image, that is, the facial features shown in the figure, and using the extracted facial features as a node;
- S3: using each node as a central node, determining at least one neighbor node according to the cosine distance, and constructing a subgraph by connecting the central node and the neighbor nodes;
- wherein, operation S3 can include:
  - (1) calculating a cosine distance between two nodes at operation S2710;
  - (2) using each node as the central node, and selecting a first-order neighbor node according to the cosine distance at operation S2720;
  - (3) selecting the neighbor node of the first-order neighbor node according to the cosine distance, that is, a second-order neighbor node at operation S2730;
  - (4) selecting k neighbor nodes for each node to construct a subgraph, where k is a natural number at operation S2740; and
  - (5) repeating the above operations (1)-(4) until the subgraph of each node is constructed at operation S2750.
- S4. extracting the features of each subgraph by GCN; using the hierarchical clustering module to maintain the difference between the noise and other node features, and then obtaining the connection probability of the central node and its first-order neighbor nodes according to a softmax function; and
- S5. classifying a face image according to the connection probability of the central node and the first-order neighbor node.

FIG. 27A only shows operations S2 to S4. The conventional clustering method using Euclidean distance to calculate the distance between nodes will produce clustering errors. In this example, the cosine distance is used instead of Euclidean distance, which the cosine distance is more accurate than the Euclidean distance, and the similarity of nodes in a same category can be judged.

In the above operation S3, the cosine distance is used instead of Euclidean distance. A large number of experiments and academic circles have proved that cosine distance is more accurate than Euclidean distance and can more accurately judge the similarity of nodes in a same category.

Figure 27B:
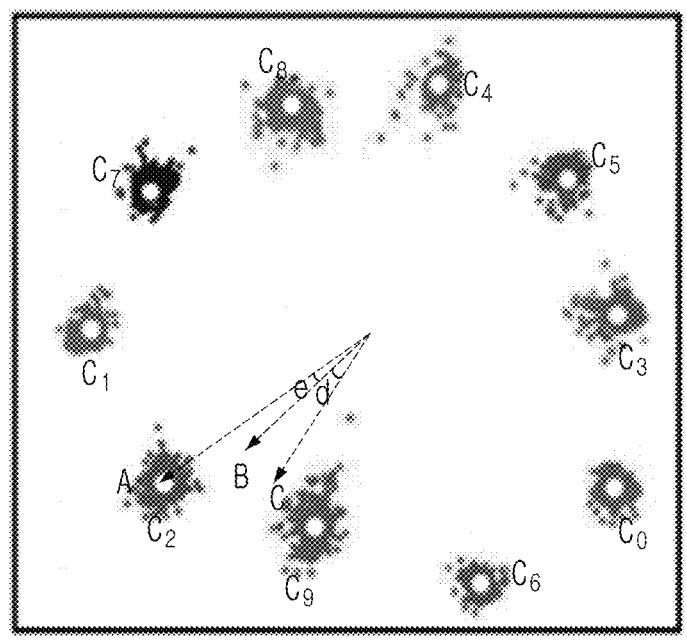
FIG. 27B is a schematic diagram of comparing Euclidean distances and cosine distances according to an embodiment of the disclosure.
Figure 27C:
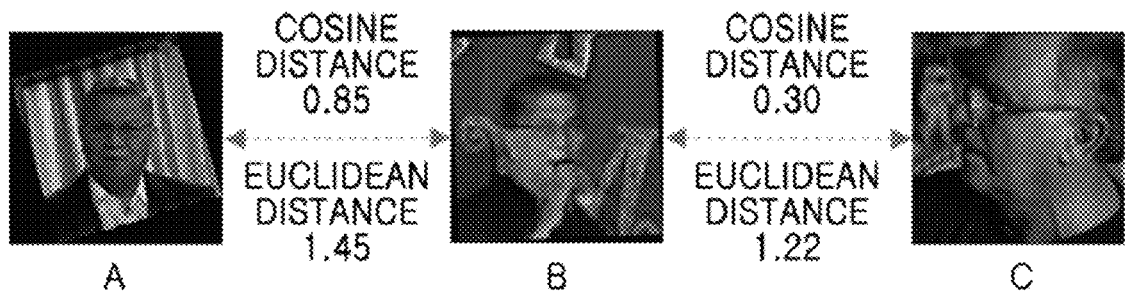
FIG. 27C is a schematic diagram of comparing Euclidean distances and cosine distances according to an embodiment of the disclosure.

FIG. 27B and FIG. 27C are schematic diagrams of comparing Euclidean distances and cosine distances according to various embodiments of the disclosure.

Referring to FIGS. 27B and 27C, the numbers 0 to 9 represent faces with different faces. A, B and C in FIG. 27B correspond to A, B and C in FIG. 27C. LAB represents the Euclidean distance between A and B, e represents the angle between A and B; LBC represents the Euclidean distance between B and C, and d represents the angle between B and C. The smaller angle corresponds to a larger cosine distance and a higher similarity between the two features.

A and B represent the same person, and C and A are not the same person. Since facial features of the same person are different according to different poses, illuminations, and moments, if Euclidean distance is used, clustering errors will be caused. For example, in FIG. 27C, the Euclidean distance between A and B is 1.45, and the Euclidean distance between B and C is 1.22, which B and C may be clustered into one category, and the result of clustering based on the Euclidean distance is wrong; the cosine distance may not result in an error, and using the cosine distance for similarity calculation is more accurate. In the same category, the angle between features is very small, so the cosine distance can be used to cluster more accurately.

Figure 28A:
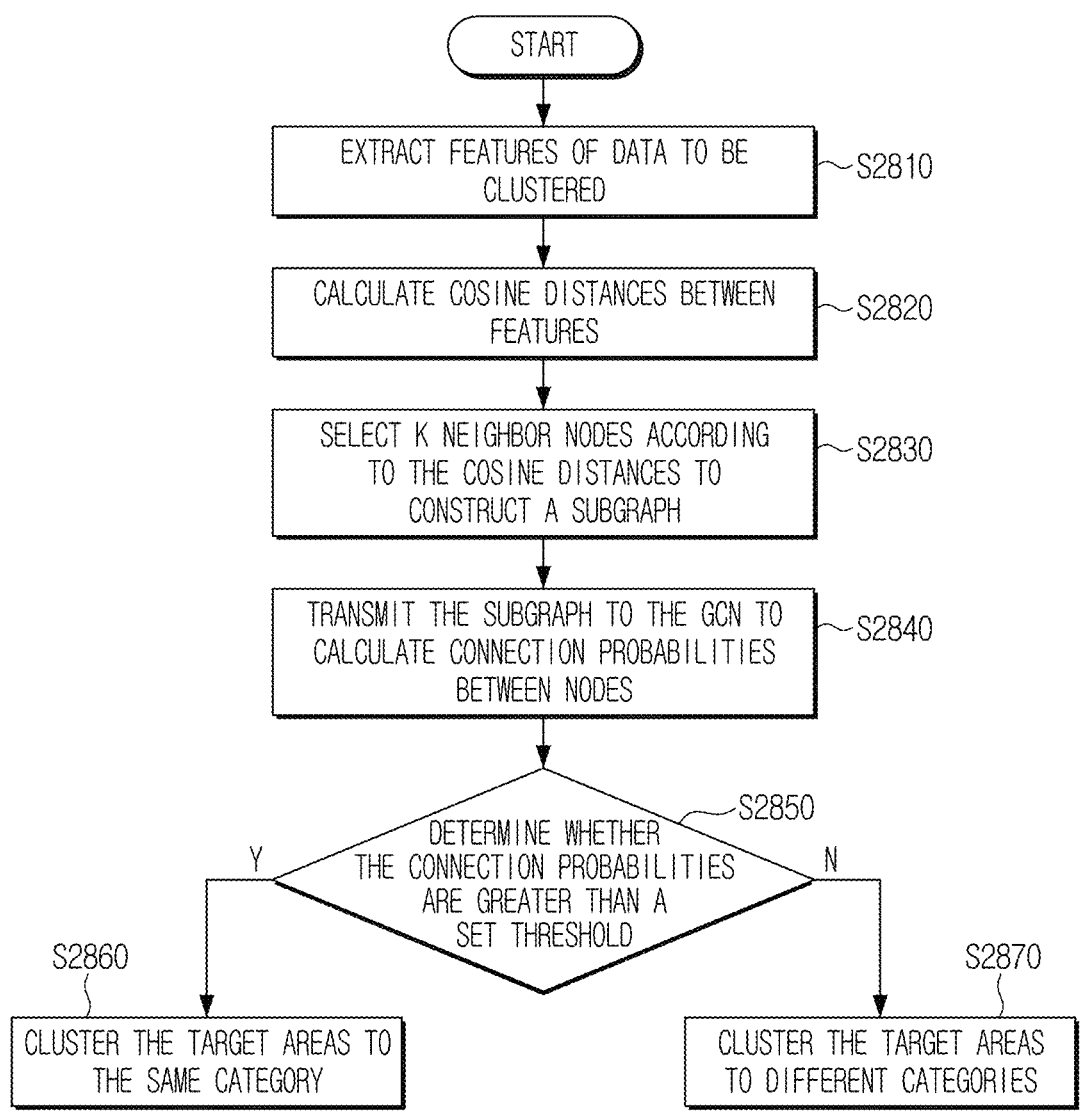
FIG. 28A is a schematic flow chart of an image clustering method according to an embodiment of the disclosure.

FIG. 28A is a schematic flow chart of an image clustering method according to an embodiment the disclosure.

Referring to FIG. 28A, in an example, taking a face image as an example, the image clustering method may include the following operations:
- S10: performing feature extraction on the collected data; that is, extracting the features of data to be clustered at operation S2810;
- S20: calculating the cosine distance between each node (face); that is, calculating the cosine distance between features at operation S2820.
- S30: using each node as a central node, finding its k neighbor nodes, and constructing a subgraph; that is, for constructing a subgraph, selecting k neighbor nodes according to the cosine distance at operation S2830.
- S40: using the GCN neural network to calculate a connection probability of the neighbor node and the center node for each subgraph, and forming each connection pair; and
- S50: clustering into one category, if the connection probability between the two nodes is greater than a set threshold; otherwise, clustering into two categories. Specifically, transmitting the subgraph to the GCN for calculating the connection probability between the nodes at operation S2840, and then, determining whether the connection probability is greater than a set threshold at operation S2850, and in case the connection probability between the two nodes is greater than the set threshold at operation S2850-Y, clustering the nodes into one category at operation S2860; and if the connection probability between the two nodes is not greater than the set threshold at operation S2850-N, clustering the nodes into two different categories at operation S2870.

In the above example, by calculating a cosine distance between nodes, a subgraph using each node as a center node is constructed, thereby calculating a connection probability between a central node of each subgraph and its first-order neighbor nodes, and judging whether the two nodes of each connection pair belong to a same category according the connection probability, which may improve the accuracy of the clustering.

Figure 28B:
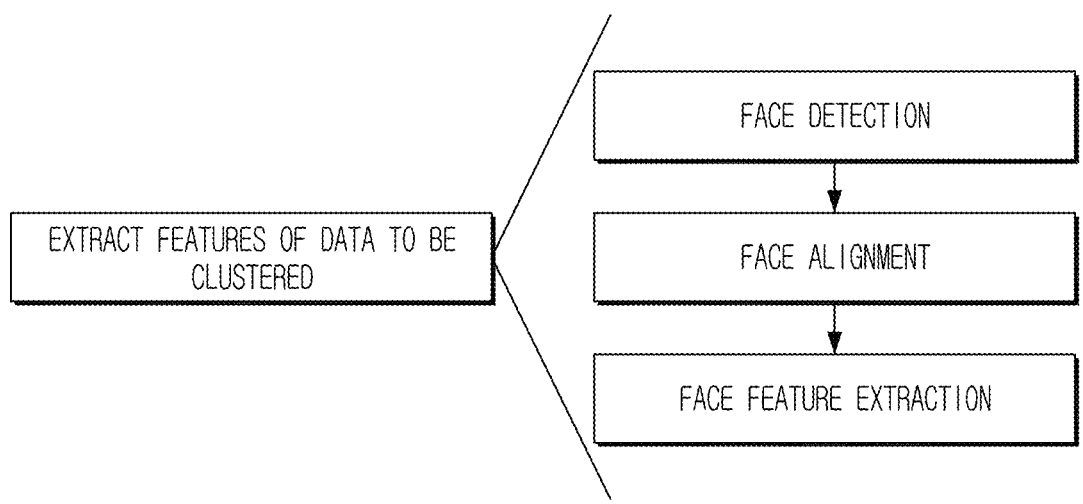
FIG. 28B is a schematic flow chart of feature extraction for data according to an embodiment of the disclosure.

FIG. 28B is a schematic flow chart of feature extraction for data according to an embodiment of the disclosure.

Referring to FIG. 28B, the performing feature extraction on the collected data in operation S10 includes a data preprocessing submodule and a feature extraction submodule:

the data preprocessing module includes: a face detection module, a face alignment module, and a face feature extraction module.

The face detection module is an algorithm for locating faces in collected images.

An original image contains more background information, and if the original image is used for clustering, different persons may be clustered into a same person under the same background conditions; while if a face detection algorithm is used to detect a face in the image, and crop and save the face, only the face is clustered in subsequent clustering, thereby avoiding a clustering error caused by background interference.

The cropped face image is normalized to the specified resolution size.

The face alignment module is an algorithm for correcting a tilted face image. A facial feature point detection algorithm is used to detect feature points of a face, and the detected feature points are used to perform affine transformation to obtain a front image of the face.

The feature extraction module uses deep learning algorithms to perform feature extraction on the aligned faces. Feature extraction, as the name implies, is to represent a face image with a 128-dimensional vector. Currently, vectors of other dimensions can also be used in the example, which is not specifically limited herein.

Face feature extraction is based on learning from a large amount of face data. For example, construct a data set containing 10,000 people of three groups, Negroid, Caucasian, and Mongolian, where the data of each face is greater than or equal to 450, and each group includes data of children, teenagers, young people, middle-aged people, and old people. The neural network performs face feature extraction training and learning on this data set. After training, the deep learning model can realize the feature extraction of each face image.

Figure 29:
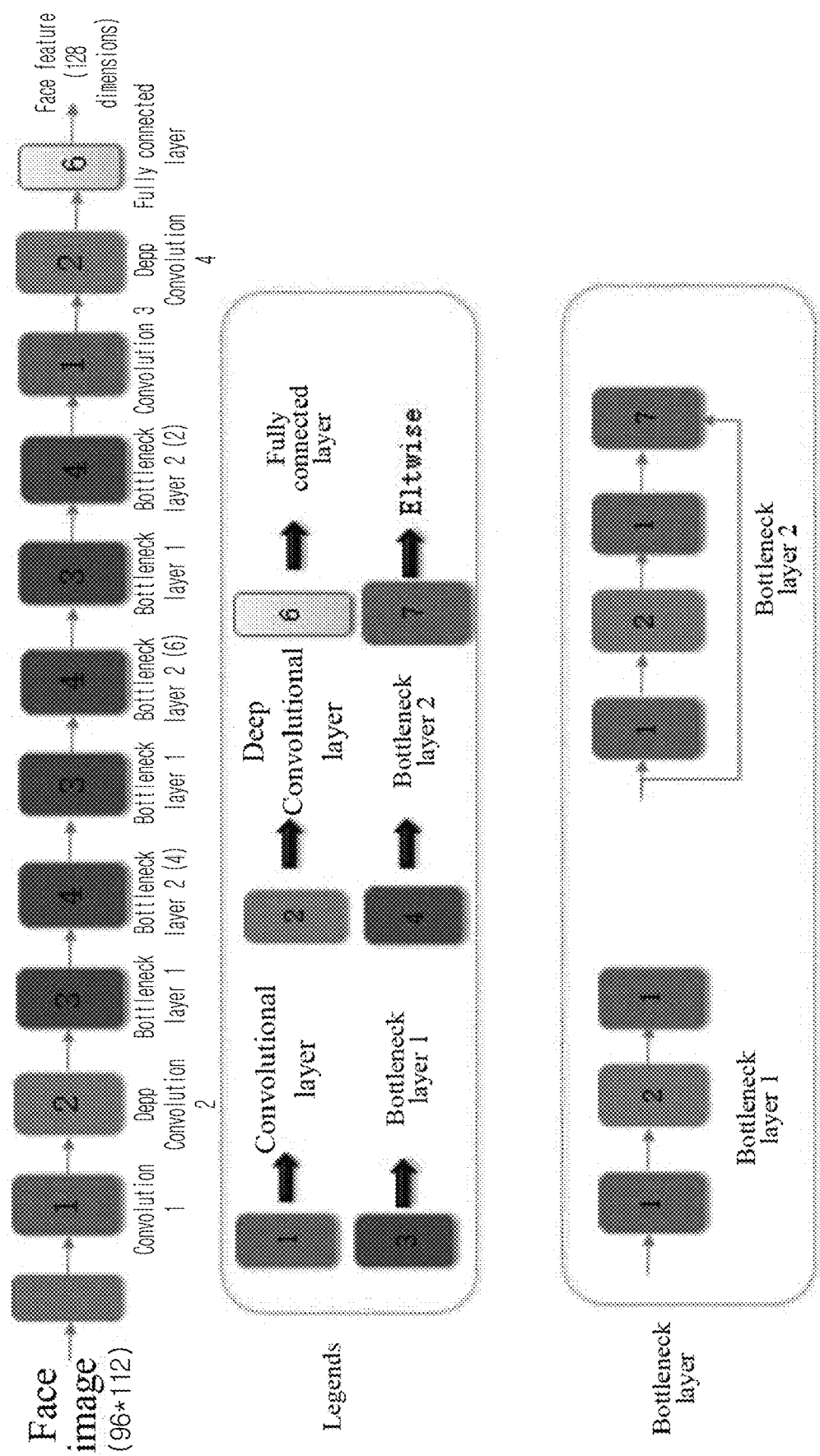
FIG. 29 is a schematic structural diagram of the neural network used in FIG. 28B according to an embodiment of the disclosure.

FIG. 29 is a schematic structural diagram of the neural network used in FIG. 28B according to an embodiment of the disclosure.

Referring to FIG. 29, feature extraction is performed on face images after face detection and face alignment, wherein, box 1 represents the convolutional neural network layer, box 2 represents the depth separable convolutional layer, and box 6 represents the fully connected layer, of which output is 128-dimensional face features.

In operation S2 in FIG. 27A, the face is represented by a 128-dimensional vector, and in operation S3 in FIG. 27A, the cosine distance between every two face nodes is calculated.

Cosine distance, also referred to as cosine similarity, is an algorithm that evaluates the similarity by calculating the cosine value of the angle between two face feature vectors.

Figure 30:
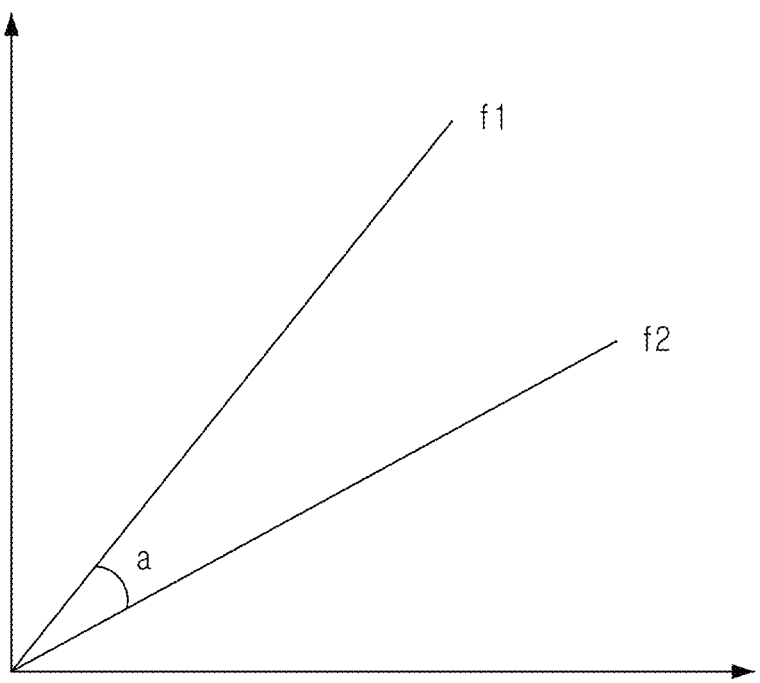
FIG. 30 is a schematic diagram of a cosine distance according to an embodiment of the disclosure.

FIG. 30 is a schematic diagram of a cosine distance according to an embodiment of the disclosure.

Referring to FIG. 30, f1 represents the feature vector of face A, f2 represents the feature vector of face B, and a represents the angle between the f1 and f2 vectors. A smaller angle a corresponds to a higher similarity between f1 and f2. When the angle a is 0, the cosine value is 1, which means that f1 and f2 have the highest similarity; when the angle a is 90, the cosine value is 0, which means that f1 and f2 are independent of each other, that is, f1 and f2 are not a same person. The calculation formula is:

$$sim(X, Y) = \cos\theta = \frac{\vec{x} \cdot \vec{y}}{\|x\| \cdot \|y\|} \qquad \text{Equation (8)}$$

Wherein, x and y respectively represent the two vectors whose similarity is to be calculated; sim(X, Y) represents the cosine similarity between the two vectors.

In operation S3, each node is used as the central node P, m1 neighbor nodes with the largest cosine distance from the central node P, m2 neighbor nodes with the smallest cosine distance from the central node P, and m3 neighbor nodes with an intermediate random cosine distance from the central node P are searched, wherein the number of neighbor nodes of P is k1=m1+m2+m3;

for each neighbor node of P, n nodes with the largest cosine distance from each neighbor node of P are found, wherein k2=k1*n. Through the above operations, it can be determined that the number of first-order neighbor nodes of the central node P is k1, the number of second-order neighbors is k2, and the theoretical total number of neighbor nodes of P is k=k1+k2. In reality, there may be the same neighbors between each first-order neighbor node, so the number of neighbor nodes of P is less than or equal to k;

For each central node P, p neighbor nodes are selected to construct a connection between them for constructing a subgraph, which is represented with the adjacency matrix A, and the calculation is performed to obtain the degree matrix D;

the above operations are repeated until all nodes are used as central nodes to complete the subgraph construction.

In operation S4, different GCN neural network models are designed according to different application scenarios and computing platforms, and each subgraph is calculated through the GCN neural network to calculate the connection probability of the neighbor node and the central node, and each connection pair is formed. And the stability of the algorithm is improved through the Average Score algorithm Finally, each connection pair is traversed to obtain the clustering result.

It can be seen from the above formula (7) that in order to extract the feature $X^{(l+1)}$ of the node in the graph, it is necessary to calculate the degree matrix D and the adjacency matrix A of the graph. The weight W and the offset b are the parameters learned by GCN through training, and $X^{(l)}$ is the feature representation of the node in the current state.

The disclosure provides a novel GCN-based clustering algorithm, which converts the clustering algorithm problem into a node connection prediction problem, that is, by judging whether there is a connection between two nodes, thereby judging whether the two nodes belong to the same category. If the probability of two nodes being connected is greater than the set threshold, it is considered that there is a connection between the two nodes and belong to the same category, otherwise not belong to the same category. Therefore, the disclosure uses each node as a central node, searches for the k neighbor nodes with the largest cosine distance to construct a subgraph, and then judges the probability that the central node is connected to its first-order neighbor nodes through GCN.

The disclosure provides two manners to construct a subgraph: a fixed number of neighbor nodes and a non-fixed number of nodes.

As the name implies, the fixed number of neighbor nodes is to select a fixed number of neighbor nodes to construct a subgraph. In order to balance the number of positive and negative samples, the disclosure not only finds a closest node, but also finds a farthest node as a negative sample.

Figure 31:
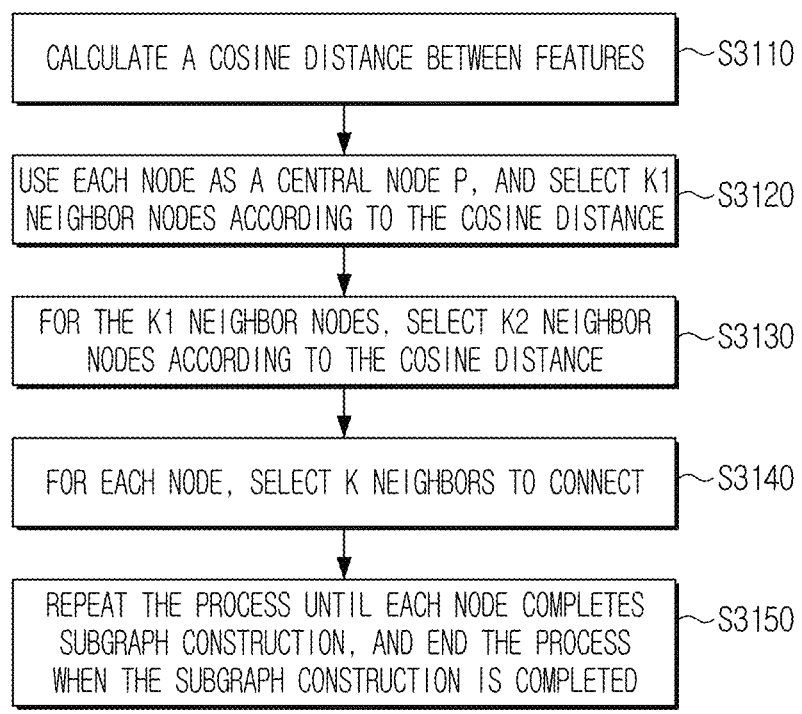
FIG. 31 is a schematic flow chart of obtaining neighbor nodes according to an embodiment of the disclosure.

FIG. 31 is a schematic flow chart of obtaining neighbor nodes according to an embodiment of the disclosure.

Referring to FIG. 31, the algorithm flow is:
- S1: calculate the cosine distance between two nodes at operation S3110;
- S2: use each node as the central node P, and select k1 neighbor nodes according to the cosine distance at operation S3120. Specifically, searching for m1 neighbor nodes with the largest cosine distance from the central node P, m2 neighbor nodes with the smallest cosine distance from the central node P, and m3 neighbor nodes with an intermediate random cosine distance from the central node P, wherein the number of neighbor nodes of P is k1=m1+m2+m3;
- S3: for the k1 neighbor nodes, select k2 neighbor nodes according to the cosine distance at operation S3130. Specifically, for each neighbor node of P, search for n nodes with the largest cosine distance from each neighbor node of P, wherein k2=k1*n; through the above operations, it can be determined that the number of first-order neighbor nodes of central node P is k1, the number of second-order neighbors is k2, and the theoretical total number of neighbor nodes of P is mp=k1+k2. In reality, there may be the same neighbors between each first-order neighbor node, so the number of neighbor nodes of P is less than or equal to mp;
- S4: for each node, select k neighbors to connect at operation S3140. For each central node P, select k neighbor nodes to construct a connection between them for constructing a subgraph, which is represented with adjacency matrix A, and its degree matrix D is calculated;
- S5: repeat the process until each node completes subgraph construction, and when the subgraph construction is completed, end the process at operation S3150. Repeat the above operations S2 to S4 until all nodes are used as central nodes to complete the subgraph construction.

FIG. 32 is a schematic diagram of a solution for constructing a subgraph according to an embodiment of the disclosure.

Referring to FIG. 32, for example, respective nodes are labeled 1 to 12, and the cosine distances of every two nodes among the 12 nodes are calculated; k1=2 neighbor nodes with the largest cosine distance from the central node are calculated by using each node as the central node; then neighbor nodes of which neighbor nodes are k2=2 are calculated; and finally, the nearest k nodes from each node are selected for connection. For example, taking $1^{st}$ node as the central node, and then the 2 neighbor nodes with the largest cosine distance, $2^{nd}$ node and $12^{th}$ node from $1^{st}$ node are searched; then the neighbor node of $2^{nd}$ node, i.e., $6^{th}$ node and $12^{th}$ node are calculated and searched, as well to the neighbor nodes of $12^{th}$ node, i.e., $7^{th}$ node and $2^{nd}$ node; all nodes other than the central node, i.e., $1^{st}$ node, are connected to complete subgraph construction.

The manner of non-fixed number of nodes is also a manner of constructing a subgraph with a non-fixed number of selected neighbors. The disclosure uses the cosine distance radius method to find the neighbor nodes of the central node. The cosine distance radius is set as R, and if the distance from the center node is greater than the radius R, the node may be regarded as the neighbor node of the center node. Most of the neighbor nodes searched in this manner are the neighbor nodes of the central node. In order to balance the number of positive and negative samples, a larger radius R1 is reset, and the nodes with a cosine distance less than R and greater than R1 are searched.

Figure 33:
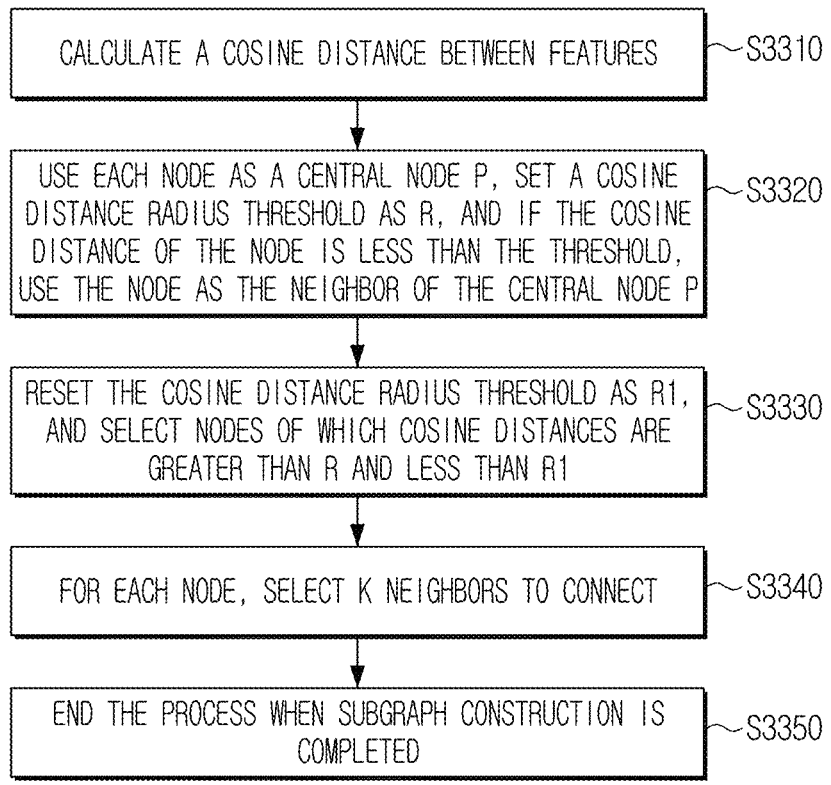
FIG. 33 is a schematic flow chart of obtaining neighbor nodes according to an embodiment of the disclosure.

FIG. 33 is a schematic flow chart of obtaining neighbor nodes according to an embodiment of the disclosure.

Referring to FIG. 33, the algorithm flow is:
- S1: calculate the cosine distance between features at operation S3310. That is, calculate the cosine distance between two nodes;
- S2: use each node as the central node P, set the cosine distance radius threshold as R, and if the cosine distance of the node is less than the threshold, use the node as the neighbor of the central node P at operation S3320;
- S3: expand the search range, reset the cosine distance radius threshold as R1, and select nodes of which cosine distance is greater than R and less than R1 at operation S3330;
- S4: for each node, select k neighbors to access at operation S3340. Specifically, select k nodes for each node to connect, and construct a subgraph; wherein, the subgraph is represented with adjacency matrix A, and its degree matrix D is calculated;
- S5: repeat the above operations S2 to S4 until all nodes are used as central nodes to complete the subgraph construction. End the process when the subgraph construction is completed at operation S3350.

FIG. 34 is a schematic diagram of a solution for constructing a subgraph according to an embodiment of the disclosure.

Referring to FIG. 34, for example, the nodes to be clustered are numbered 1 to 10, and the cosine distance of every two nodes among the 10 nodes is calculated; each node is used as the central node P, and the cosine distance radius threshold is set as R, and if the value is less than the threshold, the node is regarded as a neighbor of the central node P; the search range is expanded, the cosine distance radius threshold is reset as R1, nodes with cosine distance greater than R and less than R1 are selected; k nodes for each node are selected to connect. For example, taking $1^{st}$ node as the center node, the cosine distance radius is set as R1, $2^{nd}$ node, $3^{rd}$ node, $4^{th}$ node, and $5^{th}$ node are selected as neighbor nodes; a larger radius is reset as R2, $6^{th}$ node is further selected as a neighbor node of $1^{th}$ node. However, the nearest neighbor node of $6^{th}$ node is not within the range of k1 neighbor nodes, so $6^{th}$ node is a negative sample and is not connected to any node.

The related art also uses a fixed number of neighbor nodes to construct a subgraph for each node, but it uses Euclidean distance to calculate the distance between nodes, and the disclosure uses cosine similarity to calculate the distance between nodes. Euclidean distance reflects absolute difference between the numerical features, and is more used to reflect the difference in dimensional values. The cosine distance represents difference between features from the direction. For example, for one same person, the facial features in different poses, different illuminations and different moments are quite different, but the facial features still represent the same person. If using Euclidean distance, it will cause faces of the same person to be clustered into two persons. Therefore, the use of cosine distance in the disclosure can effectively improve accuracy of clustering.

Euclidean distance measures the similarity of features based on the absolute numerical values of features in each dimension. The calculation formula is:

$$dist(X, Y) = \sqrt{\sum_{i=1}^{n}(x_i - y_i)^2} \qquad \text{Equation (9)}$$

Wherein, dist(X, Y) represents the Euclidean distance between the vectors x and y; $x_i$ represents the value of the $i^{th}$ dimension of vector x; $y_i$ represents the value of the $i^{th}$ dimension of vector y.

For the features A and B, a greater Euclidean distance between the features A and B corresponds to a greater difference between the features A and B; a greater cosine distance corresponds to a smaller difference between the features A and B.

FIG. 35 is a schematic diagram of comparing results of similarity using Euclidean distances and cosine distances according to an embodiment of the disclosure.

Referring to FIG. 35, it can be seen that cosine distances of one person's face in different poses, different illuminations and different moments are relatively large, indicating that they are all the same person. The Euclidean distances are also relatively large, indicating that faces may not belong to the same person. In FIG. 35, O represents Euclidean distance; C represents cosine distance.

The construction process of the subgraph of the image clustering method is described in detail above with reference to the accompanying drawings and examples. The process of obtaining the connection probability between the central node and each neighbor node based on the subgraph will be further explained below.

In a possible implementation manner of the embodiment of the disclosure, the determining a connection probability between a central node of the subgraph and a neighbor node thereof based on the graph convolutional network in operation S220 may include:

(1) obtaining node embedding of the subgraph according to at least one layer of graph convolutional network.

In the disclosure, node embedding can be in the form of a matrix, and node embedding can also be referred to as feature representation or feature matrix.

Specifically, the input features corresponding to the subgraph can be obtained. The input features can include a feature matrix, an adjacency matrix, and a first-order neighbor vector; the input features are input into at least one layer of graph convolutional network to obtain the node embedding of the subgraph.

In a specific embodiment, the feature matrix, adjacency matrix, and first-order neighbor vector may be input into the at least one layer of graph convolutional network for feature extraction, and an output result of the last layer of graph convolutional network is used as the node embedding.

Specifically, the matrix can be input to the multi-layers of graph convolutional network for transformation in turn, and the structure of the graph convolutional network can also be improved, such as adding pooling, or the result fusion between the two layers of graph convolutional networks, which may be described in detail for the improvement of graph convolutional network hereafter.

(2) obtain connection probability between the central node of the subgraph and the neighbor node thereof based on the node embedding (also referred to as feature representation or feature matrix).

Wherein, the neighbor node may be a first-order neighbor node, that is, a neighbor node directly connected to the central node.

Specifically, the node embedding can be input into at least one fully connected layer (softmax layer) to obtain the connection probability between the central node of each subgraph and each first-order neighbor node.

In order to more easily and intuitively express the improvement of the structure of the graph convolutional network in the disclosure, first, the graph convolutional network in the related art will be described.

Figure 36:
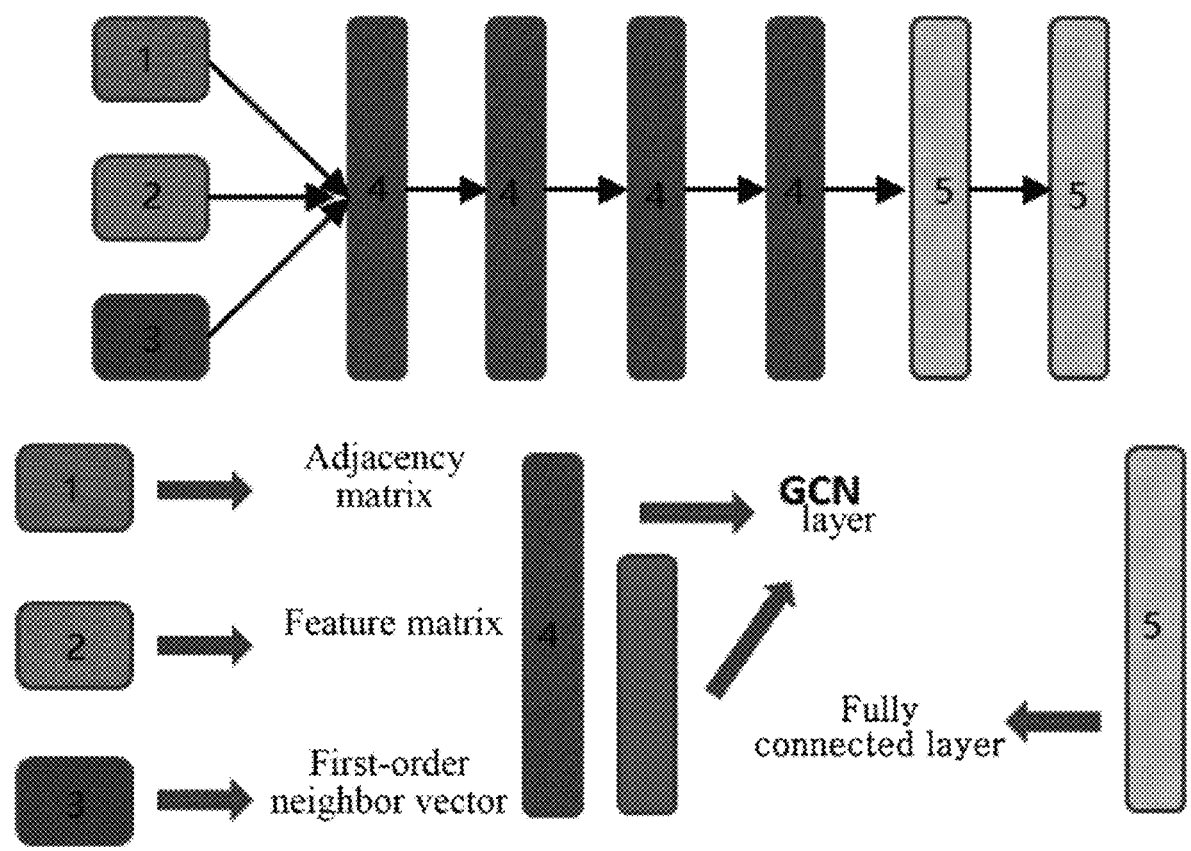
FIG. 36 is a schematic structural diagram of a graph convolutional network of the related art.

FIG. 36 is a schematic structural diagram of a graph convolutional network of the related art.

Referring to FIG. 36, in the solution of the related art, a 4-layer GCN pair is used to extract node features. The adjacency matrix, feature matrix and first-order neighbor vector of the subgraph are transferred as input to the GCN network layer, and then pass through the two-layer fully connected layer and the softmax layer to predict whether there is a connection probability between the first-order neighbor node and the central node, wherein, cross-entropy is used as a loss function to train the entire neural network. The network structure is shown in the figure.

Wherein, box 1 represents the adjacency matrix A of the subgraph, A is an N*N matrix, and N represents the number of nodes; box 2 represents the feature matrix F of the subgraph, F is an N*d matrix, and d represents dimension of the feature, wherein, d=512 in the related art, box 3 represents the first-order neighbor vector, the first-order neighbor vector is a 1*k1 matrix, and k1 represents the number of first-order neighbors of the central node; box 4 represents the GCN network layer to extract node feature; box 5 represents the fully connected layer.

It can be seen from FIG. 36 that if there is a relationship between nodes, that is, when nodes belong to the same category of node, with the forward transferring in the GCN network, differences between the same category of nodes will become smaller, and the difference between different categories of nodes will become greater. If using the above-mentioned Euclidean distance, or due to the influence of posture, illumination, and face photos in different periods, it may result in the features of two different categories of nodes being very similar, while there is a connection between the nodes. With the forward transferring of the GCN network, the differences between these two different categories of nodes are getting smaller, causing subsequent clustering errors. Therefore, the disclosure adopts the following network structure to reduce occurrence of this error.

The improvement of the graph convolutional network will be described in further detail below in conjunction with the drawings and embodiments.

In an implementation process, for at least one layer of graph convolutional network other than a first layer of graph convolutional network, the output result of a previous layer of graph convolutional network is used as the input of the at least one layer of graph convolutional network; or the output result of the previous layer of graph convolutional network and the output result of the at least one-layer graph convolutional network previous to the previous graph convolutional network are fused as the input of the at least one layer of graph convolutional network.

Specifically, the outputs of any two graph convolutional networks can be fused as the input of the next network used as the latter one graph convolutional network.

Figure 37A:
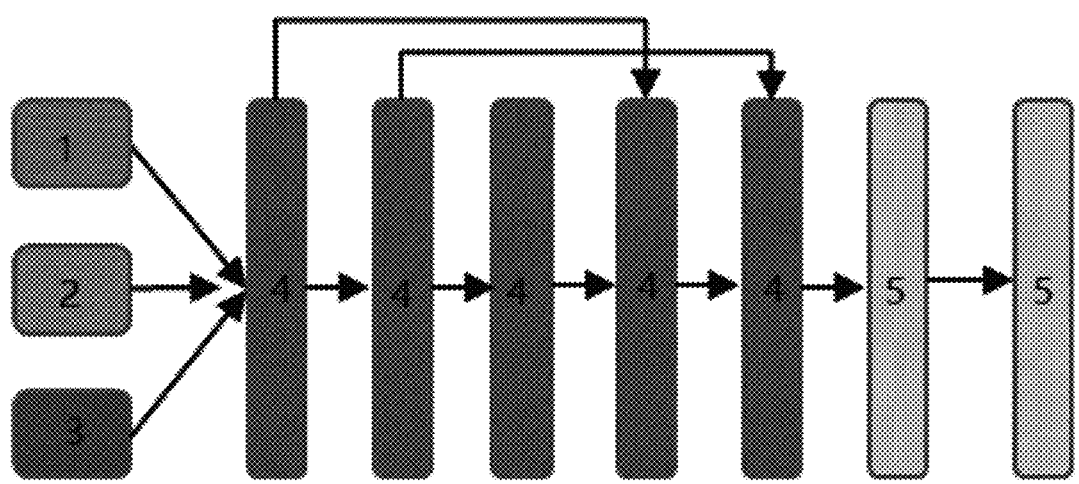
FIG. 37A is a schematic structural diagram of a graph convolutional network introducing a shot-cut mechanism according to an embodiment of the disclosure.

FIG. 37A is a schematic structural diagram of a graph convolutional network introducing a shot-cut mechanism according to an embodiment of the disclosure.

Referring to FIG. 37A, the disclosure introduces a shot-cut mechanism on the basis of the related art, which can effectively reduce occurrence of the above-mentioned errors and improve the accuracy of the clustering. The disclosure uses multi-layer (such as 5-layer) GCN to extract node features. The adjacency matrix, feature matrix, and first-order neighbor vector of the subgraph are transferred as input to the GCN network layer, and then passed through the two-layer fully connected layer and the softmax layer to predict whether there is a connection probability between the first-order neighbor node and the central node, wherein, cross-entropy is used as a loss function to train the entire neural network, while fusing the features of a shallow layer with the feature memory of a back layer. Therefore, the closer a back layer of the GCN is, the smaller the difference between nodes in a same category is, and features of a shallow layer are fused into features of a back layer, which may maintain the differences between different nodes, and avoid clustering different nodes into a same category. For example, the features extracted from the first layer of GCN and the features extracted from the third layer are fused and then the fused features are input to the fourth layer, and the features extracted from the second layer and the fifth layer are fused and output.

It is understood that the graph convolutional network structure shown in FIG. 37A has 5 layers, which is only to illustrate the structure. In the specific implementation process, the specific number of layers of the graph convolutional network structure is not limited, and the outputs of the any two-layer graph convolutional network are fused and used as the input of the next layer network of the latter one graph convolutional network, which is not specifically limited herein.

As shown in Table 1 below, for graph convolutional networks without the introduction of the shot-cut mechanism, this algorithm can effectively improve the accuracy, recall ratio, and f1-score of clustering.

Accuracy=correct number of clusters/number of clusters

Recall ratio=correct number of clusters/number of positive samples in clusters

F1-score=accuracy*recall ratio*2/(accuracy+recall rate)

TABLE 1

Comparison of effects between the related art and the introduction of the shot-cut mechanism

| Method | Accuracy | Recall ratio | F1-Score |
|---|---|---|---|
| Related art | 0.8915 | 0.7669 | 0.8245 |
| Introducing shot-cut mechanism | 0.9407 | 0.8297 | 0.8812 |

In the above embodiment, the disclosure introduces a shot-cut mechanism on a graph convolutional network to fuse output results of a graph convolutional network in different layers, and the closer to a back layer of the graph convolutional network is, the smaller the difference between nodes in a same category is, such that the difference between different nodes can be maintained to a certain extent, the problem of clustering different nodes into a same category can be avoided, and the accuracy of the clustering is further improved.

In another implementation process, hierarchical clustering can also be introduced to improve the structure of the graph convolutional network.

Specifically, at least two adjacent graph convolutional networks comprise a clustering layer therebetween, and the clustering layer clusters feature vectors of respective nodes included in the output result of the precious layer of graph convolutional network (also referred to as hierarchical clustering hereafter) and outputs the clustering result into the next layer of graph convolutional network.

Specifically, the feature vector of each node is the first dimension; the clustering result output by the clustering layer is the second dimension; the second dimension is smaller than the first dimension.

Specifically, a dimensionality recovery layer may also be provided between at least two adjacent graph convolutional networks located after the clustering layer, and the dimensionality recovery layer is used to perform dimensionality recovery on the output result of the clustering layer. Wherein, the feature input to the dimensionality recovery layer is the second dimension; the input feature of the dimensionality recovery layer is the first dimension, which makes the clustering result of the graph convolutional network finally consistent with the dimension input to the graph convolutional network while improving working accuracy and efficiency of the entire clustering.

Figure 37B:
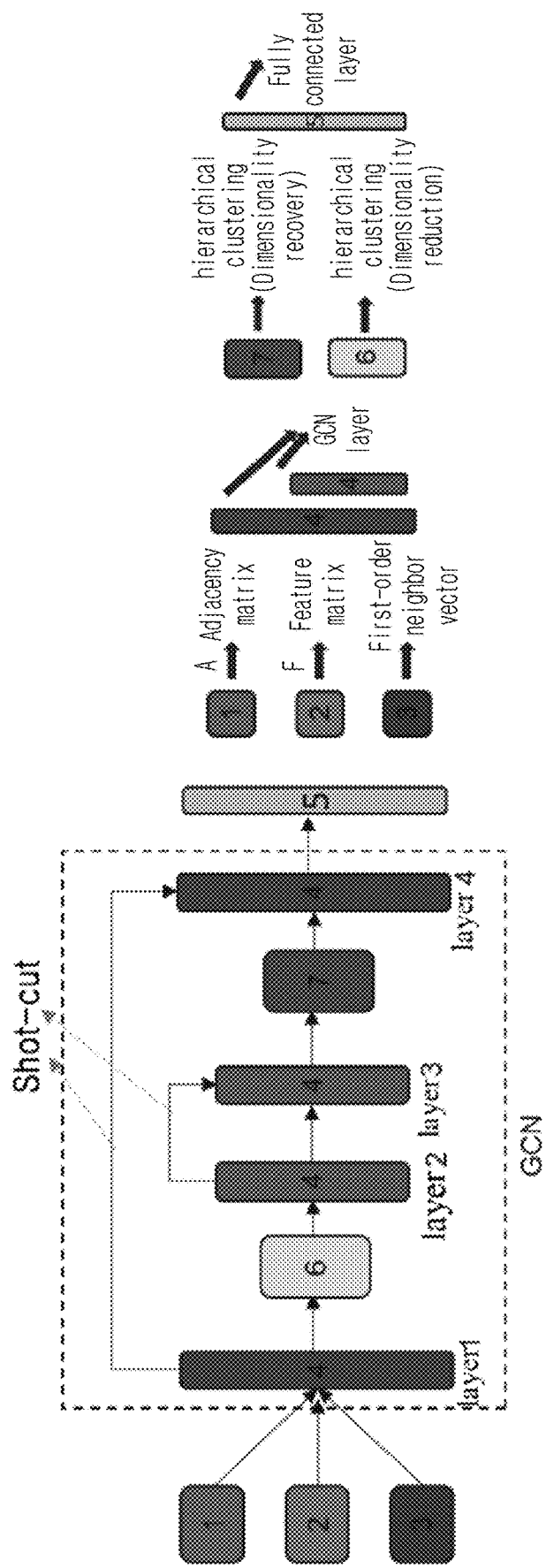
FIG. 37B is a schematic structural diagram of a graph convolutional network introducing a shot-cut mechanism and hierarchical clustering according to an embodiment of the disclosure.

FIG. 37B is a schematic structural diagram of a graph convolutional network introducing a shot-cut mechanism and hierarchical clustering according to an embodiment of the disclosure.

Referring to FIG. 37B, the hierarchical clustering module is introduced behind each original layer of GCN. The disclosure introduces a differentiable hierarchical clustering operation, in which hierarchical clustering can be used in any layer of the GCN. In the process of GCN transferring, the nodes belonging to the same category are fused, which means that a clustering function has been completed for nodes within one GCN, thereby improving accuracy and efficiency of the entire clustering work.

It is understood that the graph convolutional network structure with a hierarchical clustering module shown in FIG. 37B has 4 layers, which is only to illustrate the structure. In the specific implementation process, the specific number of layers of the graph convolutional network structure is not limited, and the output of the any two-layer graph convolutional network is fused and used as the input of the next layer network of the latter one graph convolutional network, and in addition, each layer of graph convolutional network can have hierarchical clustering operation, and only one layer or part of the graph convolutional network may have the hierarchical clustering operation, which is not specifically limited herein.

In view of the problem of clustering errors which may be caused by conventional GCN clustering features of nodes, reduce the difference between noise nodes and other nodes, the following improvements are made for the GCN structure in the application:

1. use a shot-cut mechanism to maintain differences between different nodes in a subgraph; and
2. provide a hierarchical clustering module in GCN to extract the hierarchical features of a subgraph and increase the differences between noise nodes and other nodes.

Referring to FIGS. 37B and 37C, in an example, taking a face image as an example, the image clustering method may include the following operations:

FIG. 37C is a schematic flow chart of an image clustering method according to an embodiment of the disclosure.

S1: perform face detection, and cropping and aligning the face image;

S2: use CNN to extract the feature vector of the face image, that is, the facial features shown in the figure, and use the extracted facial features as a node;

S3: use each node as a central node, determine at least one neighbor node according to the cosine distance, and construct a subgraph by connecting the central node and the neighbor nodes;

S4: extract the features of each subgraph by the GCN; use the shot-cut mechanism and the hierarchical clustering module to maintain the difference between the noise and other node features, and then obtain the connection probability of the central node and its first-order neighbor nodes according to a softmax function; and wherein, operation S4 can include:

(1) take an adjacency matrix, feature matrix and neighbor node (specifically can be a first-order neighbor node) vector as the input of GCN at operation S3710;

(2) use the first layer of the GCN to extract features of a subgraph at operation S3720;

(3) use the hierarchical clustering module for hierarchical clustering and feature extraction at operation S3730;

(4) in the second and third layers, extract hierarchical clustered features of nodes, and fuse the features of a shallow layer through a shot-cut mechanism at operation (S3740). (5) Recover the number of nodes to an original dimension through a dimension upgrading module at operation S3750. That is, upgrade the number of nodes to an original dimension through a dimension upgrading module;

(6) use the fourth layer of the GCN to extract features of the upgraded subgraph, and fuse the features extracted from the fourth layer with the features of the first layer of the GCN to maintain differences between nodes at operation S3760; and (7) use softmax to predict a connection probability between the central node and its first-order neighbor node at operation S3770.

S5: classify face images according to the connection probability of the central node and the first-order neighbor node.

According to the connection probability between each node and its neighbor node, the connection relationship between all nodes can be obtained, and then the face images can be classified according to the connection relationship between all nodes, wherein, an average score can be used to remove noise nodes (described in detail hereafter).

FIG. 37C only shows operations S3 to S5. The shot-cut mechanism in GCN can fuse features of different layers to maintain the difference between noise and other node features.

Figure 37D:
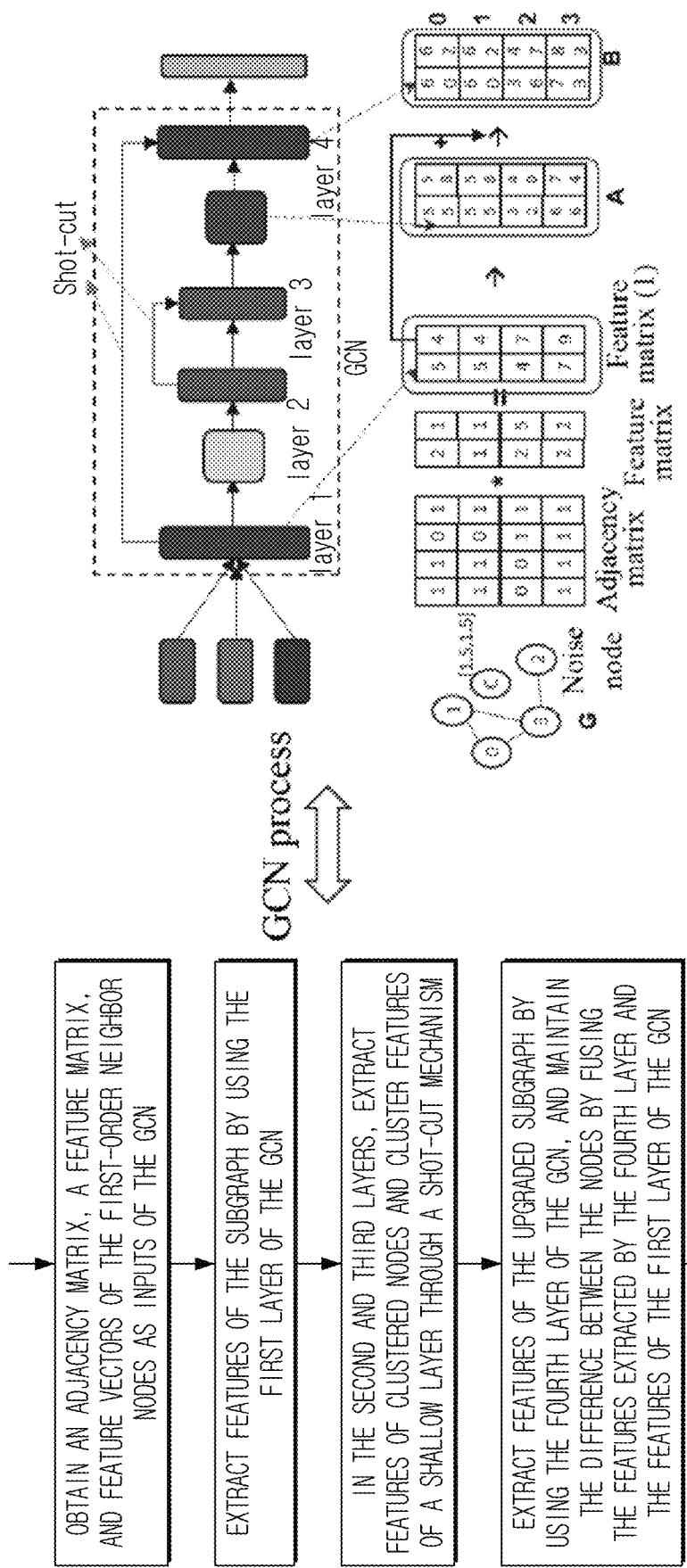
FIG. 37D is a schematic diagram of an image clustering solution introducing a shot-cut mechanism and hierarchical clustering according to an embodiment of the disclosure.

FIG. 37D is a schematic diagram of an image clustering solution introducing a shot-cut mechanism and hierarchical clustering according to the embodiment of disclosure.

Referring to FIGS. 37D, and 37D shows the process of simulating GCN in an example, where G represents a subgraph, and 2nd node represents a noise node. A represents the feature matrix extracted from the GCN of the penultimate layer, and B represents the feature matrix after shot-cut.

As shown in Table 2 below, AA represents the cosine distance between features without shot-cut, and BB represents the cosine distance between features after using the shot-cut mechanism. After adding the shot-cut, the similarity between the noise node and other nodes is reduced, and the clustering performance is improved.

TABLE 2

Comparison of cosine distances before and after the introduction of shot-cut mechanism

| Cosine distance | AA | BB |
|---|---|---|
| C-0 | 0.98238850893452 | 0.99328272986827 |
| C-1 | 0.98238850893452 | 0.99328272986827 |
| C-2 | 0.69418673368095 | 0.56659521202744 |
| C-3 | 0.91856672119883 | 0.89758704580758 |

As can be seen from Table 1, the shot-cut mechanism can retain the differences between features of different nodes, effectively eliminate noise nodes, and improve accuracy of subsequent clustering.

Figure 38:
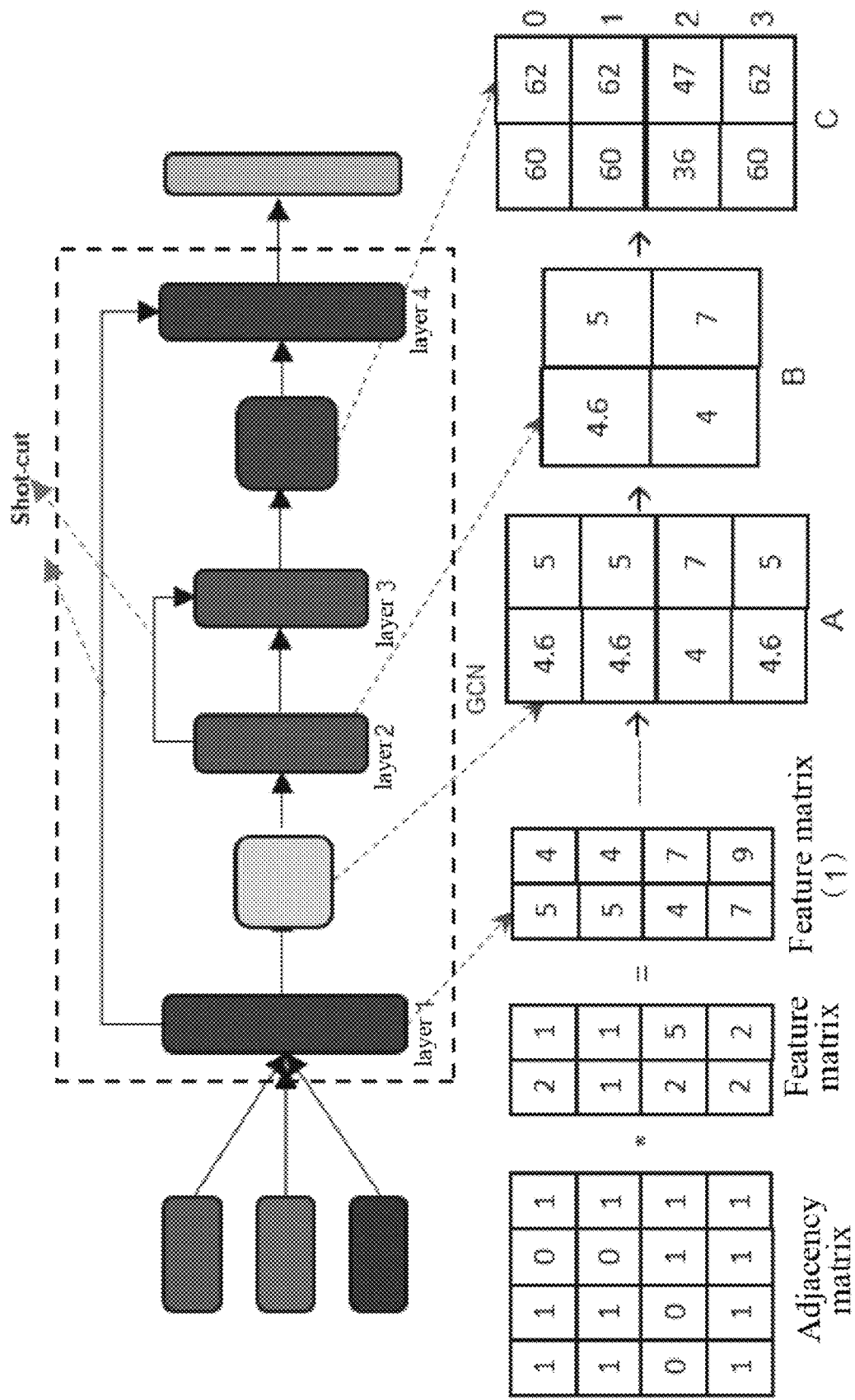
FIG. 38 is a schematic diagram of an image clustering solution introducing a shot-cut mechanism and hierarchical clustering according to an embodiment of the disclosure.

FIG. 38 is a schematic diagram of an image clustering solution introducing a shot-cut mechanism and hierarchical clustering according to the embodiment of the disclosure.

Referring to FIG. 38, in an example, the hierarchical clustering module can be introduced in a conventional GCN layer to cluster nodes with strong relationships, and normalize features to determine noise nodes.

The hierarchical clustering process of GCN is simply simulated. B represents the result of hierarchical clustering, and C represents that if nodes belong to a same category, the nodes are represented by the features of the central node. It can be seen that the hierarchical clustering module can effectively remove noise nodes, solve the problem that the difference between noise node and other nodes are reduced by the conventional GCN clustering the features of the nodes and ultimately lead to clustering errors.

Figure 39A:
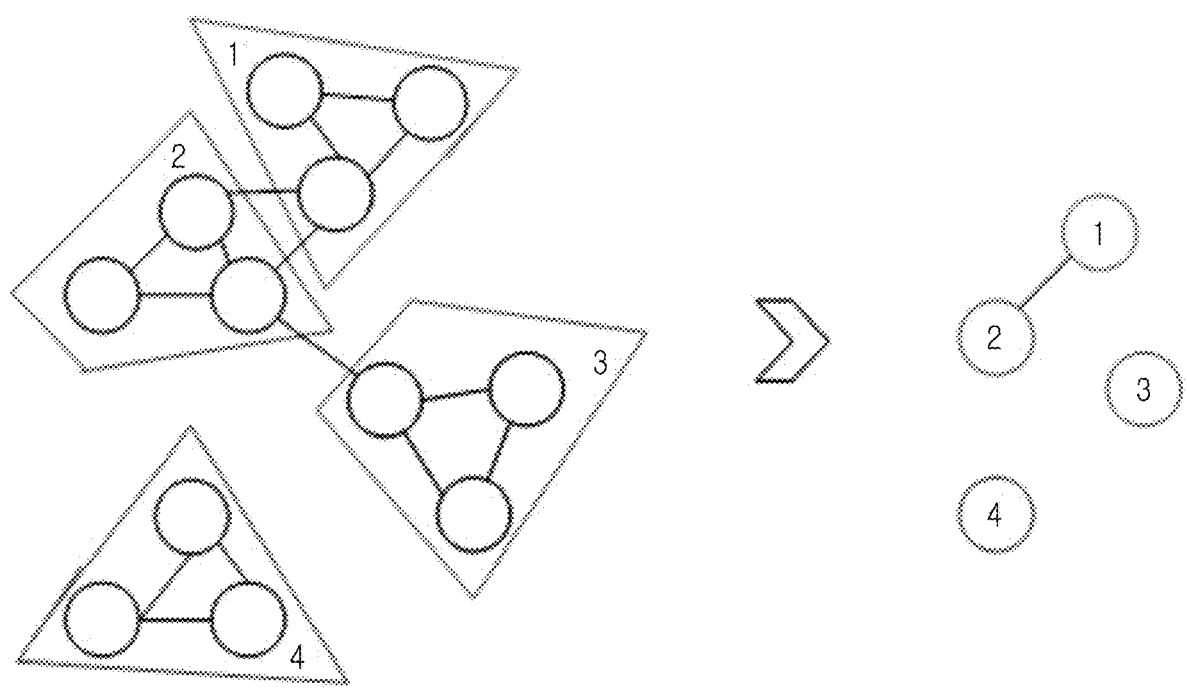
FIG. 39A is a schematic diagram of clustering using a graph convolutional network introducing a hierarchical clustering operation according to an embodiment of the disclosure.

FIG. 39A is a schematic diagram of clustering using a graph convolutional network introducing a hierarchical clustering operation according to an embodiment of the disclosure.

Referring to FIG. 39A, the nodes in box 1 and box 2 belong to the same category of node A, the nodes in box 3 belong to the same category of node B, and the nodes in box 4 belong to the same category of node C. There is a node, in the category of node A, of which distance is close to a node in box 2, and there is a connection therebetween. After subjecting to the GCN network, features of the node in box 2 and the node in box 3 will get closer, which may affect the subsequent clustering effect. However, through the hierarchical clustering module in the disclosure, a small clustering is completed for each node within the GCN, and similar node features are fused, thereby reducing the influence of a small number of wrong nodes.

Figure 39B:
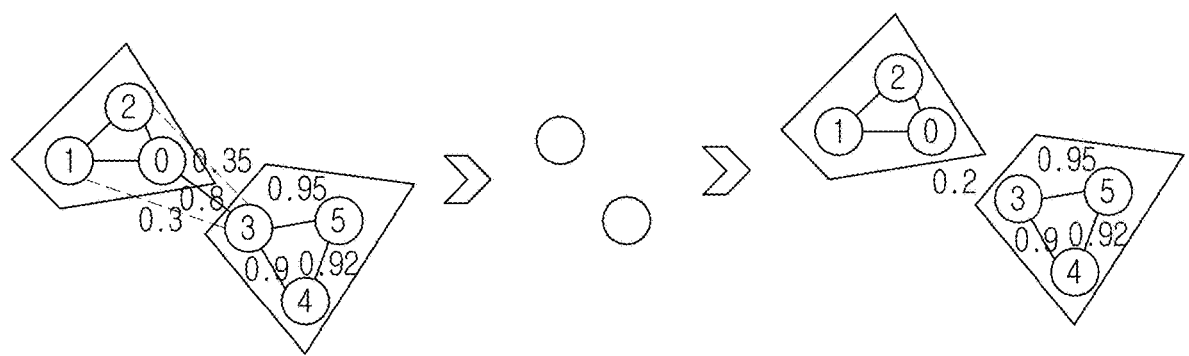
FIG. 39B is a schematic diagram of clustering using a graph convolutional network introducing a hierarchical clustering operation according to an embodiment of the disclosure.

FIG. 39B is a schematic diagram of clustering using a graph convolutional network introducing a hierarchical clustering operation according to an embodiment of the disclosure.

Referring to FIG. 39B, the $3^{rd}$ node is not of the same category as the $0^{th}$, $1^{st}$, and $2^{nd}$ nodes, but the cosine distance between the $0^{th}$ node and the $3^{rd}$ node is relatively large due to illumination and posture. If the conventional clustering algorithms are used, due to the high similarity between the $0^{th}$ node and the $3^{rd}$ node, the two categories are clustered into one category, therefore clustering errors occur. However, in the disclosure, by using the hierarchical clustering, whether two nodes are of the same category is judged by observing information of neighbor nodes. If these belong to the same category, these are clustered into one subcategory in the GCN, otherwise these are not clustered into one category; meanwhile, the dimensionality recovery module uses the features of neighbor nodes to represent features thereof to increase the category spacing. For example, although the $0^{th}$ node and the $3^{rd}$ node have high similarity, it can be known from the neighbor information of the two nodes that the $0^{th}$ node and the $3^{rd}$ node belong to different categories of nodes. Through hierarchical clustering, these are clustered into small categories and the neighbor node information may indicate that the difference between the features of the $0^{th}$ node and the $3^{rd}$ node is increased. 0.2 in FIG. 39B represents the average connection probability between the $0^{th}$ node and the $3^{rd}$ node, and since it is less than the set threshold, the 0th node and the $3^{rd}$ node can be disconnected, such that the subsequent clustering will avoid clustering the $0^{th}$ node and the $3^{rd}$ node into one category.

On the basis of the above GCN neural network model, this solution reduces the number of GCN network layers by one, and meanwhile adds the hierarchical clustering module and the dimensionality recovery module behind each GCN layer, as shown in Table 3, in which the F1-score of this module is increased by 0.0126 compared with the above improved model.

TABLE 3

Comparison of effects of related art, introduction of hierarchical clustering, and shot-cut mechanism

| Method | Accuracy | Recall ratio | F1-Score |
|---|---|---|---|
| Related art | 0.8915 | 0.7669 | 0.8245 |
| Introducing shot-cut mechanism | 0.9407 | 0.8297 | 0.8812 |
| Introducing hierarchical clustering | 0.8947 | 0.8929 | 0.8938 |

Subgraph G is defined. Each subgraph is represented by the adjacency matrix A (block 1 in FIG. 37B). A is an N*N matrix of which internal elements are related to whether there is a connection between nodes, e.g., if there is a connection between nodes, it is 1, and otherwise 0, so $A \in \{0, 1\}^{N \times N}$. The feature vectors of each node in the graph G are used to form a feature matrix F (block 2 in FIG. 37B), wherein F is an N*D dimension matrix, and D represents the dimension of the feature vectors of each node, and $F \in \mathbb{R}^{N \times D}$. The disclosure performs clustering by predicting a probability between the neighbor node and the central node, therefore Node represents the first-order neighbor node label (block 3 in FIG. 37B), Node is a 1*n1 dimension vector, n1 represents the number of first-order neighbor nodes of the central node, and $Node \in \mathbb{R}^{1 \times n1}$. Box 4 in FIG. 37B represents the GCN layer, and the formula is:

$$H^{l+1} = \sigma(MH^l W^l + b^l) \quad \text{Equation} \ldots (10)$$

Wherein, $H^{l+1}$ represents features of each node in the next layer of GCN, $H^l$ represents the feature representation of the current layer node, and in the first layer of GCN $H^l = F$; $W^l$ represents the weight matrix of the $l^{th}$ layer, which is a matrix of D×D1 dimension, $W \in \mathbb{R}^{D \times D1}$; $b^l$ represents the offset of the $l^{th}$ layer, M represents the normalized state value of the node adjacency matrix, $M = \hat{D}^{-1/2} \hat{A} \hat{D}^{-1/2}$, $\hat{A}$ represents the adjacency matrix, $\hat{D}$ represents the degree matrix of the adjacency matrix, σ represents the non-linear activation layer, and the disclosure uses ReLU as the activation function.

Since the graph structure is unstructured data, the pooling operation in the digital image cannot be directly used. Therefore, the disclosure implements the hierarchical clustering function through a learnable conversion factor $S^{(1)}$. $S^{(l)}$ is an N*N1 dimension matrix, which represents the probability that each node belongs to different categories, and N1 represents clustering N nodes in the graph into N1 nodes. $S^{(l)}$ is learned through one layer of GCN, so it can be directly embedded in any layer of the entire GCN neural network. $Z^l$ indicates node clustering factor:

$$S^{(l)} = \text{softmax}(\text{GCN}(A^l, X^l)) \quad \text{Equation} \ldots (11)$$

$$Z^{(l)} = \text{GCN}(A^l, X^l) \quad \text{Equation} \ldots (12)$$

Nodes are clustered by conversion factor:

$$X^{(l+1)} = S^{(l)T} Z^l \quad \text{Equation} \ldots (13)$$

Therefore, node feature matrix after the GCN hierarchical clustering is $X^{l+1}$, which is a matrix of dimension N1*D. Since $X^{l+1}$ is the feature matrix of the nodes after clustering, so it is necessary to reconstruct the adjacency matrix $A^{(l+1)}$ between nodes:

$$A^{(l+1)} = S^{(l)T} A^l S^{(l)} \quad \text{Equation} \ldots (14)$$

Wherein, $S^{(l)}$ represents the transformation matrix and also the hierarchical clustering matrix.

The adjacency matrix $A^{l+1}$ and feature matrix $X^{l+1}$ of the nodes after clustering can be obtained by the above formula.

In the above embodiment, the hierarchical clustering is introduced behind each layer of original graph convolutional network, the hierarchical clustering can be used in any layer of graph convolutional network and can fuse nodes belonging to a same category during a transfer process of the graph convolutional network, that is, each clustering function has been completed for nodes within one graph convolutional network, thereby improving accuracy and efficiency of an entire clustering work.

Figure 40A:
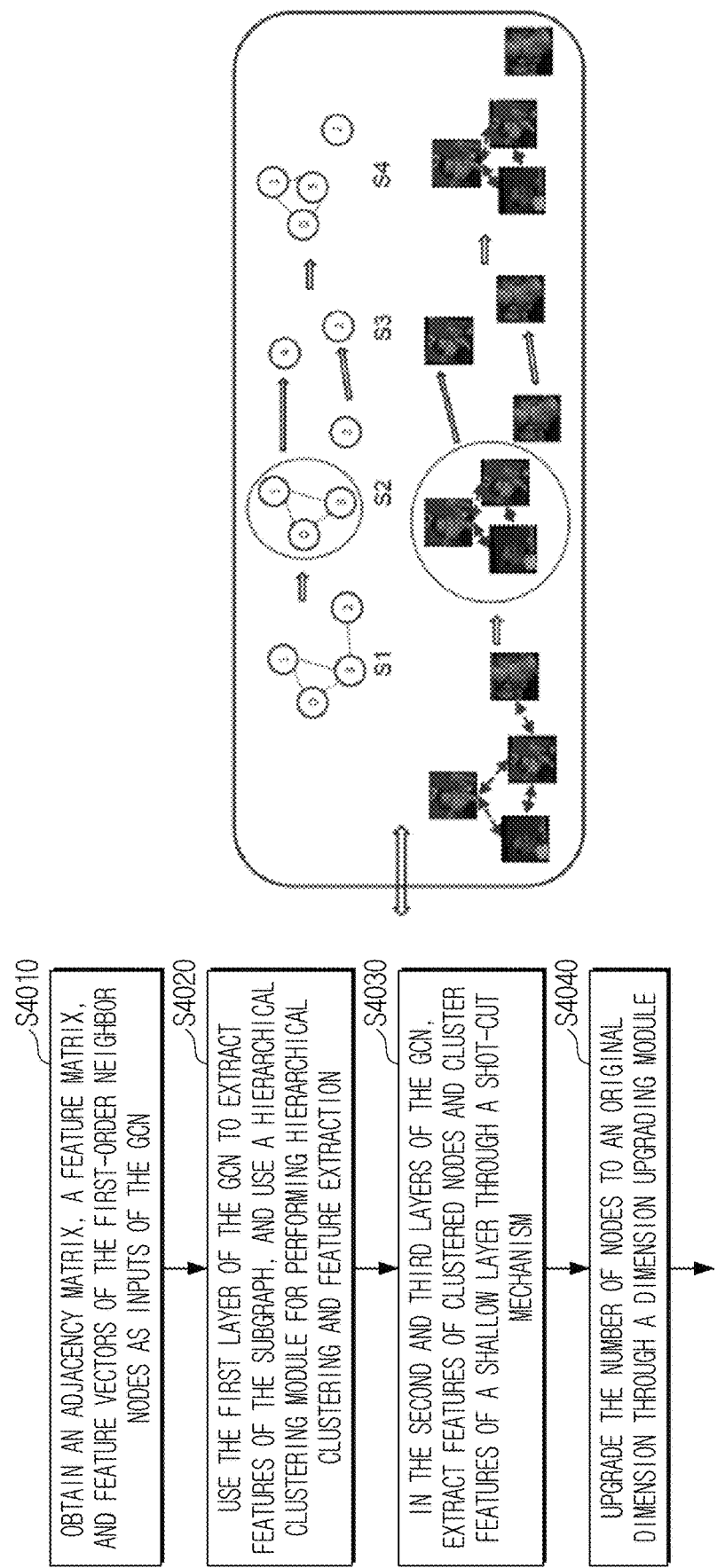
FIG. 40A is a schematic flow chart of an image clustering method according to an embodiment of the disclosure.

FIG. 40A is a schematic flow chart of an image clustering method according to an embodiment of the disclosure.

Referring to FIG. 40A, in an example, the process of hierarchical clustering and dimensionality recovery may include the following operations:

S1: taking vectors of an adjacency matrix, feature matrix and neighbor node (specifically can be a first-order neighbor node) as the input of GCN at operation S4010;

S2: use the first layer of the GCN to extract the features of the subgraph, and use the hierarchical clustering module to perform hierarchical clustering and feature extraction at operation S4020;

S3: in the second and third layers of the GCN, extract features of cluster nodes and cluster features of a shallow layer through the shot-cut mechanism at operation S4030;

S4: upgrade the number of nodes to an original dimension through a dimension upgrading module at operation S4040. That is, recover the number of nodes to an original dimension through a dimension upgrading module.

In S1, the neighbor matrix, feature matrix and first-order neighbor matrix are used to extract node features through GCN. In S2, the hierarchical clustering module is used to cluster the nodes with the same identity into the same category. In S3, the clustered feature nodes are represented as features of the original node. In S4, the dimensionality recovery module is used to recover the dimensions of the subgraph, and the clustered features are used to represent features of the nodes of the same subcategory.

$$M^{(l)} = \text{ArgMax}(\text{softmax}(\text{GCN}_{l,\text{trans}}(A^{(l)}, X^{(l)}))) \in \mathbb{R}^{nl} \quad \text{Equation} \ldots (15)$$

Wherein, $M^{(l)}$ indicates the category to which each node belongs after hierarchical clustering.

In the dimensionality recovery module, $M^{(l)}$ and $X^{(l+1)}$ are used to obtain the recovered feature matrix. For example, in FIG. 40A, all nodes (0, 1, 2, 3) are clustered into two categories (categories 0 and 1) through the hierarchical clustering module. In operation S2, $M^{(l)} = \{0,0,1,0\}$ indicates that $0^{th}$ node, $1^{st}$ node and $3^{rd}$ node belong to category 0, and $2^{nd}$ node belongs to category 1. It can be seen by $M^{(l)}$ that $0^{th}$ node, is node and $3^{rd}$ node have the same identity, and therefore in S4, features of $4^{th}$ node represents $0^{th}$ node, $1^{st}$ node and $3^{rd}$ node.

Figure 40B:
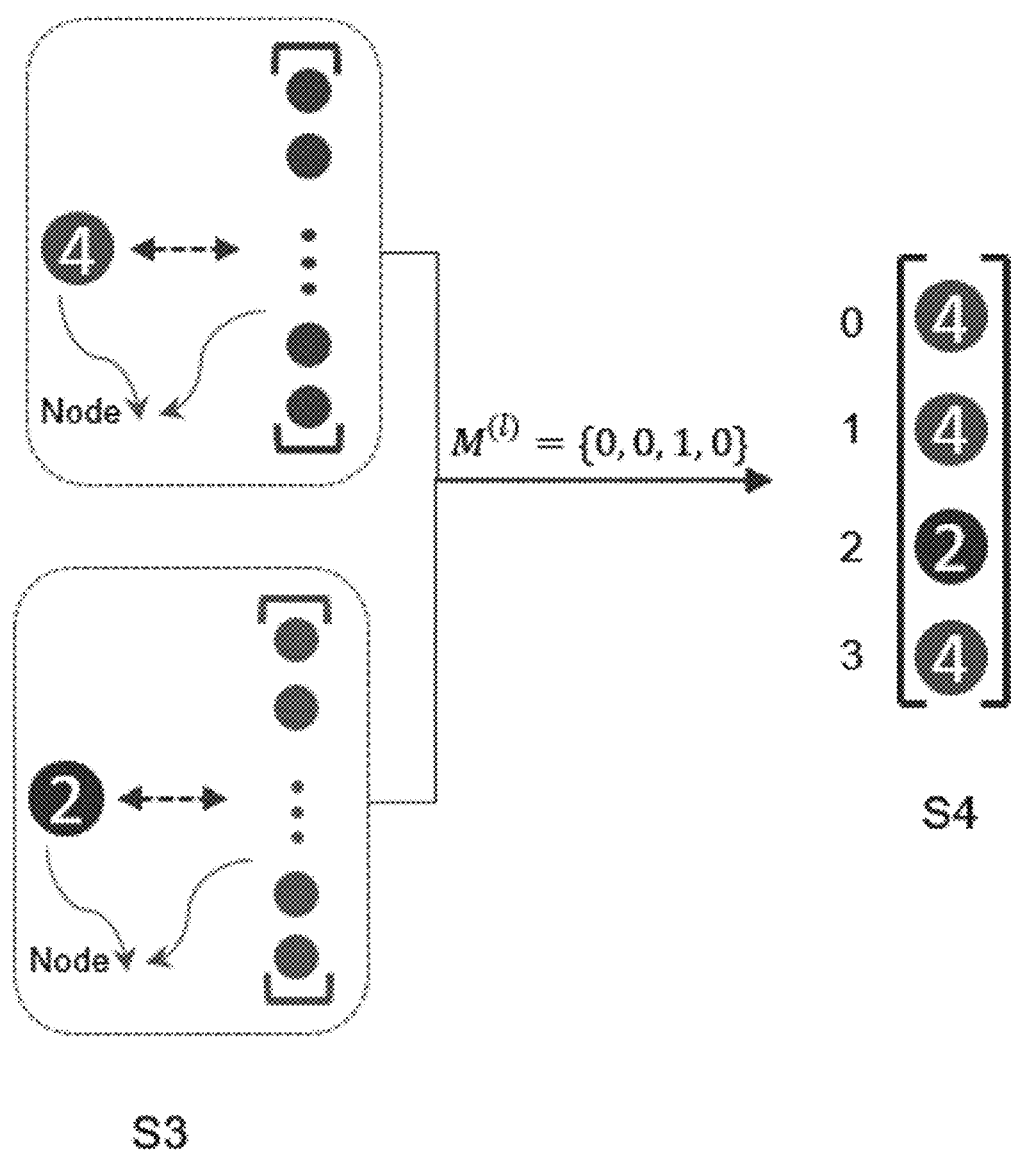
FIG. 40B is a schematic diagram of a dimensionality recovery solution according to an embodiment of the disclosure.

FIG. 40B is a schematic diagram of a dimensionality recovery solution according to an embodiment of the disclosure.

Referring to FIGS. 40B, and 40B shows the process of dimensionality recovery. According to formula 15, the category to which each node belongs can be determined, and the node feature vector at the corresponding position is used as the feature vector of the recovered position when the dimension is recovered. For example, through the hierarchical clustering module, all nodes (0, 1, 2, 3) are clustered into two categories (category 0 and 1), and the category obtained by clustering is represented by $M^{(l)}=\{0,0,1,0\}$ in operation S2, which indicates that the $0^{th}$ node, $1^{st}$ node and the 3rd node belong to category 0, and the $2^{nd}$ node belongs to category 1; the feature vector of $0^{th}$ position after clustering is used as the feature vectors of the node after dimensionality recovery, which is the feature vector of the $0^{th}$ node, the $1^{st}$ node and the $3^{rd}$ node, and so as to other nodes. In formula 15, $M^{(l)}$ can also be used to calculate the recovered neighbor matrix representation in the dimensionality recovery module:

$$A^{(r)}=A^{(l+1)}+A^{(\cdot)}\in \mathbb{R}^{n\times n} \quad \text{Equation} \ldots (16)$$

$$A^{(\cdot)}[i][j] = \begin{cases} 1, & \text{if } M_i = M_j \text{ AND } i \neq j \\ 0, & \text{if } M_i \neq M_j \text{ OR } i = j \end{cases} \quad \text{Equation (17)}$$

Wherein, $A^{(r)}$ is the sum of the adjacency matrix of the subgraph after the dimensionality recovery module and the adjacency matrix of the subgraph of the previous layer to represent the final adjacency matrix of the dimensionality recovery module; $A^{(l+1)}$ is used to represent the adjacency matrix of the subgraph for the previous layer; $A^{(\cdot)}$ is used to represent the adjacency matrix of the subgraph after the dimensionality recovery module; the meaning of $A^{(\cdot)}[i][j]$ is consistent with that of $A^{(\cdot)}$.

The above embodiments describe in detail the improvement of the graph convolutional network, including the shot-cut mechanism and the introduction of a hierarchical clustering module. The process of clustering target areas according to the connection probability will be described below.

In an implementation process, clustering target areas according to the determined connection probability in operation S220 may include:

For at least one target areas to be clustered, if the connection probability between any first-order neighbor node and the central node in the subgraph corresponding to the target areas is greater than the preset threshold, the target areas corresponding to the first-order neighbor node is in a same category with the target areas.

Specifically, as long as the connection probability between the first-order neighbor node and the central node is greater than the preset threshold, the target areas corresponding to the first-order neighbor node and the target areas corresponding to the central node belong to the same category.

After the GCN neural network, the probability value pair between each central node and its first-order neighbor node is obtained; then each prediction result is traversed, and if it is lower than the set threshold, it means that there is no connection between the central node and the neighbor node.

Finally, a breadth-first algorithm is used to traverse each edge, and the nodes whose probability is greater than the threshold are connected, and the clustering is completed.

Figure 41:
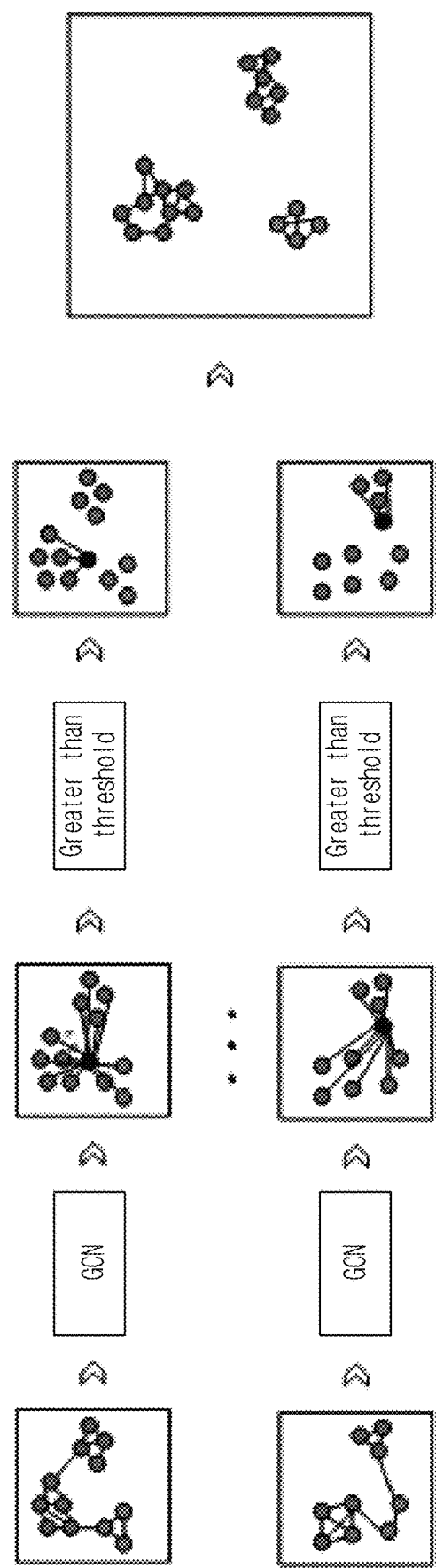
FIG. 41 is a schematic diagram of a clustering solution based on connection probabilities according to an embodiment of the disclosure.

FIG. 41 is a schematic diagram of a clustering solution based on connection probabilities according to an embodiment of the disclosure.

Referring to FIG. 41, each clustered node is used as the central node, and its neighbor nodes are found through the cosine distance to construct a subgraph with the central node as the unit; each subgraph is subjected to the GCN neural network to predict the connection probability of the central node and the first-order neighbor node; if the connection probability between two nodes is greater than the threshold, they are connected; finally, clustering is completed by traversing each connection pair.

In another implementation process, clustering target areas according to the determined connection probability in operation S220 of FIG. 26 may include:

(1) obtaining, for at least one target areas to be clustered, a set of neighbor nodes in a same category according to the connection probability between the corresponding central node and neighbor nodes.

Wherein, the set of neighbor nodes in a same category includes at least one neighbor node determined to be in the same category as the central node.

Specifically, the obtaining, for at least one target area to be clustered, a set of neighbor nodes in a same category according to the connection probability between the corresponding central node and neighbor nodes may include:

determining, for at least one target area to be clustered, neighbor nodes of which connection probabilities with the central node are not less than a preset threshold, and forming the determined neighbor nodes as a set of neighbor nodes in the same category.

(2) adjusting, for at least one neighbor node in the set of neighbor nodes in a same category, the connection probability of the at least one neighbor node and the central node according to connection probabilities of the at least one neighbor node and respective neighbor nodes in the set of neighbor nodes in a same category.

Specifically, for at least one neighbor node in the set of neighbor nodes in a same category, an average connection probability of the at least one neighbor node and respective neighbor nodes in the set of neighbor nodes in a same category may be determined, and the average connection probability is used as the connection probability of the at least one neighbor node and the central node.

(3) clustering the target areas based on the adjusted connection probability to determine whether the at least one neighbor node is a neighbor node in a same category.

Specifically, if the adjusted connection probability is greater than or equal to the first preset threshold, the neighbor node corresponding to the adjusted connection probability may be set as a neighbor node in the same category.

(4) clustering the respective target areas to be clustered according to neighbor nodes in a same category corresponding to respective target areas to be clustered.

Specifically, the clustering respective target areas to be clustered according to neighbor nodes in a same category corresponding to respective target areas to be clustered may include:

a: determining connection probabilities between central nodes corresponding to respective target areas to be clustered according to neighbor nodes in a same category corresponding to respective target areas to be clustered; and b: clustering respective target areas to be clustered based on connection probabilities between respective central nodes.

Specifically, if the connection probability between the central nodes is greater than or equal to the second preset threshold, the target areas corresponding to the central nodes may be set to the same category.

Specifically, the disclosure provides an Average Score-based algorithm to enhance the stability of the algorithm. For each subgraph, the probability between the central node and its neighbor nodes is predicted through GCN, and the set C of all nodes connected to A (nodes with a connection probability greater than the threshold) is obtained. If the probability of a connection between A and B is greater than the set threshold, then the average value of the probability of all nodes connected to the set C and the set B is calculated as the value of the probability that the two nodes A and B are connected. Finally, clustering is completed by traversing each connection pair. By considering the connection information between multiple nodes and B, the stability that A and B are not the same category of node can be enhanced.

Figure 42A:
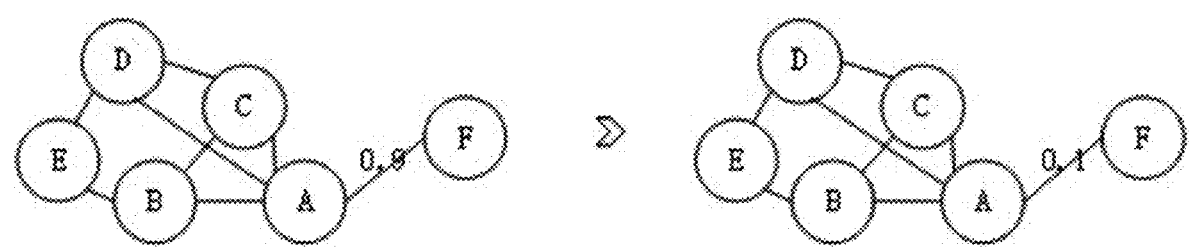
FIG. 42A is a schematic diagram of a solution for removing a noise node according to an average value strategy according to an embodiment of the disclosure.

FIG. 42A is a schematic diagram of a solution for removing a noise node according to an average value strategy according to an embodiment of the disclosure.

As shown in FIG. 42A, for example, A, B, C, D, and E are the same category of nodes, the probability of a connection between node F and A is greater than 0.9, but the probabilities of a connection between F and B, C, D, and E are 0.05, 0.1, 0.2, 0.15. Taking the average value of the probability 0.1 as the probability value of the nodes A and F, it can indicate that the probability of a connection between A and F is very small, thereby improving the accuracy of the algorithm.

Figure 42B:
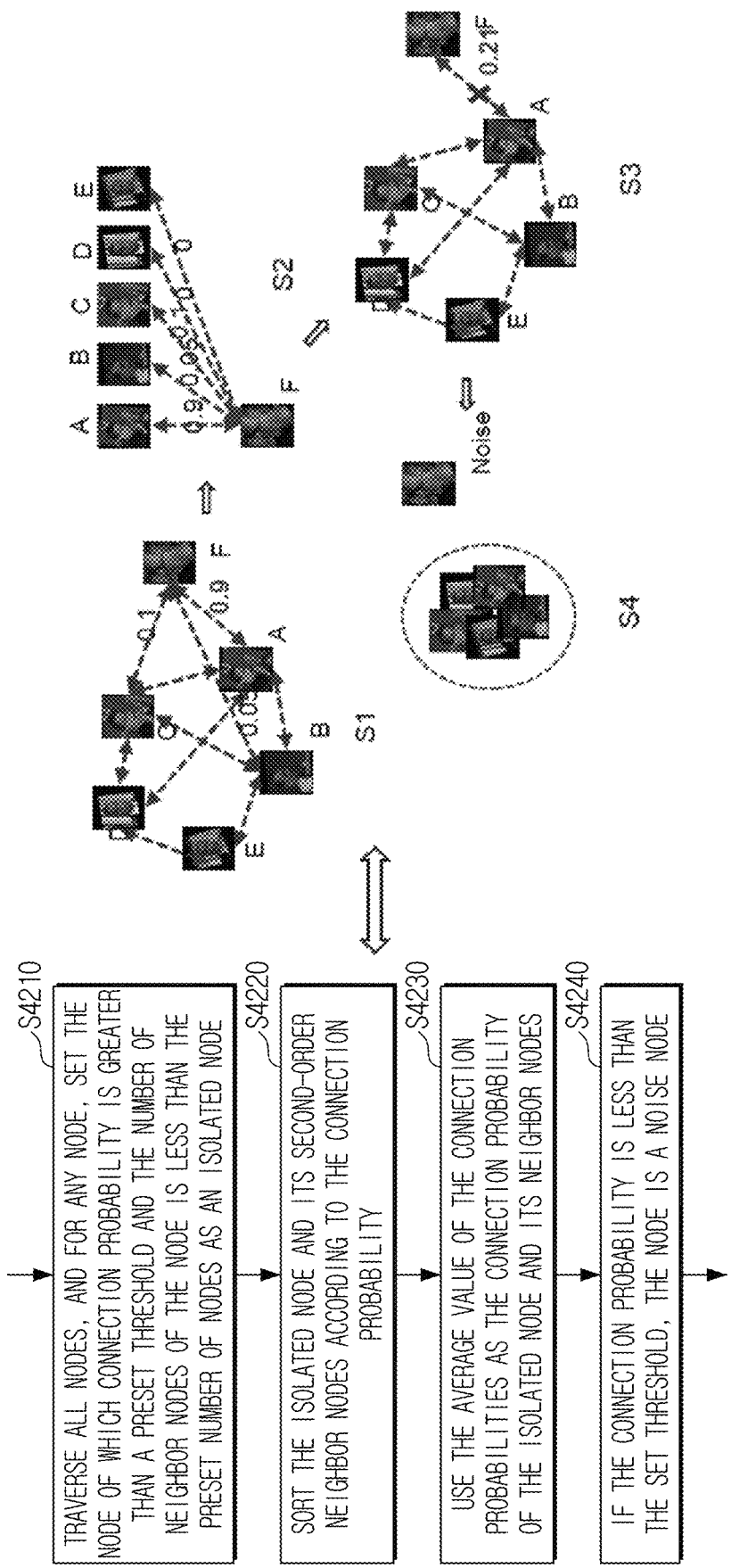
FIG. 42B is a schematic flow chart of a method for removing a noise node by an average value strategy according to an embodiment of the disclosure.

FIG. 42B is a schematic flow chart of a method for removing a noise node by an average value strategy according to the disclosure.

Referring to FIG. 42B, in an example, the process of determining a noise node may include the following operations:

S1: traversing all nodes, and for any node, setting the node of which connection probability is greater than a preset threshold and the number of neighbor nodes of the node is less than the preset number of nodes as an isolated node at operation S4210, for example, the preset number of nodes may be 2;

S2: sorting according to the connection probability of the isolated node and its second-order neighbor nodes (i.e., neighbors of neighbor nodes) at operation S4220;

S3: using the average of the connection probabilities as the connection probability of the isolated node and its neighbor nodes at operation S4230;

S4: if the connection probability is less than the set threshold, the node is a noise node (Noise) at operation S4240.

In order to improve the accuracy and stability of clustering, an average algorithm is provided in the above example to determine whether an isolated node is a noise node according to the neighbor relationship. A, B, C, D, and E are nodes of the same category. The connection probability between F and A is greater than 0.9, but the connection probabilities between F and B, C, D, and E are very small, being 0.05, 0.1, 0 And 0. The average of the connection probabilities of F and A, B, C, D, and E is taken as the connection probability of F and A. Based on this algorithm, it can be determined that F is a noise node of category A, that is, F does not belong to category A. The average value algorithm can effectively avoid clustering errors and improve the accuracy and stability of clustering.

The above explains the different manners of clustering based on the connection probability. The above clustering process is to cluster all face images to be clustered. However, in small devices such as mobile phones with limited computing resources, the initial clustering and post-adding clustering are usually used. As the number of faces to be clustered increases, the time and space complexity of the clustering algorithm provided in the disclosure also increases, requiring more computational resource consumption. Meanwhile, the user does not take all the photos at once when using the mobile phone to take pictures, but gradually accumulates them over time. Therefore, the adding method allows users to quickly see the clustering results and enhance user experience.

Figure 42C:
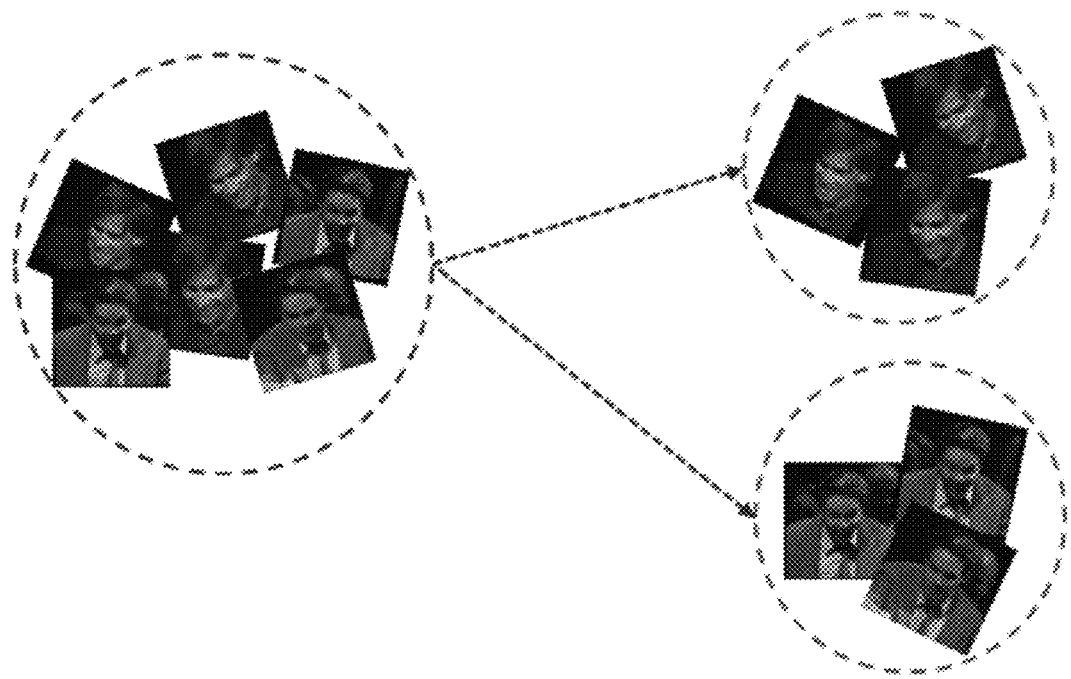
FIG. 42C is a schematic diagram of a solution for classifying categories originally belonging to the same category into two categories in an example according to an embodiment of the disclosure.

Post-Processing:

FIG. 42C is a schematic diagram of a solution for classifying categories originally belonging to the same category into two categories in an example of the application.

Referring to FIG. 42C, after the clustering is completed, there may be a case that the images of one person are clustered into two categories. The main reason for the above problem is that, in the case that there are numbers of photos for a same face, although the neural network may effectively learn to construct a global context relationship of subgraphs, it may ignore, to a possible extent, the impact of local information on clustering results. By extracting the global context relationship, a difference in facial features with larger pose differences is gradually enlarged, and finally the same category is clustered into two categories.

Therefore, regarding the above problem, the disclosure provides a feasible post-processing solution.

In a possible implementation of the embodiment of the application, the image clustering method further comprises:

(1) determining a clustering center of each category obtained by clustering respectively.

Wherein, the clustering result may be multiple categories obtained by clustering images to be clustered, and each category corresponds to multiple images.

Specifically, the determining a clustering center of each category obtained by clustering respectively may comprise: for any one of clustered categories, setting an average value of feature vectors included in the category, as the clustering center of the category.

In the specific implementation process, the images corresponding to each category are obtained, and the average value among the feature vectors of the images corresponding to each category is calculated, and the calculated average value is set as the clustering center of the one category.

(2) if a similarity between two clustering centers is not less than a set value, then combining categories corresponding to two clustering centers into a same category, to update the clustering result.

Specifically, for all categories in the clustering result, a similarity between the cluster centers of each two categories may be calculated separately, for example, the similarity may be calculated in the form of cosine distance, and if the similarity is not less than the set value, it means that these two categories may be combined into a same category.

Figure 42D:
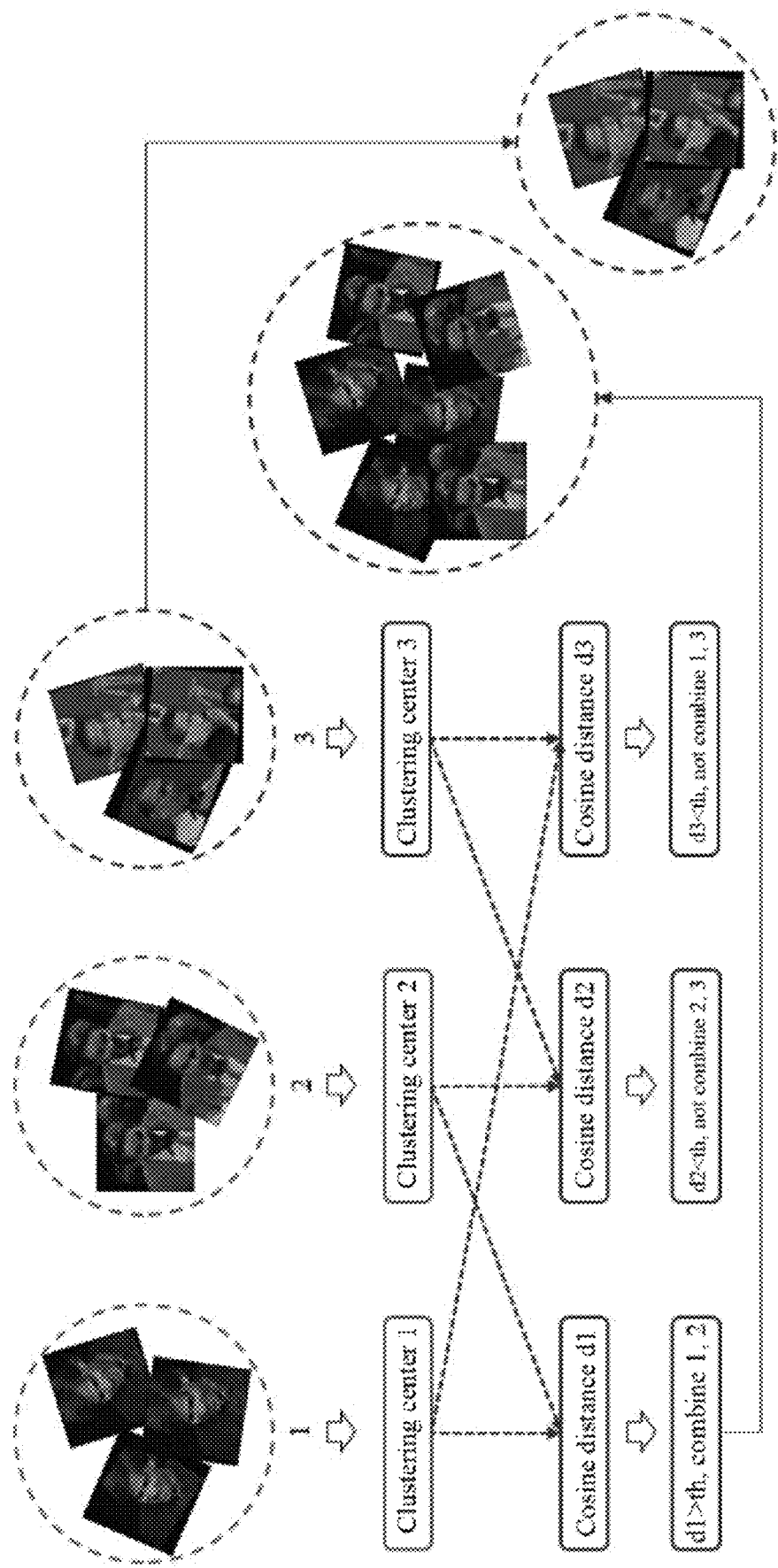
FIG. 42D is a schematic diagram of a solution for updating clustering results in an example according to an embodiment of the disclosure.

FIG. 42D is a schematic diagram of a solution for updating clustering results in an example according to an embodiment of the disclosure.

Referring to FIG. 42D, all images are clustered into 3 categories, i.e., categories 1, 2 and 3 in the figure, but there is an error result that a same person is clustered into two categories. For example, the categories "1" and "2" are photos of a same person, but are clustered into two categories by mistake. A post-processing algorithm is provided to solve this problem. The first operation is to calculate a clustering center of each category. As in FIG. 42D, feature vectors of the images in each category are summed and averaged to obtain clustering centers for the three categories, the clustering center 1, the clustering center 2, and the clustering center 3. The second operation is to calculate the cosine distances between every two clustering centers. As shown in FIG. 42D, the cosine distances d1, d2, and d3 between each clustering center and other cluster centers are calculated. The third operation is to decide whether to combine two categories according to the cosine distances. The cosine distance d1 being greater than a set value th indicates that category 1 and category 2 belong to a same category, and category 1 and category 2 are combined; the cosine distances d2, d3 being less than a set threshold indicates that categories 2 and 3 do not belong to a same category, and categories 1 and 3 do not belong to a same category, and the original categories are unchanged. Through the above process, the clustering results are updated, to obtain the final clustering results.

In a possible implementation manner of the embodiment of the application, the image clustering method further includes:
(1) obtaining new target areas to be clustered;
(2) obtaining a preset number of target areas in at least one category that has been clustered, respectively;
(3) clustering the obtained target areas that have been clustered and new target areas to be clustered based on the graph convolutional network to obtain a new clustering result; and
(4) determining a category of new target areas to be clustered based on the new clustering result and the category corresponding to the clustered target areas.

Specifically, on the basis of the obtained clustering result, when clustering new target areas to be clustered, a preset number of images can be obtained from each clustered category, and a new clustering result is obtained according to the clustered target areas and new target areas to be clustered, so as to judge a category of the new target areas to be clustered, which can be applied to small devices such as mobile phones with limited computing resources to improve clustering efficiency and enable a user to quickly see clustering results, thereby enhancing user experience.

Figure 43:
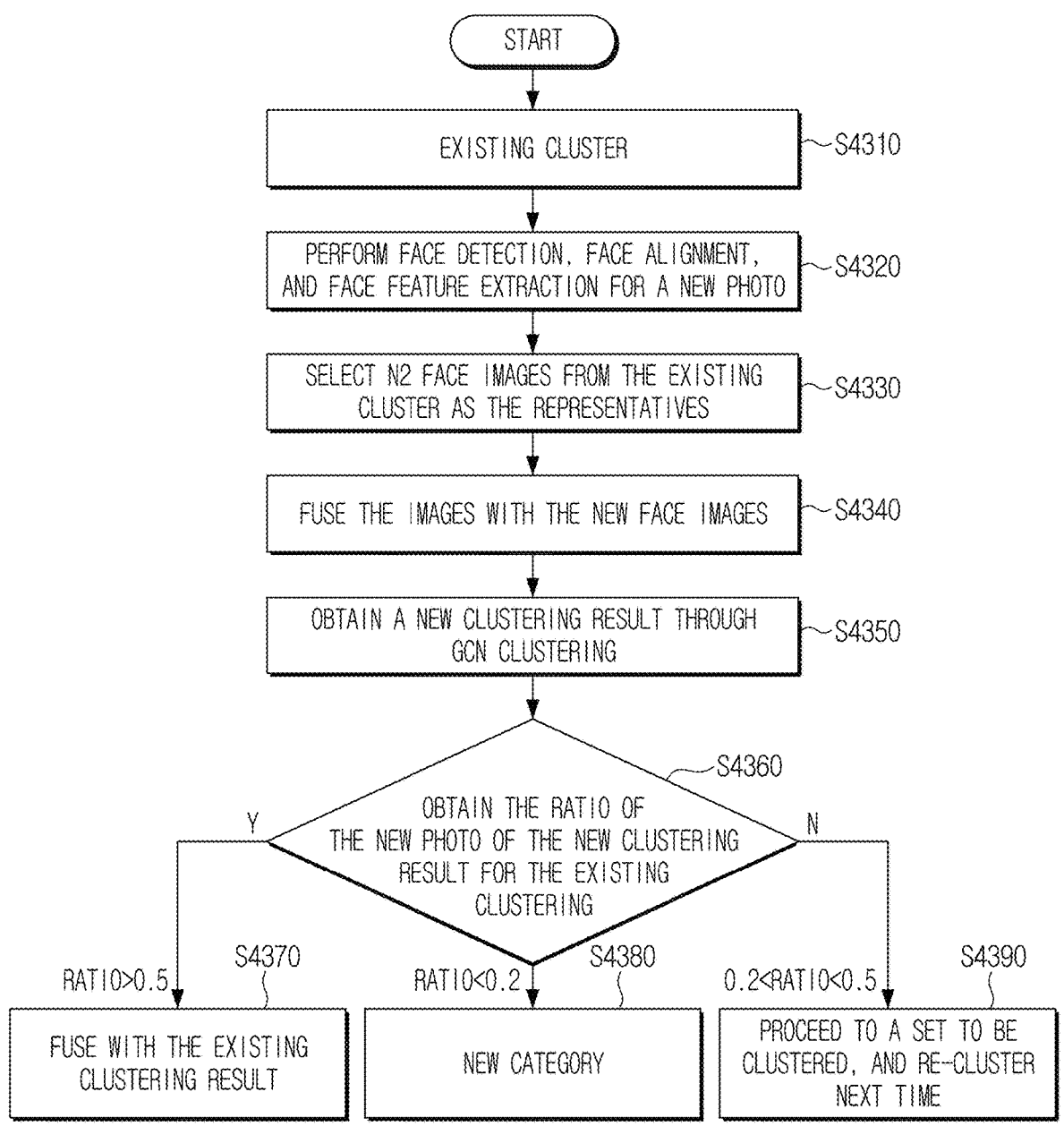
FIG. 43 is a schematic flow chart of clustering new data to be clustered according to an embodiment of the disclosure.

FIG. 43 is a schematic flow chart of clustering new data to be clustered according to an embodiment of the disclosure.

Referring to FIG. 43, at the initial clustering node, a set number of N faces is selected for clustering, to obtain n face categories, that is, the clustered categories, at operation S4310. When new photos are detected, the face detection, face alignment, and face feature extraction are performed on the new photos, to obtain the features of each face, at operation S4320. n2 face images are randomly selected from the n clustered categories as representatives of the category at operation S4330, to fuse with the new face images at operation S4340 and cluster the fused images at the same time at operation S4350. The ratio of the new photo in the new clustering result to the existing clustering result is calculated at operation S4360, and if the ratio is greater than the set ratio 1 (for example, 0.5), it will be fused into the existing clustering result at operation S4370. If it is less than the set ratio 2 (for example, 0.2), it will be regarded as a new category at operation S4380. If it is greater than 0.2 and less than 0.5, it will not perform any operation, the new photo will proceed to a set of photos to be clustered at operation S4390, and re-clustering will be performed in the next clustering.

In order to understand the application of the image clustering method of the disclosure more clearly, the image clustering method of the disclosure will be described below in conjunction with examples.

In a possible implementation manner of the embodiment of the application, the image clustering method may further include:
(1) receive a keyword for image search input by a user;
(2) determine a category associated with the keyword based on the clustering result; and
(3) search for images matching the keyword among images in the determined category.

Specifically, when a user needs to search for images that match keywords in a large number of images, since the direct search may be less accurate and time-consuming, the category associated with the keyword may be first determined from multiple clustered categories.

For example, when needing to search for the name of a person in a large number of images with various categories, the category of "female stars" may be determined in the clustered categories, and then keywords may be searched from the determined categories, which can be effective to improve search efficiency and reduce search time.

In a possible implementation manner of the embodiment of the application, the image clustering method may further include:
(1) obtain a plurality of tags to be marked; and
(2) mark the tags on the target areas in respective clustered categories, respectively, based on the clustering result.

Specifically, in the process of labeling a large number of images of various categories, first the target areas may be clustered, to determine which categories the target areas can be clustered into, and then the closest tag for each label to be labeled may be determined for automatic labeling of categories, which can effectively improve labeling efficiency.

According to the application scenarios and the requirements of the hardware environment, the disclosure can use different solutions to complete the corresponding tasks.

1) High-Performance Clustering Solution on Mobile-End

Figure 44:
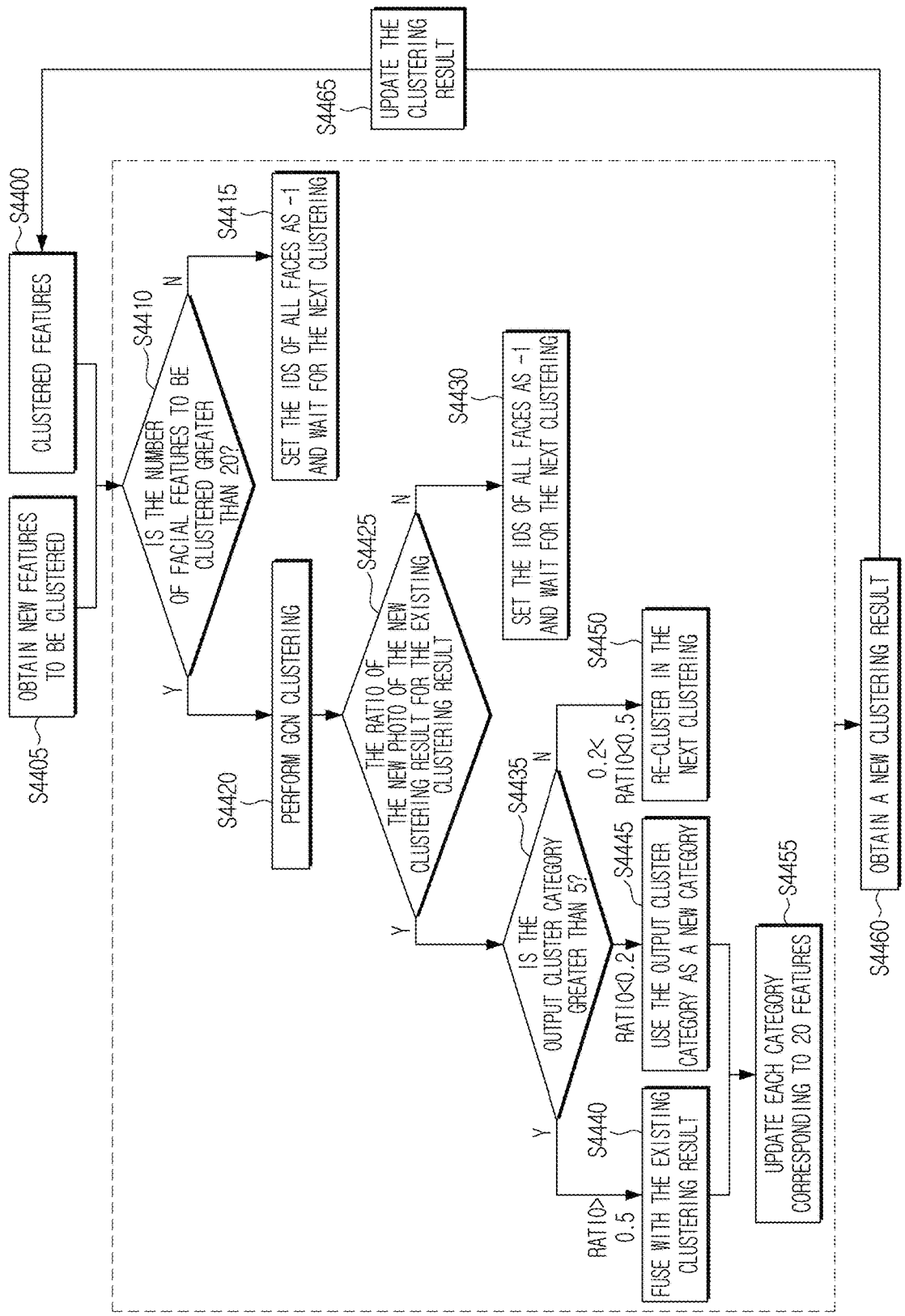
FIG. 44 is a schematic flow chart of an image clustering method applied to a mobile terminal according to an embodiment of the disclosure.

The mobile-end integration method requires low computing resource consumption, and uses low-channel, low-dimensional, and low-input solutions in network model design. The solution of initial clustering and additional clustering is used in the clustering logic, and as shown in FIG. 44, the specific workflow is:

FIG. 44 is a schematic flow chart of an image clustering method applied to a mobile terminal according to an embodiment of the disclosure.

S1: perform face detection, face alignment and face feature extraction (128-dimensional face feature extraction) on photos in the mobile album at operation S4400;

S2: use GCN to predict the connection probability of nodes for existing face features, to complete clustering through post-processing algorithms to obtain initial clustering results;

S3: The electronic device obtains new features to be clustered at operation S4405. When new facial features to be clustered are obtained, the electronic device selects six facial features from clustered categories as representatives by using the features previously extracted at operation S4400 and the features newly obtained at operation S4405, and forms a new set to be clustered, and determines whether the number of facial features to be clustered is greater than a set threshold (for example, 20). As an example, the electronic device determines whether the number of facial features to be clustered is greater than 20 at operation S4410; if the number of facial features to be clustered is less than 20 at operation S4415-N, the electronic device sets the IDs of all faces as −1 and waits for the next clustering at operation S4415. Meanwhile, if the number of facial features to be clustered is greater than 20 at operation S4410-Y, the electronic device performs GCN clustering at operation S4420;

S4: use GCN to predict the connection probability of nodes, to complete clustering through post-processing algorithms;

S5: The electronic device determines whether the category of clustering is greater than a set number (for example, 5). As an example, the electronic device determines whether the output cluster category is greater than 5 at operation (S4425). If the category is less than 5 at operation S4425-N, the electronic device sets the IDs of all faces as 1 and waits for the next clustering at operation S4430. If the output cluster category is greater than 5 at operation S4425-Y, the electronic device proceeds to the next operation;

S6: If the output cluster category is greater than 5 at operation S4425-Y, the electronic device calculates the ratio of the new photo of the new clustering result for the existing clustering result at operation S4435, and here, if the ratio is greater than the set ratio 1 (for example, 0.5), the electronic device fuses the ratio into the existing clustering result at operation S4440. If the ratio is less than the set ratio 2 (for example, 0.2), it will be regarded as a new category, and the electronic device may use the output cluster category as a new category at operation S4445. Meanwhile, if the ratio is greater than 0.2 and less than 0.5, the electronic device may not perform any operation, and re-clustering may be performed in the next clustering at operation S4450.

Then, the electronic device may update each category corresponding to twenty features at operation S4455, and obtain a new clustering result at operation at operation S4460. Then, the electronic device may update the clustering result at operation S4465, and repeat the aforementioned process.

Figure 45:
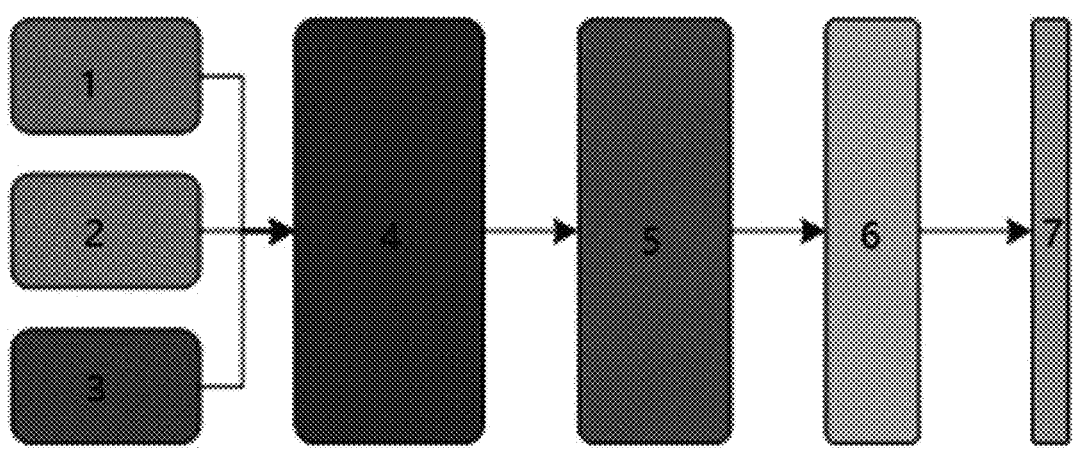
FIG. 45 is a schematic diagram of a neural network structure applied to a mobile terminal according to an embodiment of the disclosure.

FIG. 45 is a schematic diagram of a neural network structure applied to a mobile terminal according to an embodiment of the disclosure.

Referring to FIG. 45, the neural network model of the mobile end is shown in FIG. 45, where box 1 represents the adjacency matrix A of the subgraph, A is an N*N matrix, N=31 represents the number of nodes; box 2 represents the feature matrix F of the subgraph, F is an N*d matrix, and d=128 represents the dimension of the feature; box 3 represents the label "Node" of the first-order neighbor, "Node" is a 1*k1 matrix, and k1=10 represents the number of the first-order neighbors of the central node; Box 4, Box 5, and Box 6 all represent the GCN network layer for node feature extraction, different color shades indicate that the output channels of the GCN network layer are different, and a narrower channel corresponds to a smaller channel with less corresponding calculation amount; Box 7 represents the fully connected layer, for predicting the probability that the central node is connected to its first-order neighbor nodes.

2) Server-End High-Performance Solution

Figure 46:
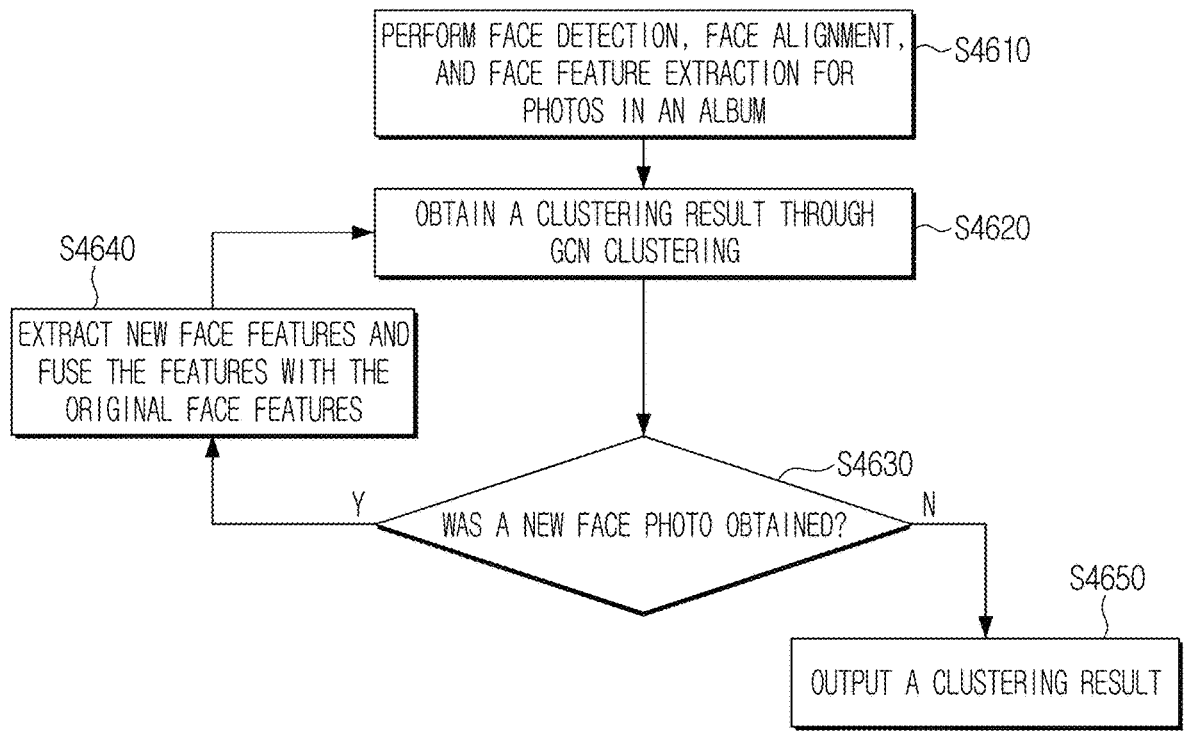
FIG. 46 is a schematic flow chart of an image clustering method applied to a server according to an embodiment of the disclosure.

Large servers have strong computing power and large memory, so a large neural network model is used to improve the accuracy of the clustering. The neural network structure that introduces hierarchical clustering, that is, the neural network structure shown in FIG. 37B has a high F1-score on multiple test sets, and can be used for tasks that require F1-score indicators. The neural network that introduces the shot-cut mechanism, that is, the neural network shown in FIG. 37A, has high accuracy and is suitable for tasks that require accuracy indicators. As shown in FIG. 46, the deployment flow is:

FIG. 46 is a schematic flow chart of an image clustering method applied to a server according to an embodiment of the disclosure.

S1: The electronic device performs face detection, face alignment and face feature extraction on photos in an album at operation S4610;

S2: use GCN to predict the connection probability of nodes for existing face features, to complete clustering through post-processing algorithms to obtain initial clustering results; that is, the electronic device may obtain initial clustering results through clustering using GCN at operation S4620.

S3: The electronic device may identify whether a new face photo is obtained at operation S4630. If a new face photo is obtained at operation S4630-Y, the electronic device extracts the facial features of the new face photo, and fuses the features with the facial features of the original face photo, and performs re-clustering at operation S4640. Then, the electronic device may repeat the aforementioned operations S4620, S4630, and S4640.

If a new face photo is no longer obtained at operation S4630-N, the electronic device may output the clustering result at operation S4650.

In the above image clustering methods, the disclosure clusters target areas of each image through the graph convolutional network, without determining a clustering center, so the deviation of the entire clustering result caused by the deviation of the clustering center can be avoided. And as a result, the accuracy of the clustering results can be effectively improved.

Further, distance between nodes is calculated by using cosine similarity. Cosine distance distinguishes the difference between features from the direction. Regarding different poses, different illumination and different moments for one person, difference in facial features is relatively large, but still means the same person. Compared with Euclidean distance that reflects the absolute difference of feature in terms of value, if the Euclidean distance is used, it will cause a same person to be clustered into two persons. Therefore, the use of cosine distance in the disclosure can further improve the accuracy of the clustering.

Further, the disclosure introduces a shot-cut mechanism on a graph convolutional network to fuse output results of a graph convolutional network for different layers, and the closer to a back layer of the graph convolutional network is, the smaller the difference between nodes in a same category is, such that the difference between different nodes can be maintained to a certain extent, problem of clustering different nodes into a same category is avoided, and the clustering accuracy is further improved.

Furthermore, the hierarchical clustering is introduced behind at least one layer of original graph convolutional network, and the hierarchical clustering can be used in any layer of graph convolutional network and can fuse nodes belonging to a same category during a transfer process of the graph convolutional network, that is, one clustering function has been completed for nodes within the graph convolutional network, thereby improving accuracy and efficiency of an entire clustering work.

Furthermore, on the basis of clustered categories, when new target areas to be clustered are obtained, a preset number of images can be obtained from each clustered category, and a new clustering result is obtained according to the images that have been clustered and new target areas to be clustered, so as to judge a category of the new target areas to be clustered, which can be applied to small devices such as mobile phones with limited computing resources to improve clustering efficiency and enable a user to quickly see clustering results, thereby enhancing user experience.

The foregoing embodiment introduces the image clustering method from the perspective of the method flow. The following describes the image clustering method from the perspective of the virtual module, which is specifically as follows:

An embodiment of the disclosure provides an image clustering apparatus 700.

Figure 47:
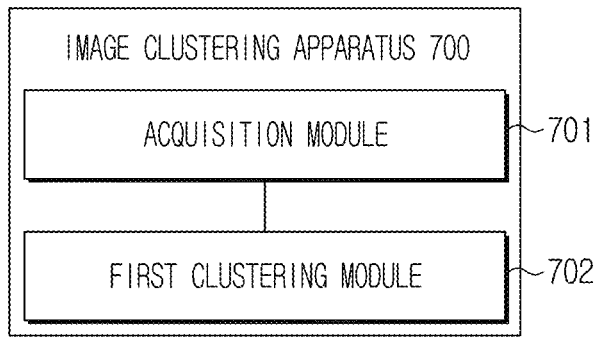
FIG. 47 is a schematic structural diagram of an image clustering apparatus according to an embodiment of the disclosure.

FIG. 47 is a schematic structural diagram of an image clustering apparatus according to an embodiment of the disclosure.

Referring to FIG. 47, the image clustering apparatus 700 may include an acquisition module 701 and a first clustering module 702, wherein:

the acquisition module 701 is configured to obtain target areas of all images to be clustered, and to obtain feature vectors of the target areas; and the first clustering module 702 is configured to cluster the obtained feature vectors based on a graph convolutional network to obtain a result.

In a possible implementation of the embodiment of the disclosure, the first clustering module 702, when clustering the obtained feature vectors based on the graph convolutional network to obtain the result may be specifically configured to:

construct a subgraph corresponding to the feature vectors, wherein the subgraph comprises a central node corresponding to the feature vectors and at least one neighbor node corresponding to other feature vectors; and determine a connection probability between a central node of the subgraph and a neighbor node thereof based on the graph convolutional network, and cluster the target areas according to the determined connection probability to obtain the result.

In a possible implementation manner of the embodiment of the application, when constructing a subgraph corresponding to feature vectors, the first clustering module 702 is specifically configured to:

obtain, by taking the feature vectors as the central node, a neighbor node of the central node from other feature vectors.

construct the subgraph according to the central node and the neighbor node.

In a possible implementation manner of the embodiment of the disclosure, when obtaining, by taking the feature vectors as the central node, a neighbor node of the central node from other feature vectors, the first clustering module 702 is specifically configured to:

obtain cosine distances between the feature vectors and other feature vectors respectively; and screen a neighbor node of the feature vector form other feature vectors based on the cosine distances between the feature vector and other feature vectors.

In a possible implementation manner of the embodiment of the disclosure, when determining a connection probability between a central node of the subgraph and a neighbor node thereof based on the graph convolutional network, the first clustering module 702 is specifically configured to:

obtain node embedding of the subgraph according to at least one layer of graph convolutional network; and obtain a connection probability between the central node of the subgraph and the neighbor node thereof based on the node embedding.

In a possible implementation manner of the embodiment of the disclosure, when obtaining node embedding of the subgraph according to at least one layer of graph convolutional network, the first clustering module 702 is specifically configured to:

obtain an input feature corresponding to the subgraph; and input the input feature into the at least one layer of graph convolutional network for feature extraction, and use an output result of the last layer of graph convolutional network as the node embedding.

In a possible implementation manner of the embodiment of the disclosure, for at least one layer of graph convolutional network other than a first layer of graph convolutional network, the output result of a previous layer of graph convolutional network is used as the input of the at least one layer of graph convolutional network; or the output result of the previous layer of graph convolutional network and the output result of the at least one-layer graph convolutional network previous to the previous graph convolutional network are fused as the input of the at least one layer of graph convolutional network.

In a possible implementation manner of the embodiment of the disclosure, at least two adjacent graph convolutional networks comprise a clustering layer therebetween, and the clustering layer clusters feature vectors of respective nodes included in the output result of the precious layer of graph convolutional network and inputs the clustering result into the next layer of graph convolutional network.

In a possible implementation manner of the embodiment of the disclosure, when clustering the target areas according to the determined connection probability, the first clustering module 702 is specifically configured to:

obtain, for at least one target area to be clustered, a set of neighbor nodes in a same category according to the connection probability between the corresponding central node and neighbor nodes;

adjust, for at least one neighbor node in the set of neighbor nodes in a same category, the connection probability of the at least one neighbor node and the central node according to connection probabilities of the at least one neighbor node and respective neighbor nodes in the set of neighbor nodes in a same category;

cluster the target areas based on the adjusted connection probability to determine whether the at least one neighbor node is a neighbor node in a same category; and cluster respective target areas to be clustered according to neighbor nodes in a same category corresponding to respective target areas to be clustered.

In a possible implementation manner of the embodiment of the disclosure, when obtaining, for at least one target area to be clustered, a set of neighbor nodes in a same category according to the connection probability between the corresponding central node and neighbor nodes, the first clustering module 702 is specifically configured to:

determine, for at least one target area to be clustered, neighbor nodes of which connection probabilities with the central node are not less than a preset threshold, and form the determined neighbor nodes as a set of neighbor nodes in the same category.

In a possible implementation manner of the embodiment of the disclosure, when adjusting, for at least one neighbor node in the set of neighbor nodes in a same category, the connection probability of the at least one neighbor node and the central node according to connection probabilities of the at least one neighbor node and respective neighbor nodes in the set of neighbor nodes in a same category, the first clustering module 702 is specifically configured to:

determine, for at least one neighbor node in the set of neighbor nodes in a same category, an average connection probability of the at least one neighbor node and respective neighbor nodes in the set of neighbor nodes in a same category, as the connection probability of the at least one neighbor node and the central node.

In a possible implementation manner of the embodiment of the disclosure, when clustering respective target areas to be clustered according to neighbor nodes in a same category corresponding to respective target areas to be clustered, the first clustering module 702 is specifically configured to:

determine connection probabilities among central nodes corresponding to respective target areas to be clustered according to neighbor nodes in a same category corresponding to respective target areas to be clustered; and cluster respective target areas to be clustered based on connection probabilities between respective central nodes.

In a possible implementation manner of the embodiment of the disclosure, the image clustering apparatus further includes a searching module configured to:

receive a keyword for image search input by a user;
determine a category associated with the keyword based on the clustering result; and
search for images matching the keyword among images in the determined category.

In a possible implementation manner of the embodiment of the disclosure, the image clustering apparatus further includes a labeling module configured to:

obtain a plurality of tags to be marked; and
mark the tags on the target areas of images in respective clustered categories, respectively, based on the clustering result.

In a possible implementation of the embodiment of the disclosure, an update module is further included, the update module is configured to:

determine a clustering center of each category obtained by clustering respectively; and
if a similarity between two clustering centers is not less than a set value, combine categories corresponding to two clustering centers into one same category, to update the clustering result.

In a possible implementation of the embodiment of the disclosure, the update module is, when determining a clustering center of each category obtained by clustering respectively, specifically configured to:

for a clustered category, setting an average value of feature vectors included in the category, as the clustering center of the category.

In a possible implementation manner of the embodiment of the disclosure, the image clustering apparatus further includes a second clustering module configured to:

obtain new target areas of images to be clustered;
obtain a preset number of target areas in at least one clustered category, respectively;
cluster the obtained clustered target areas and new target areas to be clustered based on the graph convolutional network to obtain a new clustering result; and
determine a category of new target areas to be clustered based on the new clustering result and the category corresponding to the clustered target areas.

In the above image clustering apparatus, the disclosure clusters target areas of all images through the graph convolutional network, without determining a clustering center, such that the deviation of the entire clustering result caused by the deviation of the clustering center can be avoided. And as a result, the accuracy of the clustering can be effectively improved.

Further, distance between nodes is calculated by using cosine similarity. Cosine distance distinguishes the difference between features from the direction. Regarding different poses, different illumination and different moments for one person, difference in facial features is relatively large, but still means the same person. Compared with Euclidean distance that reflects the absolute difference of feature in terms of value, if using the Euclidean distance, it will cause these to be clustered into two persons. Therefore, the use of cosine distance in the disclosure can further improve accuracy of clustering.

Further, the disclosure introduces a shot-cut mechanism on a graph convolutional network to fuse output results of a graph convolutional network for different layers, and the closer to a back layer of the graph convolutional network is, the smaller the difference between nodes in a same category is, such that the difference between different nodes can be maintained to a certain extent, avoiding clustering different nodes into a same category, and further improving accuracy of clustering.

Furthermore, hierarchical clustering is introduced next to at least one layer of original graph convolutional network, which the hierarchical clustering can be used in any layer of graph convolutional network and can fuse nodes belonging to a same category during a transfer process of the graph convolutional network, that is, one clustering function has been completed for nodes within the graph convolutional network, thereby improving accuracy and efficiency of an entire clustering work.

Furthermore, on the basis of clustering, when new target areas to be clustered is obtained, a preset number of images can be obtained from each clustered category, and a new clustering result is obtained according to the clustered images and new target areas to be clustered, so as to judge a category of the new target areas to be clustered, which can be applied to small devices such as mobile phones with limited computing resources to improve clustering efficiency and enable a user to quickly see clustering results, thereby enhancing user experience.

The image clustering apparatus of the embodiments of the disclosure can execute an image clustering method provided by the embodiments of the disclosure, and its implementation principle is similar. The actions executed by the modules in the image clustering apparatus in each embodiment of the disclosure corresponds to the operations in the image clustering method in each embodiment of the disclosure. For detailed functional descriptions of the modules of the image clustering apparatus, it may be referred to the description in the corresponding image clustering method shown in the previous section, which may not be repeated herein.

In the apparatus provided in the embodiments of disclosure, at least one module among the plurality of modules may be implemented through an artificial intelligence (AI) model. The functions associated with AI may be performed through a non-volatile memory, a volatile memory, and a processor.

The processor may include one or more processors. At this time, the one or more processors may be a general-purpose processor (such as a central processing unit (CPU), an application processor (AP), etc.), or a pure graphics processing unit (such as a graphics processing unit (GPU), a visual processing unit (VPU) and/or an AI dedicated processor (for example, neural processing unit (NPU)).

The one or more processors control the processing of input data according to predefined operating rules or artificial intelligence (AI) models stored in the non-volatile memory and volatile memory. Predefined operating rules or artificial intelligence models are provided through training or learning.

Here, "providing by learning" refers to obtain a predefined operation rule or an AI model having desired features by applying a learning algorithm to multiple learning data. The learning may be performed in the apparatus itself in which AI according to the embodiments are executed, and/or may be realized by a separate server/system.

The AI model may consist of multiple neural network layers. Each layer has multiple weight values, and the computation of one layer is performed by the computation result of the previous layer and the multiple weights of the current layer. Examples of neural networks include but are not limited to a CNN, a deep neural network (DNN), an RNN, a restricted Boltzmann machine (RBM), a deep belief network (DBN), a bidirectional recurrent deep neural network (BRDNN), a generative adversarial network (GAN), and a deep Q network.

A learning algorithm is a method of training a predetermined target device (e.g., a robot) using multiple learning data to enable, allow, or control the target device to make a determination or prediction. Examples of the learning algorithm include but are not limited to supervised learning, unsupervised learning, semi-supervised learning, or reinforcement learning.

The image clustering apparatus provided by the embodiment of the disclosure is introduced above from the perspective of functional modularization. Next, the electronic device provided by the embodiment of the disclosure will be introduced from the perspective of hardware materialization, and the computing system of the electronic device will be introduced at the same time.

Based on the same principle as the method shown in the embodiments of the disclosure, an electronic device is also provided in the embodiment of the disclosure. The electronic device may include, but is not limited to: a processor and a memory, the memory being for storing computer operation instructions, and the processor being for executing the image clustering method shown in the embodiments by calling the computer operation instructions. Compared with the related art, the image clustering method provided by embodiments of the disclosure may avoid deviation of a total clustering result caused by deviation of the clustering center, and can effectively improve accuracy of a clustering result.

In an optional embodiment, an electronic device is provided.

Figure 48:
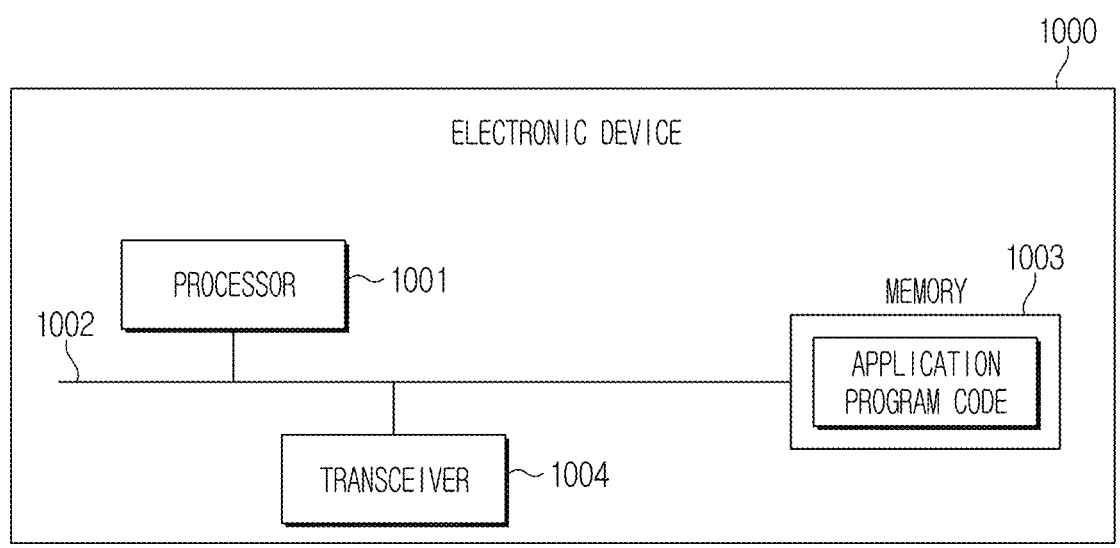
FIG. 48 is a schematic structural diagram of an electronic device according to an embodiment of the disclosure.

FIG. 48 is a schematic structural diagram of an electronic device according to an embodiment of the disclosure.

Referring to FIG. 48, the electronic device 1000 shown in FIG. 48 includes a processor 1001 and a memory 1003. Wherein, the processor 1001 and the memory 1003 are connected, for example, through a bus 1002. Optionally, the electronic device 1000 may further include a transceiver 1004. It should be noted that, in practical applications, the transceiver 1004 is not limited to one, and the structure of the electronic device 1000 does not limit the embodiments of the disclosure.

The processor 1001 may be a central processing unit (CPU), a general-purpose processor, a data signal processor DSP), an application specific integrated circuit (ASIC), or a field programmable gate array (FPGA) or other programmable logic devices, transistor logic devices, hardware components or any combination thereof. These may implement or execute various logical blocks, modules, and circuits described in connection with the disclosure of the disclosure. The processor 1001 may also be a combination that realizes a computing function, for example, a combination including one or more microprocessors, a combination of a DSP and a microprocessor, and the like.

The bus 1002 may include a path for transmitting information between the aforementioned components. The bus 1002 may be a peripheral component interconnect (PCI) bus or an extended industry standard architecture (EISA) bus, or the like. The bus 1002 can be divided into an address bus, a data bus, a control bus, and the like. For ease of representation, only one thick line is used in FIG. 48, but it does not mean that there is only one bus or one category of bus.

The memory 1003 may be a read only memory (ROM) or other categories of static storage devices that can store static information and instructions, a random access memory (RAM), or other categories of dynamic storage device that can store information and instructions, which can also be electrically erasable programmable read only memory (EEPROM), compact disc read only memory (CD-ROM) or other optical disk storage, optical disk storage (including compression Optical discs, laser discs, optical discs, digital versatile discs, Blu-ray discs, etc.), disk storage media or other magnetic storage devices, or can be any other medium used to carry or store instructions or desired program codes in the form of data structures and can be accessed by a computer, which is not limited to this.

The memory 1003 is configured to store application program codes for executing the solution of the disclosure, and is controlled by the processor 1001 to perform execution. The processor 1001 is configured to execute application program codes stored in the memory 1003 to implement the content shown in any one of the foregoing method embodiments.

In particular, the processor 1001 according to the disclosure may obtain a plurality of images for performing clustering. The plurality of images may include, for example, face photos, but the disclosure is not limited thereto.

When a plurality of images are obtained, the processor 1001 may obtain a plurality of target areas corresponding to each of the plurality of images, and obtain a plurality of feature vectors corresponding to the plurality of target areas.

Then, the processor 1001 may obtain a plurality of central nodes corresponding to the plurality of feature vectors, and obtain neighbor nodes associated with each of the plurality of central nodes.

Then, the processor 1001 may obtain a subgraph based on the plurality of central nodes and the neighbor nodes. Specifically, the processor 1001 may identify one of the plurality of feature vectors as the central node, obtain a neighbor node of the central node based on feature vectors different from the feature vector corresponding to the central node, and obtain a subgraph according to the central node and the neighbor node. Also, the processor 1001 may obtain neighbor nodes by obtaining respective cosine distances between the feature vector corresponding to the central node and the feature vectors different from the feature vector corresponding to the central node, and screening neighbor nodes from the feature vectors different from the feature vector corresponding to the central node based on the cosine distances.

Then, the processor 1001 may obtain connection probabilities between the plurality of central nodes of the subgraph and the neighbor nodes of each of the plurality of central nodes based on a graph convolutional network. Specifically, the processor 1001 may obtain node embedding of the subgraph according to at least one layer of the graph convolutional network, and obtain connection probabilities between the central nodes of the subgraph and the neighbor nodes thereof based on the node embedding. As an example, the processor 1001 may obtain node embedding by obtaining input features corresponding to the subgraph, and inputting the input features into the at least one layer of the graph convolutional network for feature extraction, and using the obtained output result as the node embedding.

Then, the processor 1001 may cluster target areas based on the identified connection probabilities. Specifically, the processor 1001 may obtain, for at least one target area to be clustered, a set of neighbor nodes in a same category according to the connection probabilities, and adjust, for at least one neighbor node in the set of neighbor nodes in the same category, the connection probability of the at least one neighbor node and the central node according to the connection probabilities of the at least one neighbor node and respective neighbor nodes in the set of neighbor nodes in the same category, and cluster the target areas based on the adjusted connection probability to determine whether the at least one neighbor node is a neighbor node in the same category, and cluster respective target areas to be clustered according to the neighbor nodes in the same category corresponding to the respective target areas to be clustered.

According to an embodiment of the disclosure, the processor 1001 may obtain a set of neighbor nodes by determining, for the at least one target area to be clustered, neighbor nodes of which connection probabilities with the central node are not less than a preset threshold, and forming the determined neighbor nodes as the set of neighbor nodes in the same category.

According to an embodiment of the disclosure, the processor 1001 may determine, for at least one neighbor node in the set of neighbor nodes in the same category, the average connection probability of the at least one neighbor node and respective neighbor nodes in the set of neighbor nodes in the same category as the connection probability of the at least one neighbor node and the central node. Also, according to an embodiment of the disclosure, the processor 1001 may determine connection probabilities among central nodes corresponding to respective target areas to be clustered according to neighbor nodes in the same category corresponding to the respective target areas to be clustered, and cluster the respective target areas to be clustered based on the connection probabilities between the respective central nodes.

Further, the processor 1001 may receive a keyword for image search input by a user, identify a category associated with the keyword based on the clustering result, and search for images matching the keyword among images in the identified category.

Figure 49:
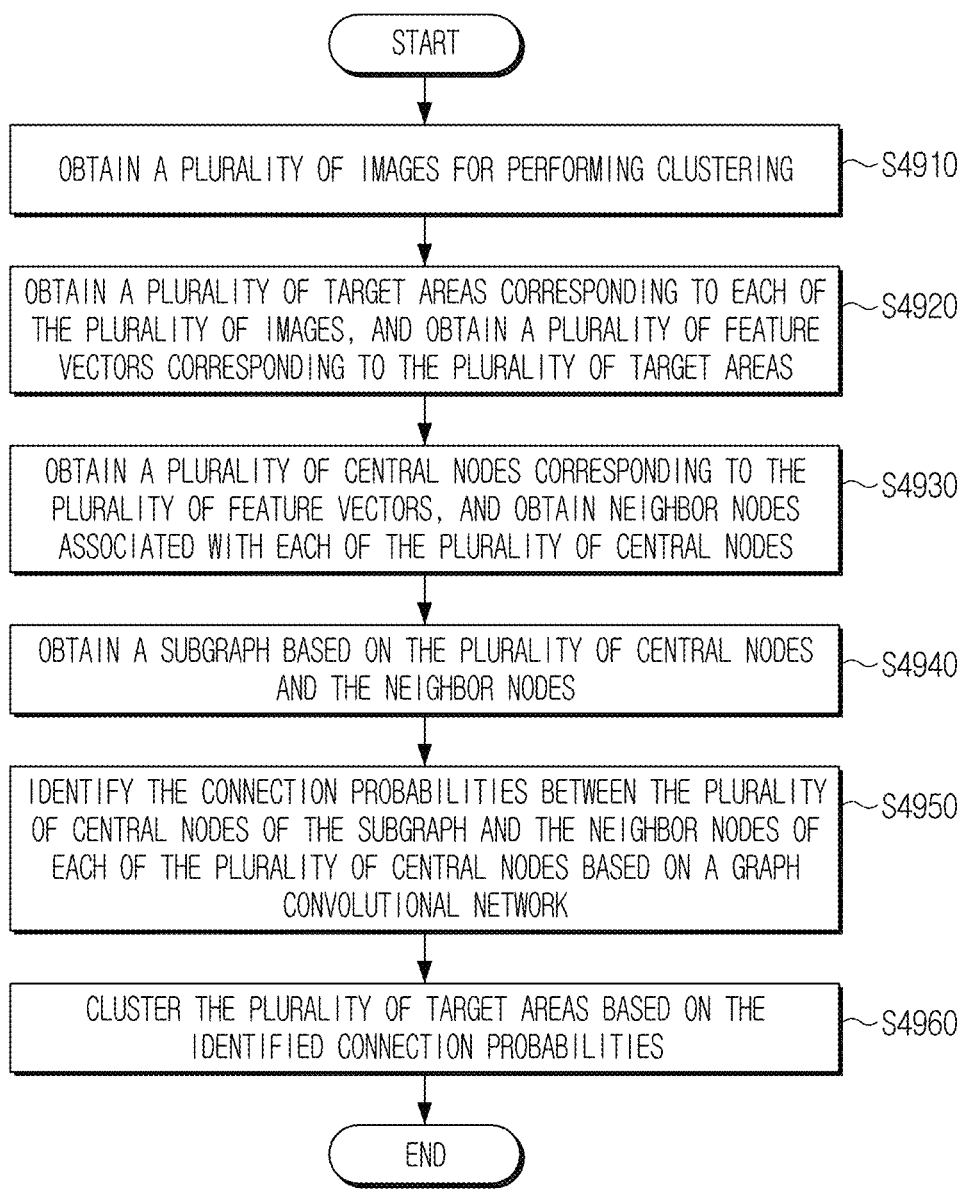
FIG. 49 is a schematic flow chart of an image clustering method according to an embodiment of the disclosure.

FIG. 49 is a schematic flow chart of an image clustering method according to an embodiment of the disclosure.

Referring now to FIG. 49, the electronic device 1000 obtain a plurality of images for performing clustering at operation S4910. The plurality of images may include, for example, a photograph of a face, but the present disclosure is not limited thereto.

Based on the plurality of images being obtained, the electronic device 1000 obtain a plurality of target areas, corresponding to each of the plurality of images, and a plurality of feature vectors corresponding to the plurality of target areas at operation S4920.

And the electronic device 1000 obtain a plurality of central nodes corresponding to the plurality of feature vectors, and a plurality of neighbor nodes associated with each of the plurality of central nodes at operation S4930.

And the electronic device 1000 obtain a subgraph based on the plurality of central nodes and the neighbor nodes at operation S4940. Specifically, the electronic device 1000 identify one of the plurality of feature vectors as corresponding to the central node and obtain the neighbor node associated with the central node based on feature vectors different from the feature vector corresponding to the central node and construct the subgraph according to the central node and the neighbor node. And the electronic device 1000 obtain cosine distances between the feature vector corresponding to the central node and the feature vectors different from the feature vector corresponding to the central node and screening the neighbor node from the feature vectors different from the feature vector corresponding to the central node based on the cosine distances.

And the electronic device 1000 identify the connection probabilities between the plurality of central nodes of the subgraph and the neighbor nodes of each of the plurality of central nodes based on a GCN, at operation S4950. Specifically, the electronic device 1000 obtain node embedding of the subgraph according to at least one layer of the graph convolutional network and obtain a connection probability between the central node of the subgraph and a neighbor node thereof based on the node embedding. According to an embodiment of the disclosure the electronic device 1000 obtain input features corresponding to the subgraph and input the input features into the at least one layer of the graph convolutional network for feature extraction and using an obtained output result as the node embedding.

And the electronic device 1000 cluster the plurality of target areas based on the identified connection probabilities, at operation S4960. Specifically, the electronic device 1000 obtain for at least one target area to be clustered, a set of neighbor nodes in a same category according to the connection probabilities and adjust for at least one neighbor node in the set of neighbor nodes in the same category, a connection probability of the at least one neighbor node and the central node according to the connection probabilities of the at least one neighbor node and respective neighbor nodes in the set of neighbor nodes in the same category and cluster the plurality of target areas based on the adjusted connection probability to determine whether the at least one neighbor node is a neighbor node in the same category and cluster respective target areas to be clustered according to the neighbor nodes in the same category corresponding to the respective target areas to be clustered.

According to an embodiment of the disclosure the electronic device 1000 determine, for the at least one target area to be clustered, neighbor nodes of which connection probabilities with the central node are not less than a preset threshold, and forming the determined neighbor nodes as the set of neighbor nodes in the same category.

According to an embodiment of the disclosure the electronic device 1000 determine for at least one neighbor node in the set of neighbor nodes in the same category, an average connection probability of the at least one neighbor node and respective neighbor nodes in the set of neighbor nodes in a same category as the connection probability of the at least one neighbor node and the central node.

According to an embodiment of the disclosure the electronic device 1000 determine connection probabilities among central nodes corresponding to respective target areas to be clustered according to neighbor nodes in the same category corresponding to the respective target areas to be cluster and cluster the respective target areas to be clustered based on the connection probabilities among the respective central nodes.

According to an embodiment of the disclosure the electronic device 1000 receive a keyword for image search input by a user and identify a category associated with the keyword based on a clustering result and search for images matching the keyword among images in the identified category.

Wherein, electronic devices include but are not limited to: mobile terminals (e.g., mobile phones, notebook computers, digital broadcast receivers, PDAs (personal digital assistants), PAD (tablet computers), PMP (portable multimedia players), vehicle terminals (such as vehicle navigation terminals), etc.) and fixed terminals such as digital TVs, desktop computers, etc. The electronic device shown in FIG. 48 is only an example, and should not bring any limitation to the function and scope of use of the embodiments of the disclosure.

The embodiment of the disclosure provides a computer readable storage medium with a computer program stored on the computer readable storage medium, and when it runs on a computer, the computer can execute the corresponding content in the foregoing method embodiments. Compared with the related art, the image clustering method provided by embodiments of the disclosure may avoid deviation of a total clustering result caused by deviation of the clustering center, and can effectively improve accuracy of a clustering result.

It should be understood that although various operations in the flowchart of the drawings are shown in sequence as indicated by arrows, these operations are not necessarily executed in sequence as indicated by arrows. Unless explicitly stated herein, the execution of these operations is not strictly limited, and they can be performed in other orders. Moreover, at least a part of the operations in the flowchart of the drawing may include multiple sub-operations or multiple stages. These sub-operations or stages are not necessarily performed at the same time, but may be performed at different times, which are not necessarily performed sequentially but may be performed in turn or alternately with other operations or at least a part of the sub-operations or stages of other operations.

It should be noted that the aforementioned computer readable medium in the disclosure may be a computer readable signal medium or a computer readable storage medium, or any combination of the two. The computer readable storage medium may be, for example, but not limited to, an electric, magnetic, optical, electromagnetic, infrared, or semiconductor system, apparatus, or device, or any combination of the above. More specific examples of computer readable storage media may include, but are not limited to: electrical connections with one or more wires, portable computer disks, hard disks, random access memory (RAM), read-only memory (ROM), erasable programmable read only memory (EPROM or flash memory), optical fiber, portable compact disk read only memory (CD-ROM), optical storage device, magnetic storage device, or any suitable combination of the above. In the disclosure, a computer readable storage medium may be any tangible medium that contains or stores a program, and the program may be used by or in combination with an instruction execution system, apparatus, or device. In the disclosure, a computer readable signal medium may include a data signal propagated in a baseband or as a part of a carrier wave, and a computer readable program codes are carried therein. This propagated data signal can take many forms, including but not limited to electromagnetic signals, optical signals, or any suitable combination of the foregoing. The computer readable signal medium may also be any computer readable medium other than the computer readable storage medium. The computer readable signal medium may send, propagate, or transmit the program for use by or in combination with the instruction execution system, apparatus, or device. The program code contained on the computer readable medium can be transmitted by any suitable medium, including but not limited to: wire, optical cable, RF (radio frequency), etc., or any suitable combination of the above.

The above-mentioned computer readable medium may be included in the above-mentioned electronic device; or it may exist alone without being assembled into the electronic device.

The foregoing computer readable medium carries one or more programs, and when the foregoing one or more programs are executed by the electronic device, the electronic device is caused to execute the method shown in the foregoing embodiment.

The computer program code for performing the operations of the disclosure may be written in one or more programming languages or a combination thereof. The above-mentioned programming languages include object-oriented programming languages—such as Java, Smalltalk, C++, and also include conventional procedural programming language-such as "C" language or similar programming language. The program code can be executed entirely on the user's computer, partly on the user's computer, executed as an independent software package, partly on the user's computer and partly executed on a remote computer, or entirely executed on the remote computer or server. In the case of a remote computer, a remote computer can be connected to the user's computer through any kind of network, including a local area network (LAN) or a wide area network (WAN), or it can be connected to an external computer (for example, using an Internet service provider to pass Internet connection).

The flowcharts and block diagrams in the accompanying drawings illustrate the possible implementation architecture, functions, and operations of the system, method, and computer program product according to various embodiments of the disclosure. In this regard, each block in the flowchart or block diagram may represent a module, program segment, or part of code, and the module, program segment, or part of code contains one or more executable instructions for realizing the specified logical function. It should also be noted that, in some alternative implementations, the functions marked in the block may also occur in a different order from the order marked in the drawings. For example, two blocks shown in succession can actually be executed substantially in parallel, or they can sometimes be executed in the reverse order, depending on the functions involved. It should also be noted that each block in the block diagram and/or flowchart, and a combination of blocks in the block diagram and/or flowchart, can be implemented by a dedicated hardware-based system that performs the specified function or operation, or it can be realized by a combination of dedicated hardware and computer instructions.

The modules involved in the embodiments described in the disclosure can be implemented in software or hardware. Wherein, the name of the module does not constitute a limitation on the module itself under certain circumstances. For example, the first clustering module can also be described as "a module for clustering image."

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for controlling an electronic device, the method comprising:
   obtaining a plurality of images for performing clustering;
   obtaining a plurality of target areas, wherein each of the target areas corresponds to an image of the plurality of images;
   obtaining a plurality of feature vectors corresponding to the plurality of target areas;
   obtaining a plurality of central nodes corresponding to the plurality of feature vectors;
   obtaining neighbor nodes, wherein each of the neighbor nodes is associated with a central node of the plurality of central nodes;
   obtaining a subgraph based on the plurality of central nodes and the neighbor nodes;
   identifying connection probabilities between the plurality of central nodes of the subgraph and the neighbor nodes of each of the plurality of central nodes based on a graph convolutional network; and
   clustering the plurality of target areas based on the connection probabilities.

2. The method of claim 1, wherein the obtaining of the subgraph comprises:
   identifying one of the plurality of feature vectors as corresponding to the central node;
   obtaining the neighbor node associated with the central node based on feature vectors different from the feature vector corresponding to the central node; and
   constructing the subgraph according to the central node and the neighbor node.

3. The method of claim 2, wherein the obtaining of the neighbor node comprises:
   obtaining cosine distances between the feature vector corresponding to the central node and the feature vectors different from the feature vector corresponding to the central node; and
   screening the neighbor node from the feature vectors different from the feature vector corresponding to the central node based on the cosine distances.

4. The method of claim 3, further comprising using a hierarchical clustering module to maintain a difference between noise and other node features.

5. The method of claim 3, wherein the obtaining of the cosine distances comprises:
   using each node as a central node, selecting first-order neighbor nodes according to the cosine distance;
   selecting neighbor nodes of the first-order neighbor nodes as second-order neighbor nodes according to the cosine distance; and
   selecting K neighbor nodes for each node to construct the subgraph.

6. The method of claim 3, further comprising determining the connection probability of a central node and the central node's first-order neighbor nodes according to a softmax function.

7. The method of claim 6, further comprising repeating the method until the subgraph of each node is established.

8. The method of claim 1, wherein the obtaining of the connection probabilities comprises:
   obtaining node embedding of the subgraph according to at least one layer of the graph convolutional network; and
   obtaining a connection probability between the central node of the subgraph and a neighbor node thereof based on the node embedding.

9. The method of claim 8, wherein the obtaining of the node embedding comprises:
   obtaining input features corresponding to the subgraph; and
   inputting the input features into the at least one layer of the graph convolutional network for feature extraction and using an obtained output result as the node embedding.

10. The method of claim 1, wherein the clustering of the plurality of target areas according to the connection probabilities comprises:
    obtaining, for at least one target area to be clustered, a set of neighbor nodes in a same category according to the connection probabilities;
    adjusting, for at least one neighbor node in the set of neighbor nodes in the same category, a connection probability of the at least one neighbor node and the central node according to the connection probabilities of the at least one neighbor node and respective neighbor nodes in the set of neighbor nodes in the same category;
    clustering the plurality of target areas based on the adjusted connection probability to determine whether the at least one neighbor node is a neighbor node in the same category; and
    clustering respective target areas to be clustered according to the neighbor nodes in the same category corresponding to the respective target areas to be clustered.

11. The method of claim 10, wherein the obtaining a set of neighbor nodes comprises:
    determine, for the at least one target area to be clustered, neighbor nodes of which connection probabilities with the central node are not less than a preset threshold, and forming the determined neighbor nodes as the set of neighbor nodes in the same category.

12. The method of claim 10, wherein the adjusting of the connection probability comprises:
    determining, for at least one neighbor node in the set of neighbor nodes in the same category, an average connection probability of the at least one neighbor node and respective neighbor nodes in the set of neighbor nodes in a same category as the connection probability of the at least one neighbor node and the central node.

13. The method of claim 10, wherein the clustering of the respective target areas comprises:
    determining connection probabilities among central nodes corresponding to respective target areas to be clustered according to neighbor nodes in the same category corresponding to the respective target areas to be clustered; and
    clustering the respective target areas to be clustered based on the connection probabilities among the respective central nodes.

14. The method of claim 1, further comprising:
    receiving a keyword for image search input by a user;
    identifying a category associated with the keyword based on a clustering result; and
    searching for images matching the keyword among images in the identified category.

15. An electronic device comprising:
    a memory storing at least one instruction; and a processor that is connected to the memory and controls the electronic device, wherein the processor is configured to, by executing the at least one instruction:

obtain a plurality of images for performing clustering, obtain a plurality of target areas, wherein each target area corresponds to an image of the plurality of images, obtain a plurality of feature vectors corresponding to the plurality of target areas, obtain a plurality of central nodes corresponding to the plurality of feature vectors, obtain neighbor nodes, wherein each neighbor node is associated with a central node of the plurality of central nodes, obtain a subgraph based on the plurality of central nodes and the neighbor nodes, identify connection probabilities between the plurality of central nodes of the subgraph and the neighbor nodes of each of the plurality of central nodes based on a graph convolutional network, and cluster the plurality of target areas based on the connection probabilities.

16. The electronic device of claim 15, wherein the processor is further configured to:

identify one of the plurality of feature vectors as corresponding to the central node, obtain the neighbor node associated with the central node based on feature vectors different from the feature vector corresponding to the central node, and construct the subgraph according to the central node and the neighbor node.

17. The electronic device of claim 16, wherein the processor is further configured to:

obtain cosine distances between the feature vector corresponding to the central node and the feature vectors different from the feature vector corresponding to the central node, and screen the neighbor node from the feature vectors different from the feature vector corresponding to the central node based on the cosine distances.

18. The electronic device of claim 15, wherein the processor is further configured to:

obtain node embedding of the subgraph according to at least one layer of the graph convolutional network, and obtain a connection probability between the central node of the subgraph and a neighbor node thereof based on the node embedding.

19. The electronic device of claim 18, wherein the processor is further configured to:

obtain input features corresponding to the subgraph, and input the input features into the at least one layer of the graph convolutional network for feature extraction and use an obtained output result as the node embedding.

20. The electronic device of claim 15, wherein the processor is further configured to:

obtain, for at least one target area to be clustered, a set of neighbor nodes in a same category according to the connection probabilities, adjust, for at least one neighbor node in the set of neighbor nodes in the same category, a connection probability of the at least one neighbor node and the central node according to connection probabilities of the at least one neighbor node and respective neighbor nodes in the set of neighbor nodes in the same category, cluster the target areas based on the adjusted connection probability to determine whether the at least one neighbor node is a neighbor node in the same category, and cluster respective target areas to be clustered according to the neighbor nodes in the same category corresponding to the respective target areas to be clustered.

21. The electronic device of claim 20, wherein the processor is further configured to:

determine, for the at least one target area to be clustered, neighbor nodes of which connection probabilities with the central node are not less than a preset threshold, and form the determined neighbor nodes as the set of neighbor nodes in the same category.

22. The electronic device of claim 20, wherein the processor is further configured to:

determine, for at least one neighbor node in the set of neighbor nodes in the same category, an average connection probability of the at least one neighbor node and respective neighbor nodes in the set of neighbor nodes in the same category as the connection probability of the at least one neighbor node and the central node.

23. The electronic device of claim 20, wherein the processor is further configured to:

determine connection probabilities among central nodes corresponding to respective target areas to be clustered according to neighbor nodes in the same category corresponding to the respective target areas to be clustered, and cluster the respective target areas to be clustered based on the connection probabilities among the respective central nodes.

24. The electronic device of claim 15, wherein the processor is further configured to:

receive a keyword for image search input by a user, identify a category associated with the keyword based on a clustering result, and search for images matching the keyword among images in the identified category.

* * * * *